United States Patent [19]

Yonemitsu et al.

[11] Patent Number: 5,132,792
[45] Date of Patent: Jul. 21, 1992

[54] VIDEO SIGNAL TRANSMITTING SYSTEM

[75] Inventors: Jun Yonemitsu; Yoichi Yagasaki; Katsuji Igarashi; Mark Veltman, all of Kanagawa, Japan

[73] Assignee: Sony Corporation, Tokyo, Japan

[21] Appl. No.: 596,491

[22] Filed: Oct. 12, 1990

[30] Foreign Application Priority Data

Oct. 14, 1989 [JP] Japan .................... 1-267044
Oct. 14, 1989 [JP] Japan .................... 1-267045
Oct. 14, 1989 [JP] Japan .................... 1-267046

[51] Int. Cl.[5] ............... H04N 7/133; H04N 7/137
[52] U.S. Cl. .................... 358/136; 338/105
[58] Field of Search ............ 358/133, 135, 136, 105

[56] References Cited

U.S. PATENT DOCUMENTS 4,868,653  9/1989  Golin et al. .............. 358/133
4,985,768  1/1991  Sugiyama ................ 358/136

Primary Examiner—Howard W. Britton
Attorney, Agent, or Firm—Alvin Sinderbrand; William S. Frommer

[57] ABSTRACT

Video signal transmitting system in which digital video signal are divided into groups of predetermined frames. Digital video signals of at least one frame are intraframe coded and then transmitted. Remaining digital video signals are interframe coded with reference to the intraframe coded digital video signals, and intraframe coded digital video signals of a subsequent group of frames and are then transmitted. A motion vector from a predetermined reference frame is detected. Video signals are interframe coded by the motion vector to transmit the video signals. A motion vector from a first frame which is a plurality of frames away from the reference frame is converted to a motion vector for a one frame interval between the reference frame and the first frame. The motion vector is optimized, and is then transmitted.

5 Claims, 32 Drawing Sheets

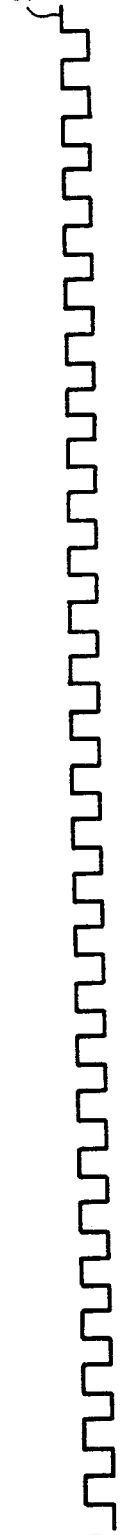
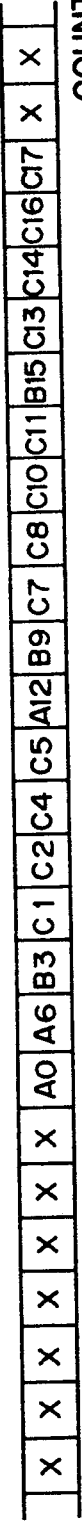
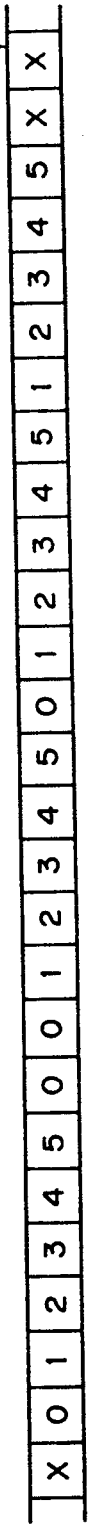
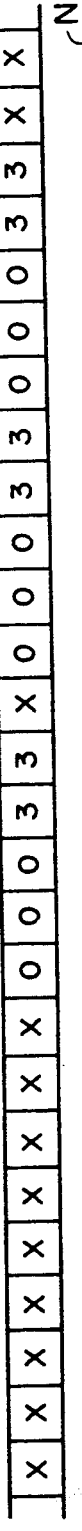
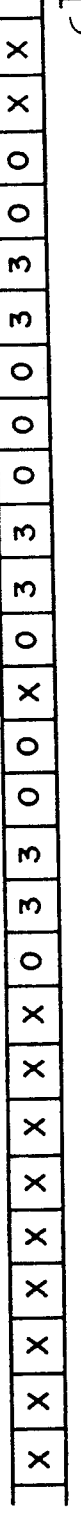
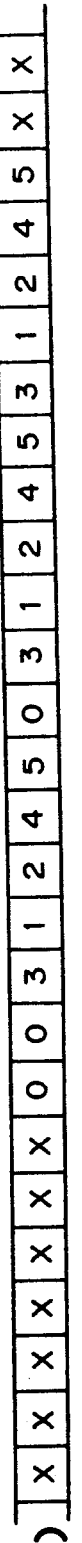

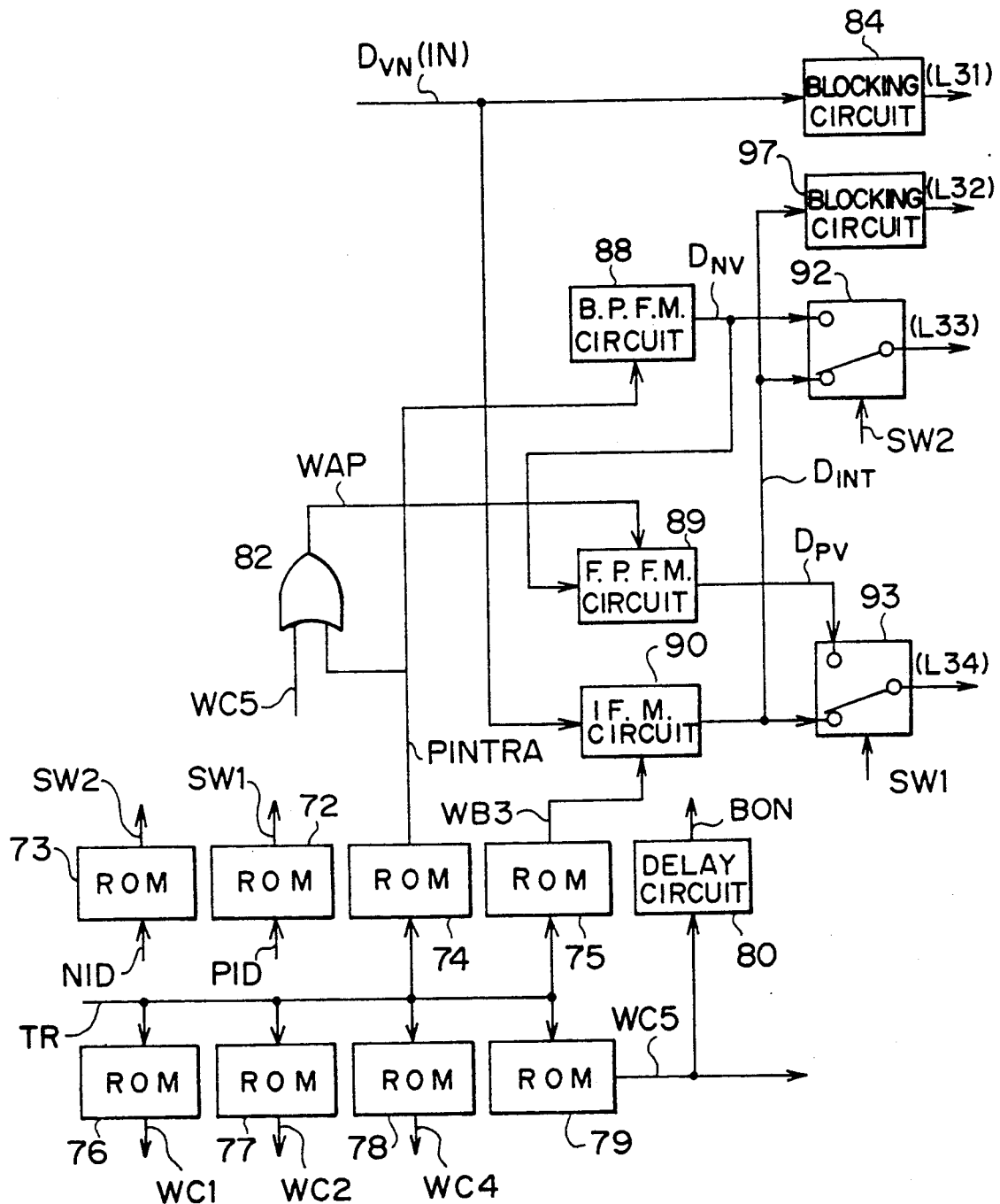
FIG. 6 (IA)

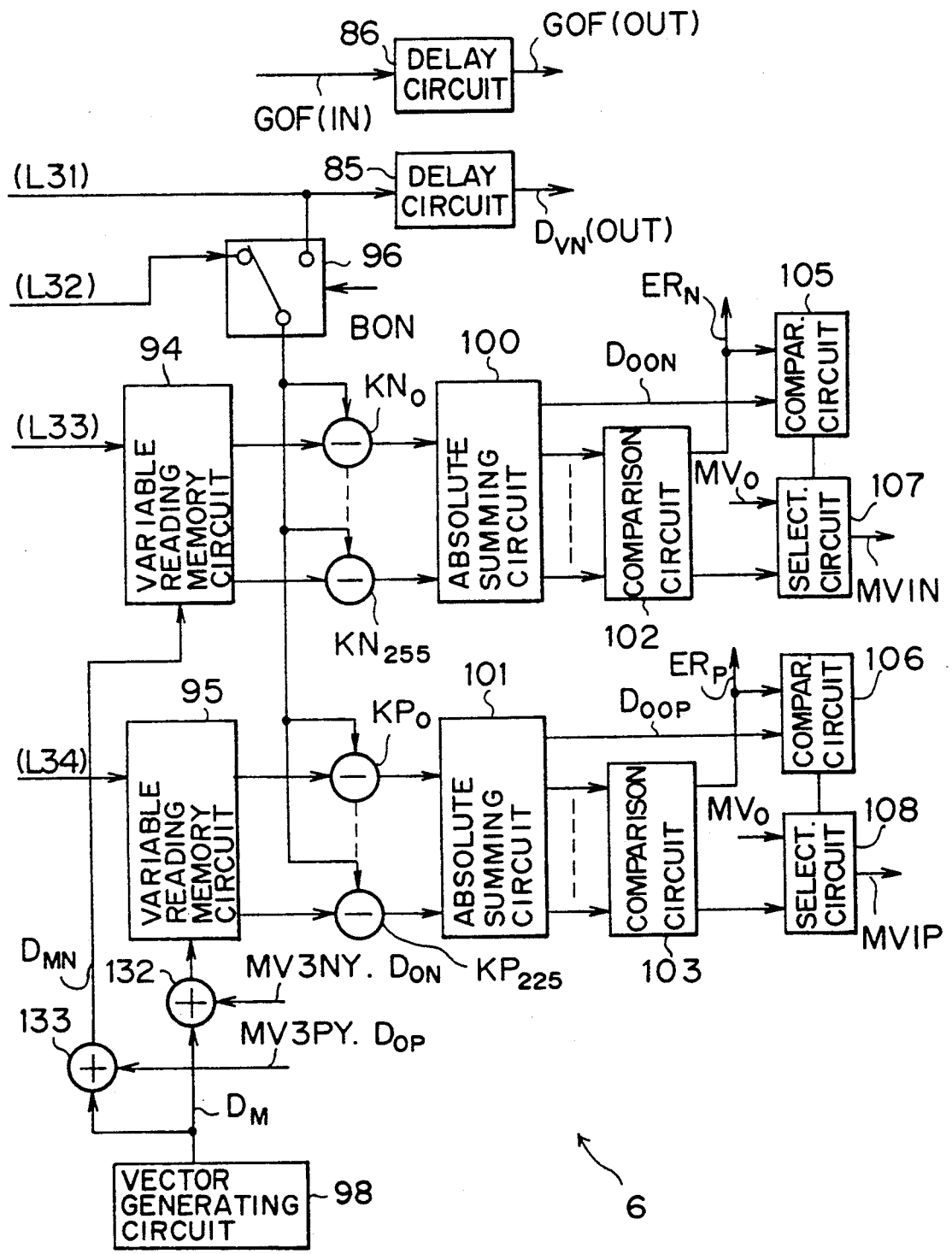
FIG. 6 (1B)

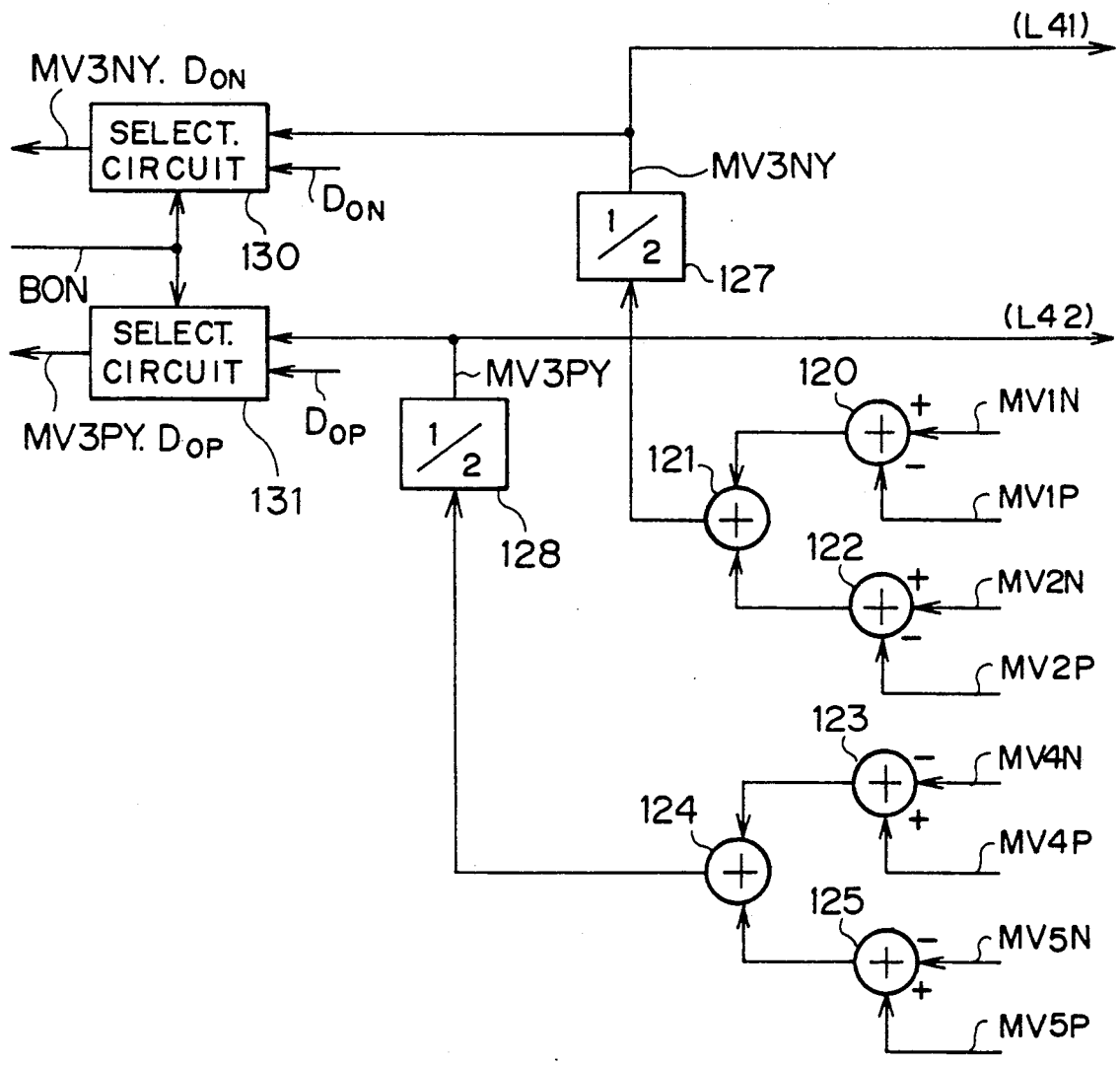
FIG. 6 (2A)

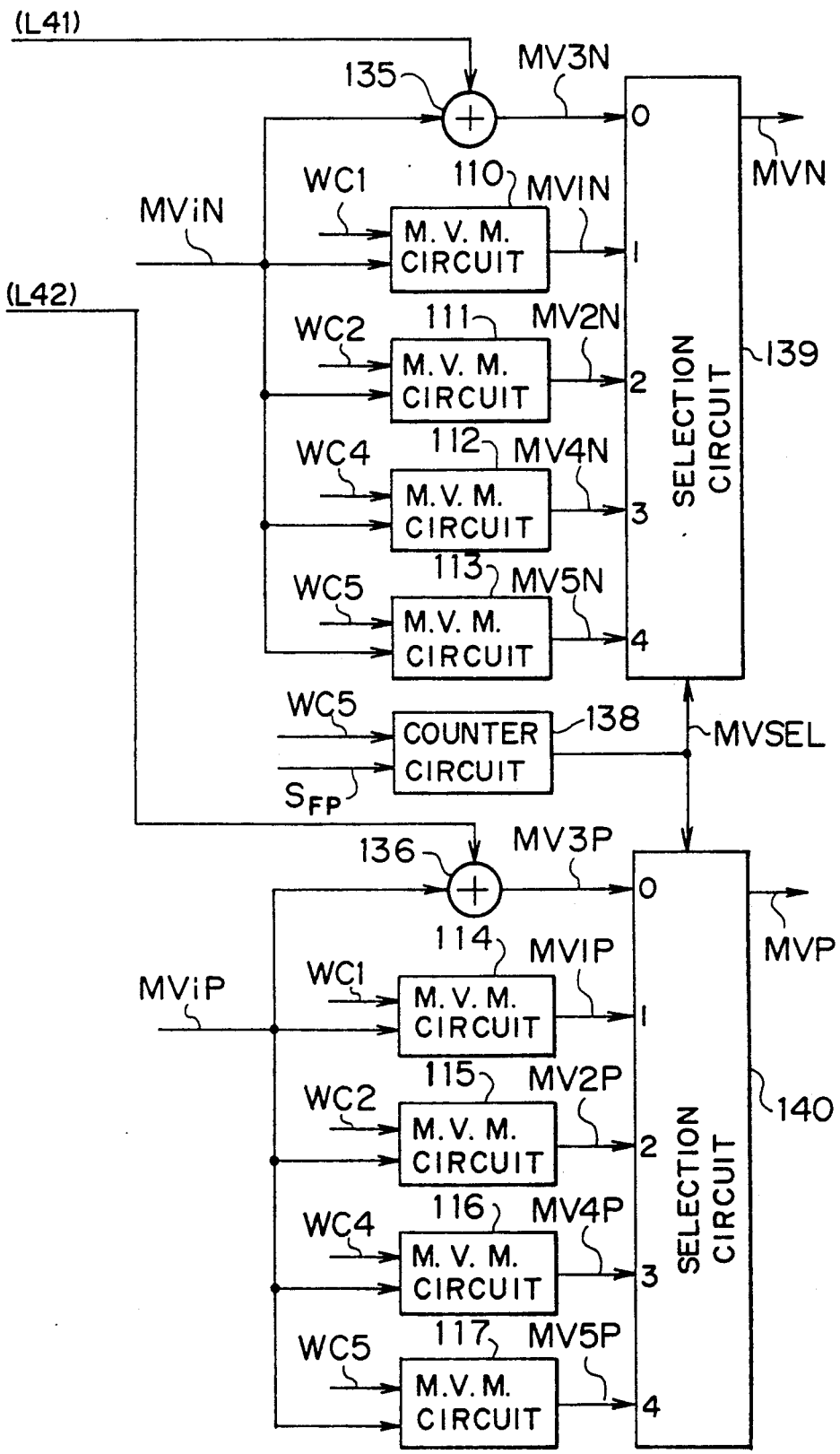
FIG. 6 (2B)

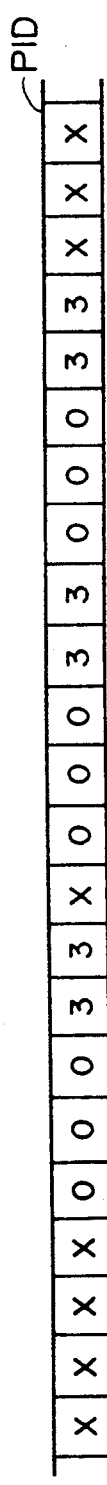
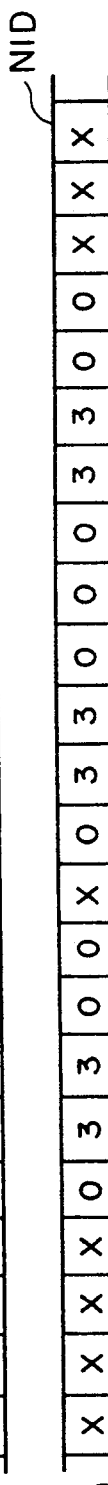
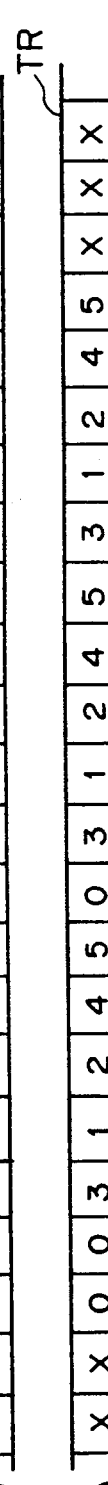
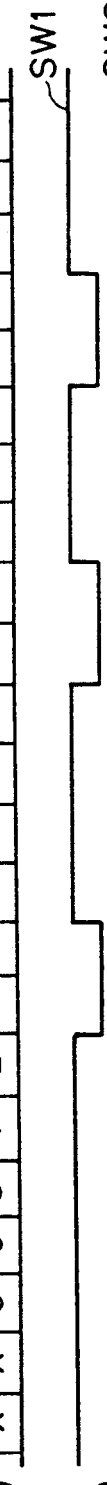
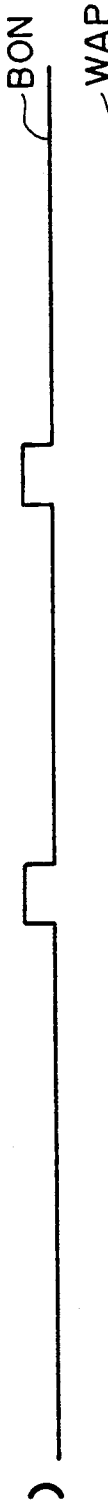
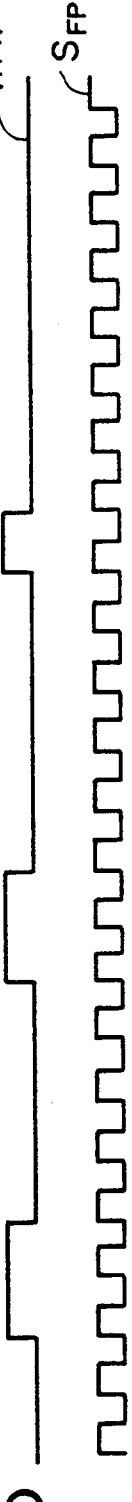
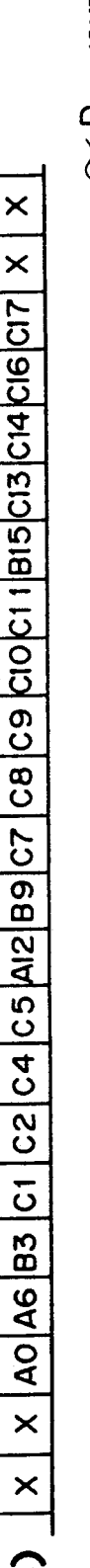
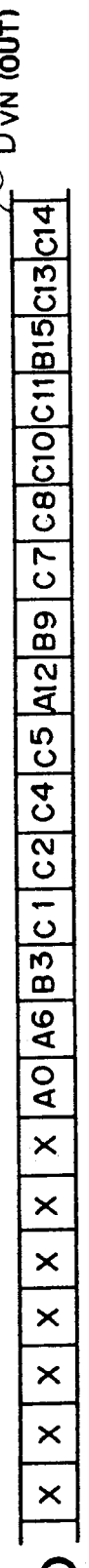

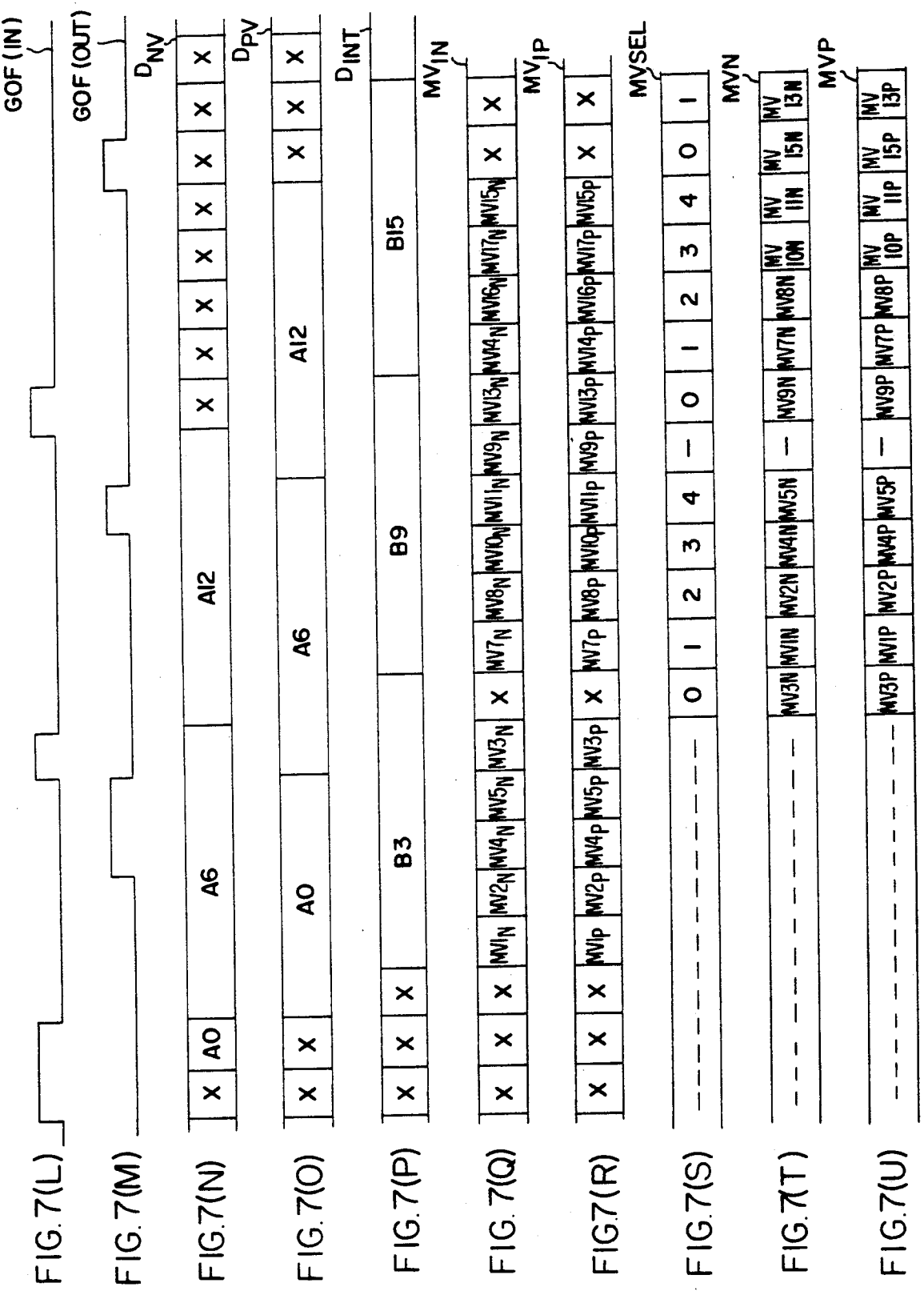

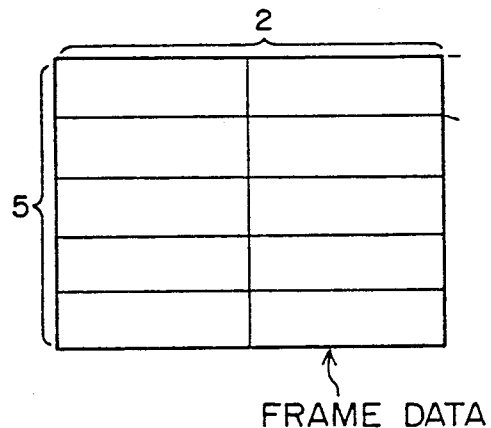
FRAME DATA
FIG.8(A)
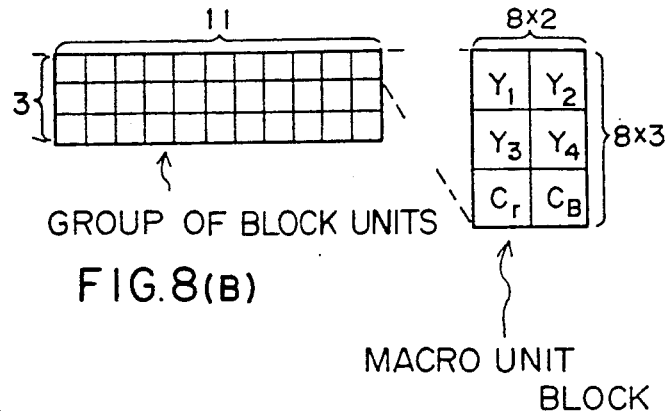
GROUP OF BLOCK UNITS
FIG.8(B)
MACRO UNIT BLOCK
FIG.8(C)
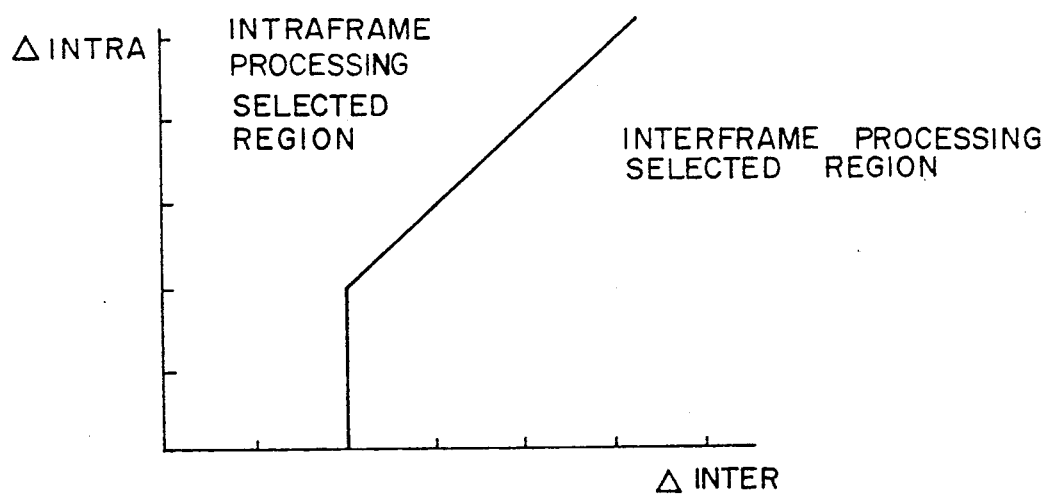
FIG. 12

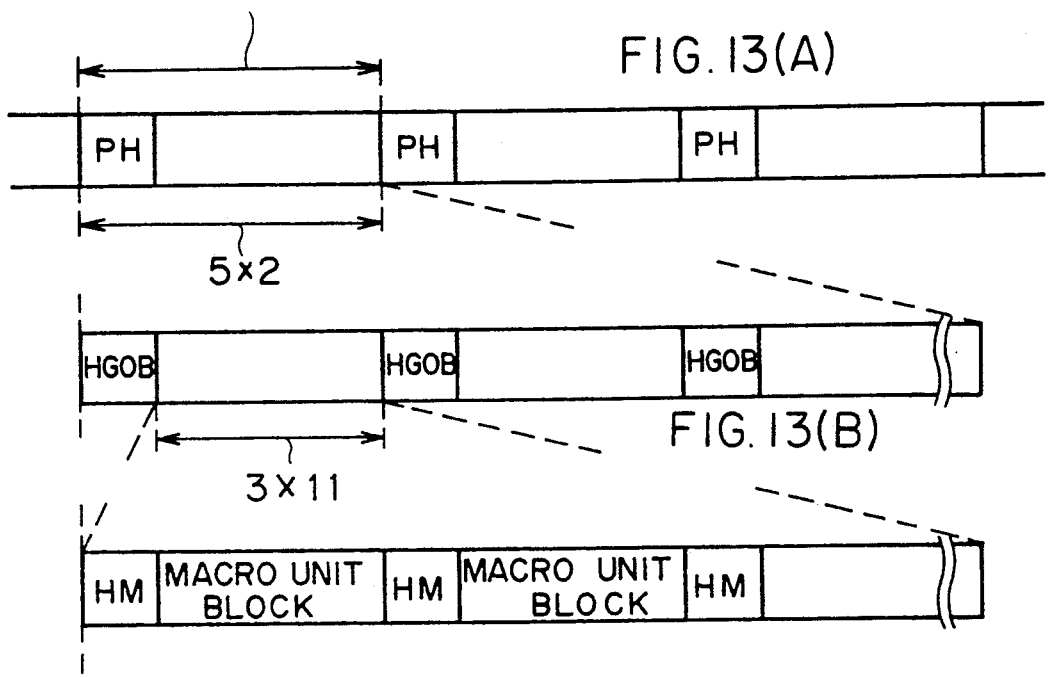
FIG. 13(A)
FIG. 13(B)
FIG. 13(C)
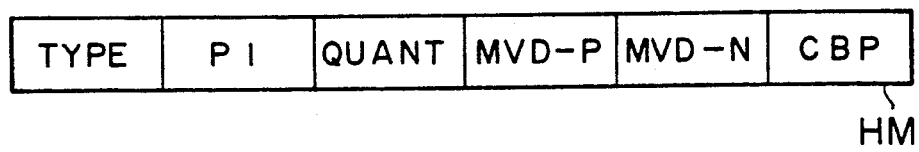
FIG. 14(A)
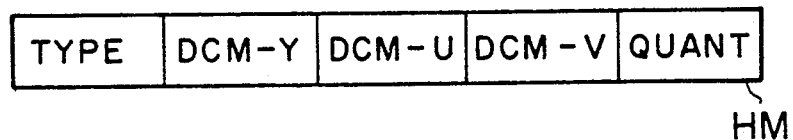
FIG. 14(B)

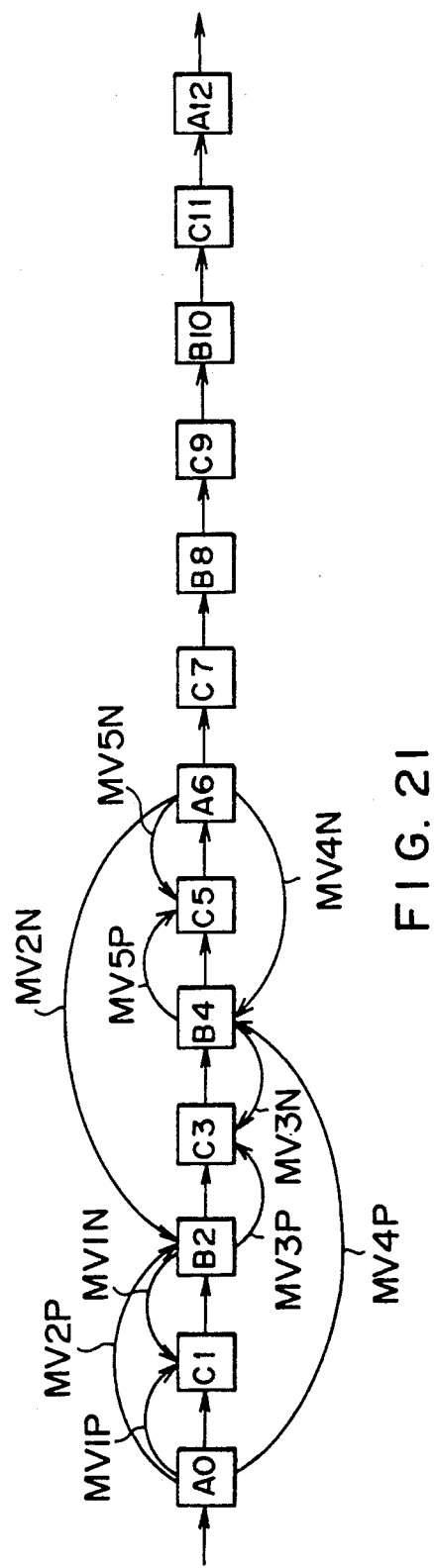
FIG. 21

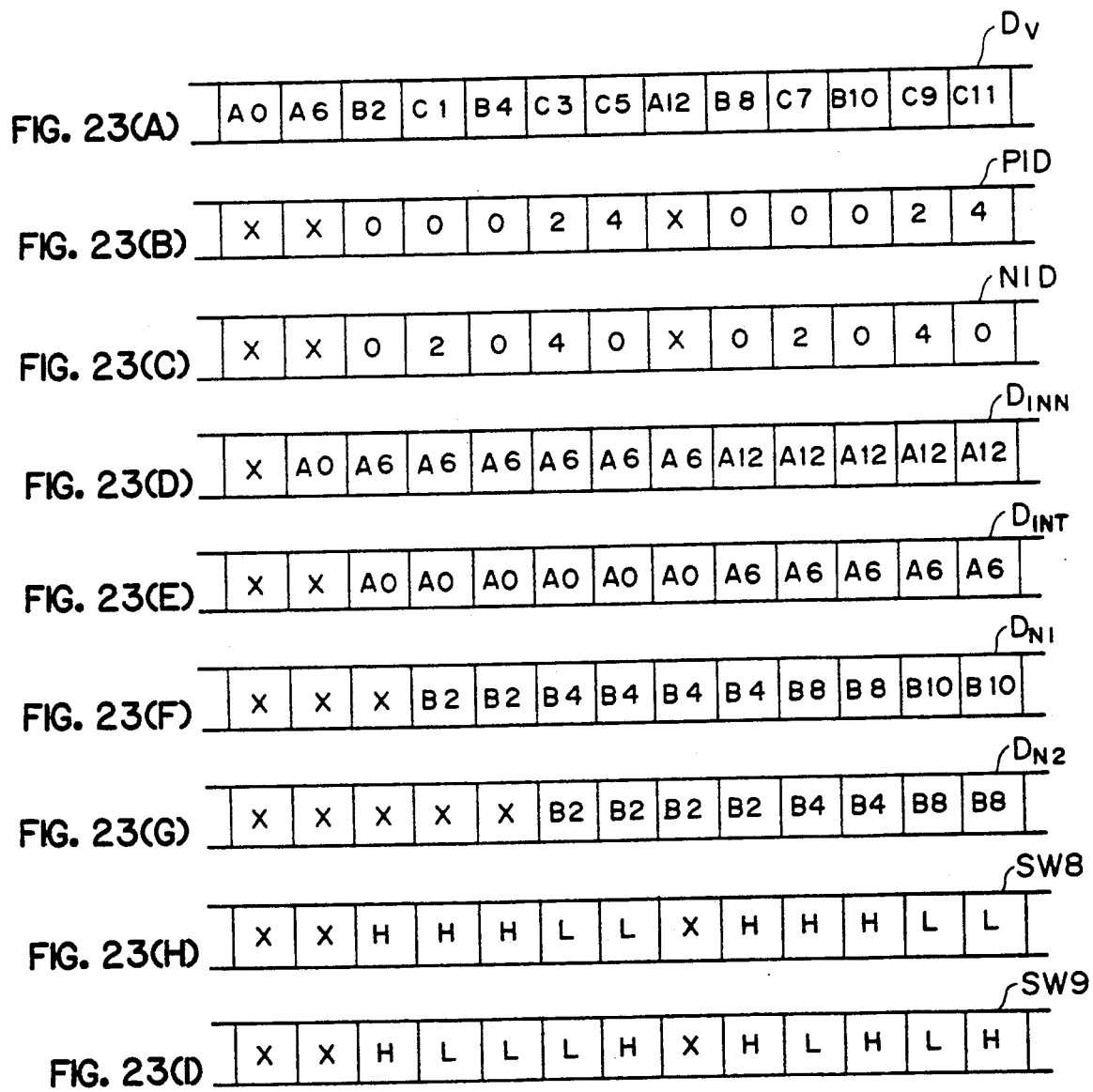

| INPUT | OUTPUT |
|---|---|
| -7 | 0 0 0 0 0 0 1 1 |
| -6 | 0 0 0 0 0 1 1 |
| -5 | 0 0 0 0 1 0 1 |
| -4 | 0 0 0 0 1 1 1 |
| -3 | 0 0 0 1 1 |
| -2 | 0 0 1 1 |
| -1 | 0 1 1 |
| 0 | 1 |
| 1 | 0 1 0 |
| 2 | 0 0 1 0 |
| 3 | 0 0 0 1 0 |
| 4 | 0 0 0 0 1 1 0 |
| 5 | 0 0 0 0 1 0 0 |
| 6 | 0 0 0 0 0 1 0 |
| 7 | 0 0 0 0 0 0 1 0 |

FIG. 30

| INPUT | OUTPUT |
|---|---|
| 0 | 0 - |
| 1 | 10 |
| 2 | 11 |

FIG. 31

| REMAIND | T. VECTOR | | | D. VECTOR | | S. VECTOR | OUTPUT DATA |
|---|---|---|---|---|---|---|---|
| | 0 | 1 | 2 | 0 | 1 | | |
| | -19 | -20 | -21 | -13 | -14 | -7 | 0 0 0 0 0 0 1 1 b1 b2 |
| | -16 | -17 | -18 | -11 | -12 | -6 | 0 0 0 0 0 1 1 b1 b2 |
| | -13 | -14 | -15 | -9 | -10 | -5 | 0 0 0 0 1 0 1 b1 b2 |
| | -10 | -11 | -12 | -7 | -8 | -4 | 0 0 0 0 1 1 b1 b2 |
| | -7 | -8 | -9 | -5 | -6 | -3 | 0 0 0 1 1 b1 b2 |
| | -4 | -5 | -6 | -3 | -4 | -2 | 0 0 1 1 b1 b2 |
| | -1 | -2 | -3 | -1 | -2 | -1 | 0 1 1 b1 b2 |
| | 0 | — | — | 0 | — | 0 | 1 |
| | 1 | 2 | 3 | 1 | 2 | 1 | 0 1 0 b1 b2 |
| | 4 | 5 | 6 | 3 | 4 | 2 | 0 0 1 0 b1 b2 |
| | 7 | 8 | 9 | 5 | 6 | 3 | 0 0 0 1 0 b1 b2 |
| | 10 | 11 | 12 | 7 | 8 | 4 | 0 0 0 0 1 1 0 b1 b2 |
| | 13 | 14 | 15 | 9 | 10 | 5 | 0 0 0 0 1 0 0 b1 b2 |
| | 16 | 17 | 18 | 11 | 12 | 6 | 0 0 0 0 0 1 0 b1 b2 |
| | 19 | 20 | 21 | 13 | 14 | 7 | 0 0 0 0 0 0 1 0 b1 b2 |

FIG. 32

| REMAINDER | S. VECTOR | | D. VECTOR | | T. VECTOR | |
|---|---|---|---|---|---|---|
| | b1 | b2 | b1 | b2 | b1 | b2 |
| 0 | — | — | 0 | — | 0 | — |
| 1 | — | — | 1 | — | 1 | 0 |
| 2 | — | — | — | — | 1 | 1 |

VIDEO SIGNAL TRANSMITTING SYSTEM

BACKGROUND OF THE INVENTION

The present invention relates to a video signal transmitting system, and is suitably applied to a case where moving picture signals are transmitted.

In the so-called video transmitting system, such as a television conference system and television telephone system, video signals representing moving pictures are conventionally sent to a remote destination. The transmission efficiency of significant information is enhanced by efficiently using the transmission capacity of the transmission channel.

For this purpose, the transmitting unit does not send all of the sequential frame pictures but performs a so-called frame dropping processing of the frame pictures such as to remove predetermined frames and then transmits the video signals.

In the receiving unit, motion vectors are received from the transmitting unit in place of the video signals of the removed frames, and the original video signals are reconstructed by interpolating the frame pictures, which have undergone frame dropping processing, by using motion vectors with reference to information in frame pictures before and after them, the motion vectors being transmitted from the transmitting unit in place of the video signals of the frames dropped (Patent Laid-open Publication No. 60 (1985)-28392).

According to this technique, it is theoretically sufficient to transmit information of motion vectors in place of information in frame pictures which have been dropped, the former possessing a smaller amount than the latter. Thus, it is considered that the technique efficiently sends significant information of the video signals.

Accordingly, the more frames that are dropped, the more efficiently video signals are transmitted When video signals practically undergo high efficiency coding processing and then are recorded on a recording medium, such as a compact disc, errors cannot however be prevented from taking place. Moreover, video signals are also reproduced in reverse mode and random accessed and hence when a large amount of frames are dropped, it is difficult to reproduce video signals with high quality.

SUMMARY OF THE INVENTION

In view of the foregoing, an object of this invention is to provide a video signal transmission system which is capable of efficiently transmitting high quality video signals.

The foregoing object and other objects of the invention have been achieved by the provision of:

a video signal transmitting system, according to a first aspect of the invention, in which digital video signals are divided into groups of predetermined frames; digital video signals of at least one frame of each group of frames are intraframe coded and then transmitted; and digital video signals of at least one frame among the remaining digital video signals of the same group are interframe coded with reference to the intraframe coded digital video signals, together with intraframe coded digital video signals of a subsequent group of frames and are then transmitted;

a video signal transmitting system, according to a second aspect of the invention, in which a motion vector from a predetermined reference frame is detected; and video signals are interframe coded by using the motion vector to transmit the video signals. a motion vector from the reference frame to a first frame which is, according to the present invention, a plurality of frames away from the reference frame, is converted to a motion vector for a one frame interval between the reference frame and the first frame, is optimized, and is then transmitted.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5(A) through 5(J) are timing diagrams to which reference will be made in describing the operation of the reordering circuit;

FIGS. 6(1A) through 6(2B) together constitute a block diagram of a motion vector detecting circuit;

FIG. 7(A) through (U) are timing diagrams showing the operation of the motion vector detecting circuit;

FIGS. 8(A) through 8(C) are diagrammatic views illustrating frame data;

FIG. 12 is a graph of a characteristic curve illustrating priority selection of intraframe coding and interframe coding;

FIGS. 13(A) through 13(C) are diagrammatic views showing the format of transmission frames;

FIGS. 14(A), 14(B), 15 and 16 are diagrammatic views illustrating frame headers;

FIGS. 18(A) through 18(F) are timing diagrams showing a normal mode of operation;

FIGS. 19(A) through 19(E) are timing diagrams showing a reverse mode of operation;

FIG. 21 is a diagrammatic view illustrating the operation of a second embodiment of the present invention;

FIGS. 23(A) through 23(I) are timing diagrams showing the operation of the adaptive prediction circuit of FIG. 22;

FIGS. 30 and 31 are tables illustrating the operation of a read only memory circuit;

FIGS. 32 and 33 are tables showing data of encoded motion vectors; and

DETAILED DESCRIPTION OF THE INVENTION

Preferred embodiments of this invention will be described with reference to the accompanying drawings.

(1) Principle of Video Signal Transmission

Figure 1:
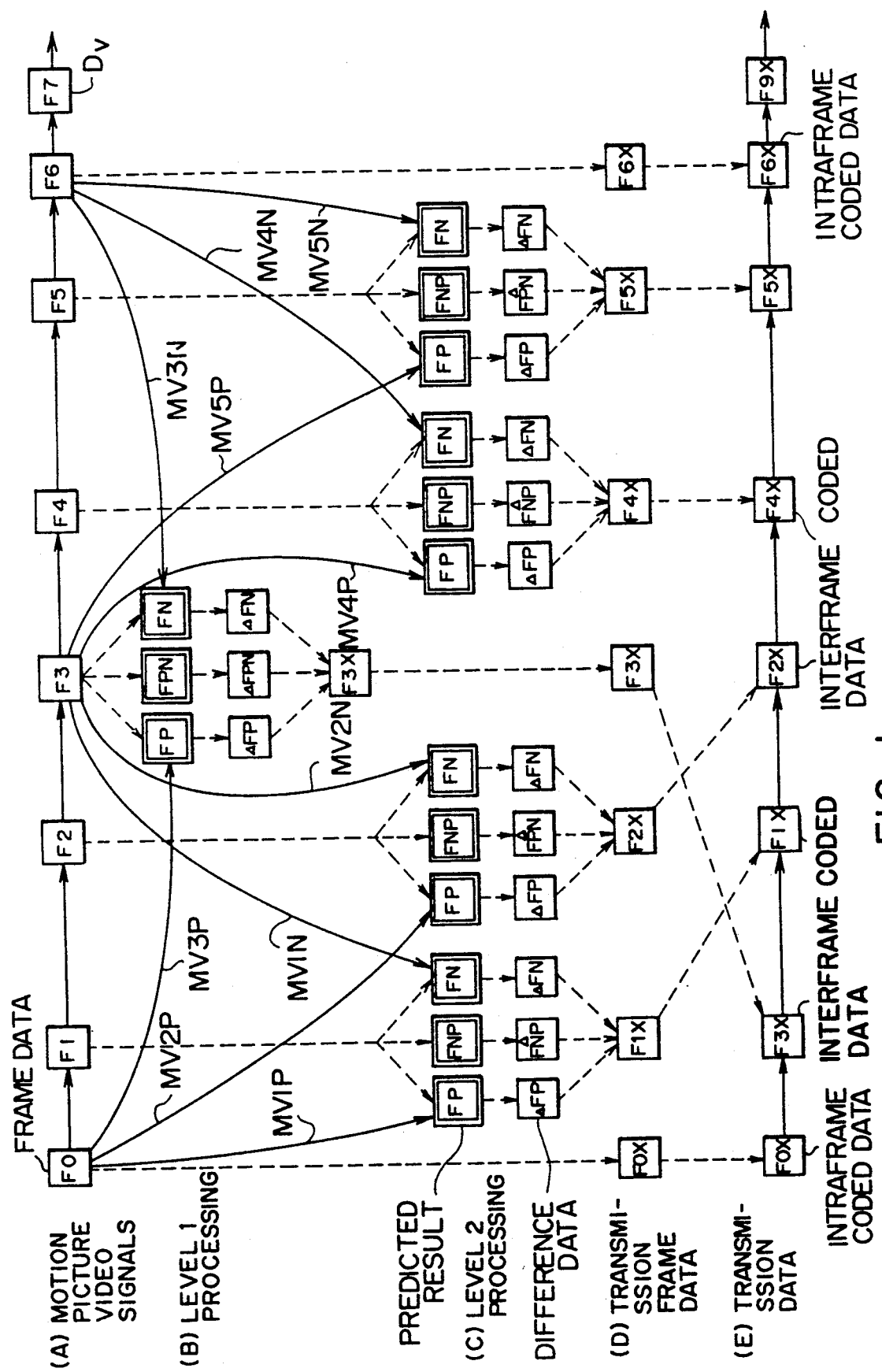
FIGS. 1(A) through 1(E) are diagrammatic views illustrating the operation of a video signal transmitting system according to one embodiment of the present invention.

When a video signal coding method according to the present invention is applied to a video signal transmitting system, video signals are transmitted according to the technique as shown in FIG. 1.

More specifically, the transmitting unit divides video signals $D_v$ arranged as frames of data F0, F1, F2, F3 ... into predetermined groups of frames and sequentially processes them (FIG. 1(A)).

In this embodiment, the transmitting unit divides the frames of data F0, F1, F2, F3 ... into groups of frames each including six frames, and the data of each leading frame F0, F6 in each group of frames are intraframe coded and then transmitted.

Intraframe coding refers to a process in which a compression process is performed on pictures in such a manner that the difference between pixel data is obtained, the pixel data being one- or two-dimensionally adjacent to each other along the scanning direction, for example. With this process, frames of data for transmission in which the picture data is compressed are produced.

Thus, in the receiving unit, the data of one frame can be reconstructed by sequentially adding transmitted single frames of intraframe coded data.

In the transmitting unit, the frames F1, F2, F3 ... (except for the leading frames F0 and F6) of each group of frames are interframe coded and then transmitted.

Interframe coding refers to a process in which after a motion vector is detected between a predicted frame, which serves as a reference, and a frame to be coded, a frame of data (hereinafter referred to as a predicted result frame) is produced by shifting the data of the predicted frame by the amount of the motion vector. The difference in the data between the predicted result frame and the frame to be coded is coded together with the motion vector to produce a transmission frame.

Thus, in the transmitting unit, with respect to each of the frames F1, F2, F3 ... (except for the leading frames F0, F6) of each group of frames, a motion vector in connection with a predetermined predicted frame is detected and interframe coding is carried out.

In addition, in the transmitting unit two predicted frames are assigned to each frame of data F1, F2, F3 ..., and a motion vector is detected for each predicted frame.

Furthermore in the transmitting unit, a predicted result frame is produced from the data of a respective predicted frame with reference to two detected motion vectors, and then the two resulting predicted result frames are interpolated to generate an interpolated predicted result frame. Interframe coding is performed by selecting the frame of data for which the difference data from the predicted result frame and the interpolated predicted result frame is the smallest; that is, selective prediction processing is carried out. Hereinafter, a prediction in which a frame of data, input before a frame of data to be coded, is used as a predicted frame is called forward prediction; a prediction in which a frame of data, input after a frame of data to coded, is used as a predicted frame is called backward prediction; and a prediction in which interpolated predicted result frames are used is called interpolative prediction.

Thus, the transmitting unit selectively performs interframe coding so that the amount of the transmission data is minimized, and thereby video signals are transmitted with improved transmission efficiency.

When interframe coding is carried out in the transmitting unit, firstly the fourth frame F3, F9 of each group of frames is interframe coded with a previous frame F0, F6 and a following frame F6, F12 used as predicted frames (hereinafter referred to as processing level 1). Subsequently, the remaining frames F1, F2, F4, F5 ... are interframe coded with previous frames F0, F3 and following frames F3, F6 being used as predicted frames (hereinafter referred to as processing level 2).

Interframe coding produces a small amount of data to be transmitted as compared to intraframe coding. Thus, the more frames of data which are interframe coded, the smaller the amount of the overall video signal to be transmitted becomes.

However, for the frames of data to be interframe coded to increase, frames which are far removed from predicted frames, referred to by the frames of data, must be interframe coded. Thus, a motion vector must be detected between frames which are far removed from each other which results in complicating the detection of the motion vector. Particularly, in selective predicted processing, the transmitting unit becomes complicated since motion vectors to be detected are larger.

In the first embodiment described herein, the data of frame F3 are interframe coded with the frames F0 and F6 used as predicted frames. Then, the frames F3, F0 and F6 are used as predicted frames, and the frames F1, F2, F4, F5 ... between them are interframe coded. With these procedures, motion vectors can be detected between relatively close frames, so that it is possible to efficiently transmit video signals with a simple apparatus.

Thus, in interframe coding at level 1, the transmitting unit uses the leading frame F0 of a group of frames and the leading frame F6 of the subsequent group of frames as reference predicted frames for detecting motion vectors to perform forward and backward predictions.

More specifically, the transmitting unit detects a motion vector MV3P between frame F0 and the fourth frame F3 for forward prediction and a motion vector MV3N between frames F6 and F3 for backward prediction (FIG. 1(B)). Then, the data F0 and F6 of the predicted frames are shifted by the amount of the respective vector MV3P and MV3N to construct predicted result frames FP and FN for forward and backward predictions, respectively.

Subsequently, the transmitting unit linearly interpolates the predicted result frames FP and FN to generate a predicted result frame FPN for interpolative prediction.

After difference data ΔFP, ΔFN, ΔFPN which are the difference in data between frame F3 and predicted result frames FP, FN, FPN are obtained, the transmitting unit selects the smallest of the difference data ΔFP, ΔFN, ΔFPN, and converts it to a transmission frame F3X together with motion vectors MV3P and MV3N (FIG. 1(D)).

In the receiving unit, the original data of frames F0 and F6 are reconstructed from the transmission frames F0X and F6X, and then the original data of frame F3 can be reconstructed on the basis of the reconstructed frames F0 and F6 and the transmission frame F3X.

On the other hand, in processing at level 2, the transmitting unit uses the leading frames F0 and F6 and the fourth frames F3 and F9 as predicted frames for the first and the second frames F1 and F2, F7 and F8, ... and then forward and backward predictions are performed.

Thus, in the transmitting unit, motion vectors MV1P and MV1N; MV2P and MV2N are detected with references to frames F0 and F3 (FIG. 1(C)). Then, predicted result frames FP and FN are produced with reference to the motion vectors MV1P and MV1N; MV2P and MV2N, respectively, and interpolated predicted result frames FPN are also constructed.

After difference data ΔFP, ΔFN, ΔFPN are obtained with reference to the predicted result frames FP, FN and FPN, respectively, the smallest of the difference data ΔFP, ΔFN and ΔFPN are selected and converted to transmission frames F1X and F2X together with the motion vectors MV1P and MV1N; MV2P and MV2N.

Similarly, the fourth frame F3 and the leading frame F6 of the subsequent group of frames are used as predicted frames for the fifth and the sixth frames F4 and F5; F100 and F11; ... .

When motion vectors MV4P and MV4N; MV5P and MV5N are detected, the transmitting unit produces predicted result frames of data FP and FN with reference to motion vectors MV4P and MV4N; MV5P and MV5N and then a frame of data FPN to produce difference data ΔFP, ΔFN and ΔFPN. Then, the smallest of the difference data ΔFP, ΔFN and ΔFPN is selected and converted to transmission frames F4X and F5X together with motion vectors MV4P and MV4N; MV5P and MV5N.

Thus, the frames of data are separated into units of 6 frames and are processed in a combination of intraframe coding and interframe coding and then transmitted. Frames F0, F6, ... which have been intraframe coded and then sent are reconstructed and then the remaining frame data are subsequently reconstructed. If an error occurs, the error is thus prevented from being transmitted to the other group of frames, and hence when the invention is applied to compact discs or the like, high picture quality video signals can be transmitted at high efficiency.

Moreover, when inversely reproduced or random accessed, the frames can be positively reconstructed. Thus, degradation of picture quality is effectively prevented and video signals can be highly efficiently transmitted.

In this embodiment, transmission data F0X-F5X are reordered in each group of frames in the order of intraframe coding and interframe coding and then transmitted (FIG. 1(E)). When transmitted, identification data representing predicted frames and intraframe coded transmission frames are added to each of the picture data F0X-F5X.

That is, frames F1 and F2; F4 and F5 require frames F0 and F3; F3 and F6 which are predicted frames for encoding and decoding, respectively.

For frame F3, predicted frames F0 and F6 are needed for encoding and decoding.

Figure 2:
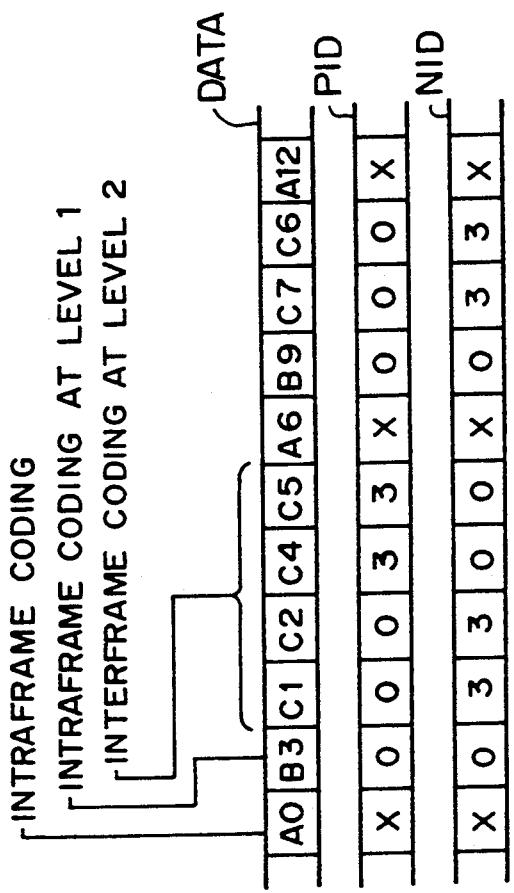
FIGS. 2(A) through 2(C) are diagrammatic illustrations of frames to be intraframe coded and of frames to be processed at different levels, respectively, in the operation of the video signal transmitting system.

With reference to FIG. 2(A), wherein the frames to be intraframe coded are represented, and FIGS. 2(B) and 2(C), wherein the frames to be processed at levels 1 and 2, respectively, are represented, the transmitting unit outputs transmission frames DATA (FIG. 2(A)) in the order of reference frames A0, B3, C1, C2, C4, C5, A6, B9 ... .

In this operation, the transmitting unit transmits a prediction index PINDEX, forward prediction reference index PID (FIG. 2(B)), backward prediction reference index NID (FIG. 2(C)) together with the transmission frame data; the prediction index PINDEX is for identifying forward prediction, backward prediction or interpolative prediction and the forward prediction reference index PID and the backward prediction reference index NID represent predicted frames for forward prediction and backward prediction, respectively. With the use of these indices the receiving unit decodes transmission frames with ease.

In practice, the transmission of the prediction index PINDEX for identifying forward prediction, backward prediction or interpolative prediction, the forward prediction reference index PID and backward prediction reference index NID representing the predicted frame together with the transmission frames, not only facilitates decoding in the receiving unit but also enables decoding of the original data with ease even if transmission frames are transmitted in a format in which the frame group length differs, the processing of frames at levels 1 and 2 differs, etc. from the format of this embodiment.

More specifically, the original frames can be decoded by shifting a predicted frame which is identified by the forward prediction reference index PID and backward prediction reference index NID according to the prediction index PINDEX, by the amount of the motion vector therefor and then by adding the transmitted difference data.

Thus, the operability of the whole video signal transmission system is enhanced since video signals which are encoded in a different format can be easily decoded.

Moreover, the format of a video signal or in a single recording medium may be selectively changed, and hence moving video signals possessing high picture quality can be easily transmitted.

(2) Construction of the Embodiment (2-1) Structure of the Transmitting Unit

Figure 3A:
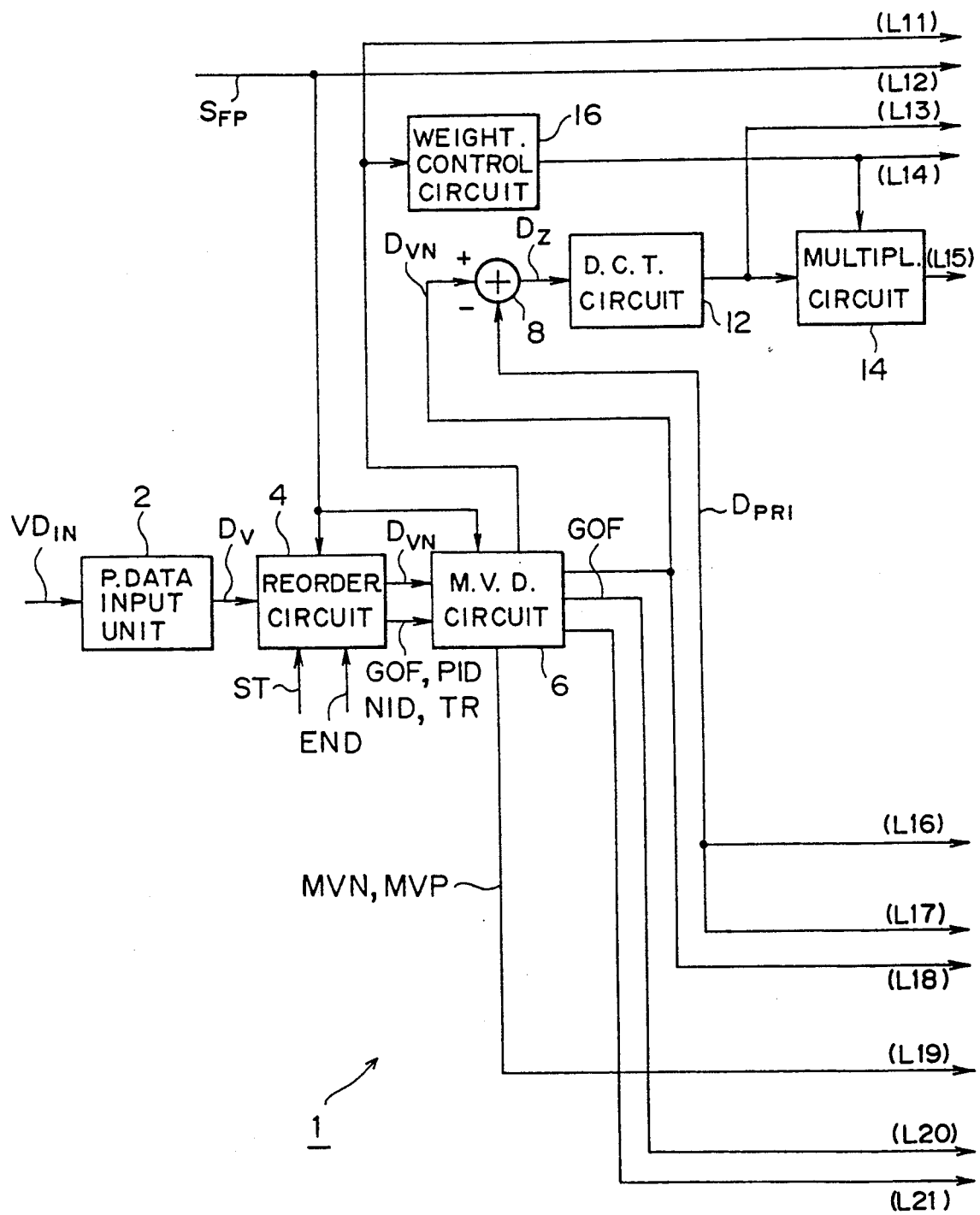
FIGS. 3A and 3B together constitute a block diagram showing the overall construction of a transmitting unit.
Figure 3B:
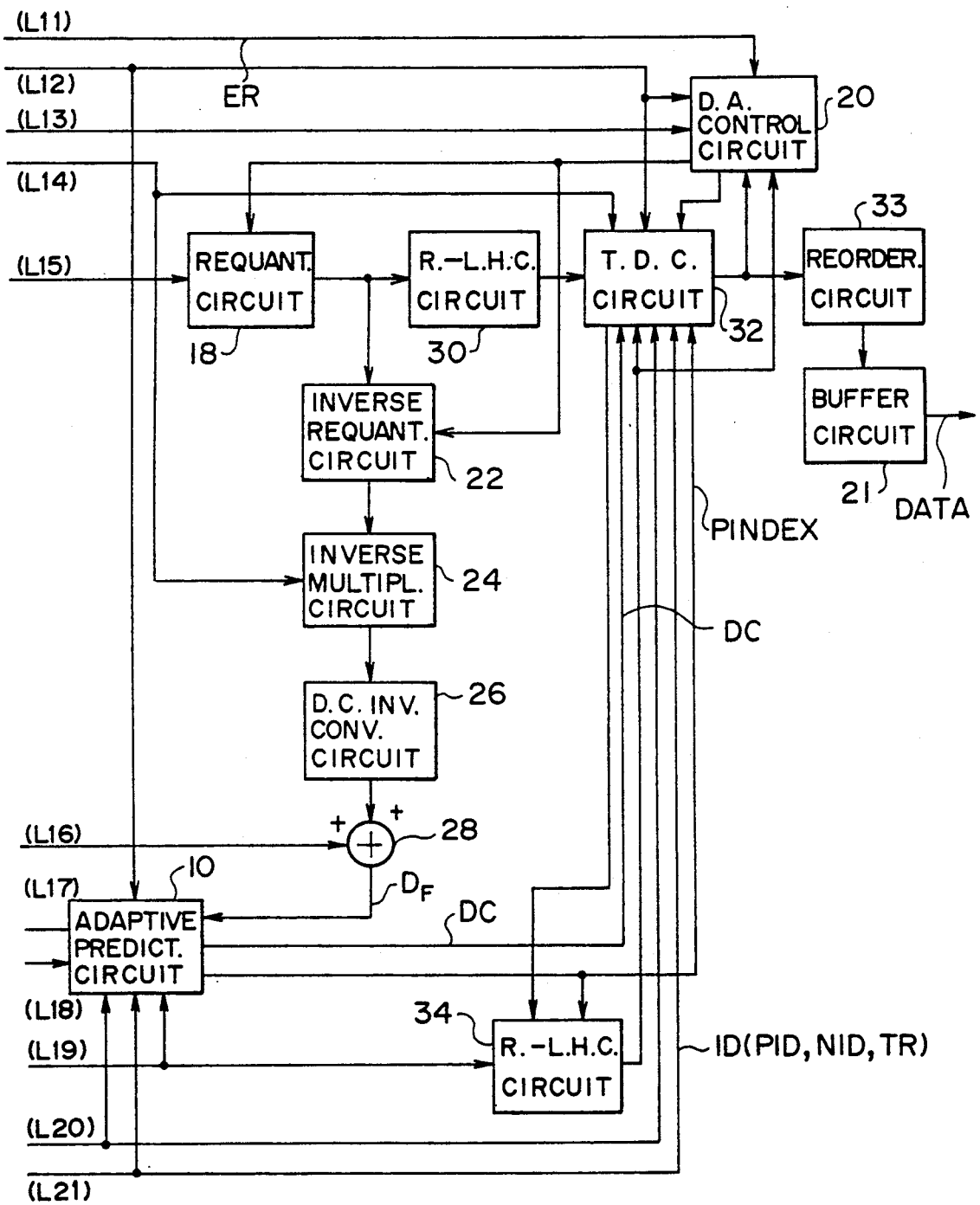
Figure 4:
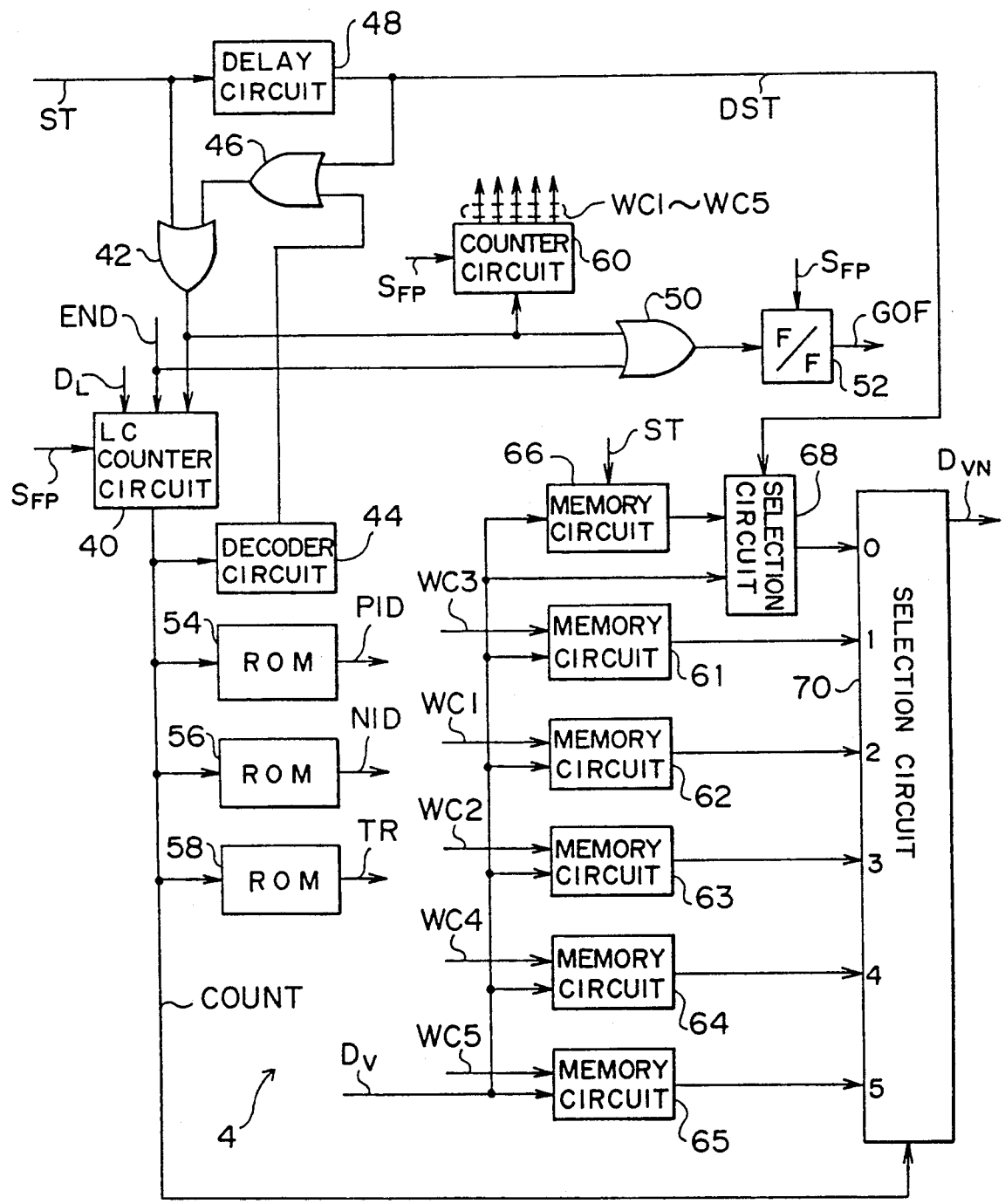
FIG. 4 is a block diagram showing a reordering circuit.

In FIGS. 3A and 3B, numeral 1 indicates a transmitting unit of the video signal transmission system in which the above described video signal transmission method is applied. The transmitting unit highly efficiently encodes and converts input video signals $VD_{IN}$ to transmission frames DATA and then records them on a compact disc.

The transmission unit 1 provides an input video signal $VD_{IN}$ to a picture data input unit 2 where a luminance signal and a chrominance signal which constitute the input video signal $VD_{IN}$ are converted to a digital signal and then the amount of data is reduced to ¼ of the original amount.

More specifically, the picture data input unit 2 provides the luminance signal which has been converted to a digital signal to a one field dropping circuit (not shown) to delete one field, and then every other line of the remaining field of the luminance signal is removed.

The picture data input unit 2 deletes one field from each of the two chrominance signals which have been converted to digital signals and then selectively outputs every other line of the chrominance signals.

The picture data input unit 2 converts the thinned luminance signals, and the chrominance signals, selectively output, to data having a predetermined transmission rate through a time axis conversion circuit.

With these operations, the input video signal $VD_{IN}$ is preliminarily processed by the picture data input unit 2, so that picture data $D_V$ which continuously provide the sequential frames described above are constructed.

When a start pulse signal ST is input, a reordering circuit 4 separates picture data $D_V$, which are sequentially input in the order of frames A0, C1, C2, B3, C4, C5, A6, C7, ..., into groups of six frames, and then the reordering circuit 4 reorders them in the order to be encoded: A0, A6, B3, C1, C2, C4, C5, A12, B9, C7 ... and outputs them.

The subsequent intraframe coding and interframe coding operations are simplified by reordering the frames in the encoding order in such manner.

When an end pulse signal END supplied to circuit 4 rises, the reordering circuit 4 stops outputting data after the data input immediately before the rise of the end pulse signal is reordered.

The reordering circuit 4 outputs a frame group index GOF, a forward prediction reference index PID, a backward prediction reference index NID and a temporary index TR. The signal level of the frame group index GOF rises at the head of each group of frames, and the temporary index TR represents the order of the frames in each group of frames.

A motion vector detecting circuit 6 receives the reordered picture data $D_{VN}$ and processes each frame of data by separating it into predetermined macro unit blocks.

In this process, the motion vector detecting circuit 6 delays the frames A0, A6, ... which are to be intraframe coded for a predetermined time and outputs them in macro unit blocks to a subtracting circuit 8 whereas with respect to the frames B3, C1, C2, C4 ... to be interframe coded, the motion vector detecting circuit 6 detects motion vectors MVP and MVN for each macro unit block with reference to predetermined predicted frames.

Furthermore, in this process, the motion vector detecting circuit 6 obtains the difference data between frames to be interframe coded and corresponding predicted result frames in an absolute value summing circuit to thereby obtain error data ER which is the sum of absolute values of the difference data.

In this embodiment, the size of the quantization interval or the like is switched by using the error data ER, so that degradation in picture quality is effectively avoided and video signals are efficiently transmitted.

In addition, the motion vector detecting circuit 6 delays the frame group index GOF, forward prediction reference index PID, backward prediction reference index NID and temporary index TR together with the reordered picture data $D_{VN}$ for a motion vector detection processing time and then outputs them for each macro unit block to the succeeding processing circuit.

A subtracting circuit 8 generates difference data $D_Z$ by obtaining the difference between predicted data $D_{PRI}$, output from an adaptive prediction circuit 10 (refer to FIG. 3B), and the picture data $D_{VN}$ and outputs the difference data $D_Z$ to a discrete cosine conversion circuit 12.

In the intraframe coding process, the adaptive prediction circuit 10 outputs a means value of picture data of each pixel as predicted data $D_{PRI}$ for each macro unit block.

On the other hand, in the interframe coding process the adaptive prediction circuit 10 selects one of forward prediction, backward prediction and interpolative prediction by carrying out a selective prediction processing, and then the adaptive prediction circuit 10 outputs selected predicted result frame data as predicted data $D_{PRI}$ for each macro unit block.

This enables difference data $D_Z$ (which corresponds to the smallest amount of data among the difference data $\Delta FP$, $\Delta FNP$ and $\Delta FN$) to be obtained for the frames to be interframe coded whereas in the case of frames to be intraframe coded the difference data $D_Z$ from the mean value can be obtained.

The discrete cosine transformation circuit 12 converts difference data $D_Z$ for each macro unit block by means of the DCT (discrete cosine transform) technique.

A multiplication circuit 14 performs a weighting process on output data from the discrete cosine transformation circuit 12 according to control data output from a weighting control circuit 16.

A viewer does not recognize the degradation in picture quality where brightness changes in a short period, for example, even if video signals are roughly quantized and transmitted.

On the contrary, a degradation in picture quality is sharply recognized in a region where brightness gradually changes when roughly quantized video signals of that region are sent.

Accordingly, video signals are roughly quantized in the region where brightness changes in a short period and the quantization interval is reduced for regions where brightness gradually changes. In this manner, deterioration in picture quality is effectively avoided and video signals are efficiently transmitted.

In this case, the size of the quantization interval is enlarged in the high portion of the spatial frequency whereas the size of the quantization interval is reduced in the low portion of the spatial frequency.

Thus, in this embodiment, a component which is hard for a viewer to recognize is accorded an equivalently enlarged quantization interval by weighting processing coefficients of which data are output from the discrete cosine transformation circuit 12 according to error data ER output from the motion vector detecting circuit 6, and thereby a degradation of picture quality is effectively avoided and video signals are efficiently transmitted.

A requantizing circuit 18 requantizes output data from the multiplication circuit 14, in which event the size of the quantization interval is switched according to control data output from a data amount control circuit 20.

A viewer recognizes a display picture in which the outline or boundary of an object is clear to possess good picture quality, and hence a degradation in picture quality is effectively avoided and video signals are efficiently transmitted by reducing the size of the quantization interval of the outline or boundary of the object.

Thus, in this embodiment, the size of the quantization interval is switched according to the amount of output data from the discrete cosine transformation circuit 12, the amount of input data to the buffer circuit 21 and error data ER, and thereby the output data of the discrete cosine transformation circuit 12 is requantized to reflect the quality of the picture. In this matter, deterioration of picture quality is effectively avoided and each frame of data is transmitted with a fixed amount.

An inverse requantizing circuit 22 receives output data of the requantizing circuit 18 and carries out an inverse quantizing process which is an inverse of the process carried out by the requantizing circuit 18 to thereby reconstruct the input data of the requantizing circuit 18.

An inverse multiplication circuit 24 performs a multiplication operation on the output data of the inverse requantizing circuit 22 inversely to that of the multiplication circuit 14 to thereby reconstruct the data input to the multiplication circuit 14.

In a process which is the inverse of that carried out by the discrete cosine transformation circuit 12, an inverse discrete cosine transformation circuit 26 converts output data from the inverse multiplication circuit 24, so that the data input to the discrete cosine transformation circuit 12 are reconstructed.

A adding circuit 28 adds the predicted data $D_{PRI}$, output from the adaptive prediction circuit 10, to the output data of the inverse discrete cosine transformation circuit 26 and then outputs the resulting data to the adaptive prediction circuit 10.

Thus, in the adaptive prediction circuit 10, a frame of data $D_F$ which is a reconstruction of the data input to the subtracting circuit 8 can be obtained from the adding circuit 28, and thereby the frame $D_F$ is selectively input for use as a predicted frame. In this manner, a selective prediction result is obtained for a frame of data subsequently input to the subtracting circuit 8.

Accordingly, by inputting frames reordered in the processing sequence a selective prediction result can be detected by sequentially inputting the frames of data $D_F$ in a selective manner to the adaptive prediction circuit 10, and hence video signals can be transmitted with the use of a simple apparatus.

In a run-length Huffman encoding circuit 30, output data from the requantizing circuit 18 are subjected to a Huffman coding process which is a variable length coding process and is then output to a transmission data composition circuit 32.

Similarly, a run-length Huffman encoding circuit 34 performs Huffman encoding on motion vectors MVN and MVP and then outputs them to the transmission data composition circuit 32.

Synchronously with a frame pulse signal $S_{FP}$, the transmission data composition circuit 32 outputs the output data from the run-length Huffman encoding circuits 30 and 34, prediction index PINDEX, forward prediction reference index PID, backward prediction reference index NID and temporary index TR together with control information or the like of the weighting control circuit 16 and the data amount control circuit 20 in a predetermined sequence.

A reordering circuit 33 reorders output data from the transmission data composition circuit 32 in the encoding order for each group of frames and then outputs the reordered data to the buffer circuit 21, through which the transmission frames DATA are outputted.

Thus, the transmission frames DATA are obtained which are constructed by high efficiency coding of the input video signal $VD_{IN}$, and the recording of the transmission frames DATA on a compact disc together with a synchronizing signal or the like enables deterioration of picture quality to be avoided and provides high density recording of the video signals.

(2-2) Reordering Circuit

As illustrated in FIG. 4 and FIGS. 5(A) through 5(J), the reordering circuit 4 operates synchronously with the frame pulse signal $S_{FP}$ (FIG. 5(A)) and reorders and outputs picture data $D_V$ (FIG. 5(D)) in the order of frames to be intraframe coded and interframe coded, the picture data $D_V$ being input after the start pulse signal ST rises (FIG. 5(B)) and before the end pulse signal END rises (FIG. 5(C)).

More specifically, the reordering circuit 4 provides the start pulse signal ST through an OR circuit 42 to a clear terminal C of a counter circuit 40, which increments its count value, and thereby generates count data COUNT (FIG. 5(F)) which increments its value synchronously with the frame pulse signal $S_{FP}$.

When the count data COUNT reaches a value of 5, a decoder circuit 44 activates the clear terminal C through OR circuits 46 and 42.

Thus, the count data COUNT sequentially changes in a circular manner within a range from 0 to 5 synchronously with the frame pulse signal $S_{FP}$.

A delay circuit 48 delays the start pulse signal ST for five frame cycles and then outputs it as a delayed start pulse signal DST to the clear terminal C of the counter circuit 40 through the OR circuits 46 and 42.

Thus, when the start pulse signal ST rises, the clear terminal C of the counter circuit 40 continuously rises for two frame cycles after a delay of five frame cycles, so that count data COUNT having two continuous zero values are obtained.

When the end pulse signal END rises, the counter circuit 40 loads data $D_L$ having a value of 1, and thereby the count data COUNT sequentially changes to a value of 1 from a value of 5 by jumping over a value 0 after the end pulse signal END rises.

An OR circuit 50 receives the end pulse signal END and an output signal from the OR circuit 42 and provides an output signal to a flip-flop circuit (F/F) 52.

In response to this output signal, the flip-flop circuit (F/F) 52 rises in signal level for the leading two frame cycles of the first group of frames and for the leading one frame cycle of each subsequent group of frames. In this embodiment, the output signal of the flip-flop circuit (F/F) 52 is used as a group of frame index GOF (FIG. 5(G)).

According to the count data COUNT, read only memory circuits (ROM) 54, 56 and 58 construct the forward prediction reference index PID, the backward prediction reference index NID and the temporary index TR (FIGS. 5(H), (I) and (J)), respectively.

More specifically, the read only memory circuit 54 outputs a forward prediction reference index PID value 0 when the count data COUNT has a value 1, 2 or 3, a forward prediction reference index PID value 3 when the count data has a value 4 or 5, and does not output a forward prediction reference index PID when the count data COUNT has a value 0.

The read only memory circuit 56 outputs a backward prediction reference index NID value 0 when the count data COUNT has a value 1, 4 or 5, a backward prediction reference index NID value 3 when the count data COUNT has a value 2 or 3, and does not output a backward prediction reference index NID when the count data COUNT has a value 0.

The read only memory circuit 58 outputs a temporary index TR having a value 0, 3, 1, 2, 4, 5 when the count data COUNT has a value 0, 1, 2, 3, 4, 5, respectively.

Thus, in response to each of the frames, there are provided the forward prediction reference index PID and the backward prediction reference index NID, which are referred to during intraframe coding and interframe coding, and temporary index TR representing the order of the frame in the group of frames.

A counter circuit 60 controls the write timing of memory circuits 61–65 according to an output signal of the OR circuit 42 and thereby the frames are sequentially loaded in the memory circuits 61 to 65.

More specifically, the memory circuit 61 is held in a writing mode during a period of time that the fourth frame B3, B9, ... of each group of frames is input whereas the memory circuit 62 is held in a writing mode while the second frame C1, C7 ... is input.

Similarly, the memory circuits 63, 64 and 65 are held in a writing mode while the third, the fifth and the sixth frames C2, C8 ..., C4, C10 ..., C5, C11 ... are input, respectively.

The memory circuit 66 is placed in a writing mode when the start pulse signal ST rises and hence stores the data of frame A0 immediately after the start pulse signal ST rises.

A selecting circuit 68 is actuated on the basis of the delayed start pulse signal DST output from the delay circuit 48. When the delayed start pulse signal DST rises, the selecting circuit 68 outputs the frame data A0 stored in the memory circuit 66 to an input terminal of a selecting circuit 70 whereas when the delayed start pulse signal DST falls, the selecting circuit 68 directly outputs picture data $D_V$, input to the reordering circuit 4, to the selecting circuit 70.

The selecting circuit 70 receives the frames output from the selecting circuit 68, and the frames stored in the memory circuits 61 to 65, and selectively and sequentially outputs them according to count data COUNT, so that the frames input to the reordering circuit 4 are reordered in the order of frames to be to intraframe coded and interframe coded and are then output.

(2-3) Motion Vector Detecting Circuit

As illustrated in FIGS. 6(1A), 6(1B), 6(2A) and 6(2B). and in FIGS. 7(A)–7(U), the motion vector detecting circuit 6 processes the picture data $D_{VN}$, output from the reordering circuit 4, with reference to the forward prediction reference index PID, backward prediction reference index NID and temporary index TR (FIGS. 7(A), (B) and (C)).

More specifically, in the motion vector detecting circuit 6, read only memory circuits 72 and 73 receive the forward prediction reference index PID and the backward prediction reference index NID, respectively, and generate switching control data SW1 and SW2 (FIGS. 7(D) and (E)) whose logic levels fall when the forward prediction reference index PID and the backward prediction reference index NID have a value of 3, respectively.

A read only memory circuit 74 receives the temporary index TR and generates intraframe coding processing control data PINTRA (FIG. 7(F)) whose logic level rises when the temporary index TR has a value of 0 (corresponding to frame data to be intraframe coded).

Similarly, read only memory circuits 75, 76, 77, 78 and 79 generate interframe coding processing control data WB3, WC1, WC2, WC4 and WC5 whose logic levels rise when the temporary index TR has a value 3, 1, 2, 4 and 5 (corresponding to frame data B3, C1, C2, C4 and C5 to be interframe coded), respectively.

A delay circuit 80 delays the interframe coding processing control data WC5 and generates switching control data BON (FIG. 7(G)) whose logic level rises at the leading frame of each group of frames except for the first group of frames.

An OR circuit 82 receives the interframe coding processing control data WC5 and the intraframe coding processing control data PINTRA to generate frame memory control data WAP (FIG. 7(H)).

The motion vector detecting circuit 6 operates on the basis of the foregoing control data generated in the read only memory circuits 72–79, the delay circuit 80 and the OR circuit 82.

A blocking circuit 84 receives the picture data $D_{V(IN)}$ (FIG. 7(J)), which are sequentially input synchronously with the frame pulse signal $S_{FP}$ (FIG. 7(I)) to separate each frame of data into predetermined macro unit blocks.

As shown in FIG. 8(A), each frame of data is divided by 5 vertically and by 2 horizontally as viewed on a display screen to produce 10 groups of block units (FIG. 8(B)).

Furthermore, each group of block units is divided by 3 vertically and by 11 horizontally to produce 33 groups of macro units (FIG. 8(C)). The transmission unit 1 sequentially processes the frames of data in groups of macro units.

In one group of macro units, the picture data of pixels in eight columns and eight rows are assigned to one block, and six blocks of picture data in total are assigned to each macro unit.

Luminance signals $Y_1$, $Y_2$, $Y_3$ and $Y_4$ in a group of $2\times 2$ blocks comprise four of the six blocks whereas chrominance signals $C_R$ and $C_B$ which correspond to the luminance signals $Y_1$, $Y_2$, $Y_3$, and $Y_4$ are allocated to the remaining two blocks.

Thus, a frame of data which is divided into $15\times 22$ macro unit blocks through the blocking circuit 84 is obtained.

A delay circuit 85 outputs the data which are output from the blocking circuit 84, with a delay of five frame cycles necessary for motion vector detection processing.

In the motion vector detecting circuit 6, picture data $D_{V(OUT)}$ (FIG. 7(K)) are produced which are divided into macro unit blocks and output synchronously with the detection of motion vectors.

A delay circuit 86 delays the frame group index GOF (IN) (FIG. 7 (L)) by five frame cycles and thereby outputs a frame group index GOF (OUT) (FIG. 7 (M)) which coincides with the picture data $D_V$(OUT) output from the motion vector detecting circuit 6.

A backward prediction frame memory circuit 88, forward prediction frame memory circuit 89 and interframe memory circuit 90 store respective frames of data which are referred to for detecting motion vectors.

More specifically, the backward prediction frame memory circuit 88 is controlled to enter picture data $D_V$ into it when interframe coding processing control data PINTRA rises, and thereby picture data DNV is obtained through the backward prediction frame memory circuit 88. In the picture data $D_{NV}$, the data of frame A0 is output for one frame cycle, then the data of frame A6 continues for the subsequent 6 frame cycles, and thereafter the data of frame A12 continues for a subsequent 6 frame cycles (FIG. 7 (N) 20).

The forward prediction frame memory circuit 89 is controlled to enter a frame of data which is output from the backward prediction frame memory circuit 88 when the frame memory control data WAP rises.

By this operation, picture data $D_{PV}$ is obtained through the forward prediction frame memory circuit 89, the picture data $D_{PV}$ containing the frame of data A0 continuing for the first: five of six frame cycles in which frame A6 is output from the backward prediction frame memory circuit 88, frame A6 then being provided for the subsequent 6 frame cycles, and frame A12 thereafter being provided for a subsequent 6 frame cycles (FIG. 7 (0)).

The interframe memory circuit 90 is controlled to receive picture data $D_{VN}$ when the interframe coding processing control data WB3 rises.

By this operation, picture data $D_{INT}$ is obtained through the interframe memory circuit 90, the picture data $D_{INT}$ including the data of the fourth frames B3, B9 and B15 each continuing for six frame cycles (FIG. 7 (P)).

Selection circuits 92 and 93 receive the picture data $D_{NV}$ and $D_{INT}$, $D_{PV}$ and $D_{INT}$ and switch their contacts according to switching control data SW1 and SW2, respectively.

By this operation, the selection circuits 92 and 93 output the data of frames A0, A6, B3 ..., which are referred to for detecting motion vectors, to variable reading memory circuits 94 and 95 by sequentially switching.

More specifically, in detecting motion vectors MV3N and MV3P of frame B3, frames A6 and A0 are output to variable reading memory circuits 94 and 95, respectively.

In processing at level 2, the data of frames B3 and A0 are output to variable reading memory circuits 94 and 95 when the motion vectors MV1N, MV1P and MV2N, MV2P of frames C1 and C2 are detected, respectively; and the data of frames A6 and B3 are output to variable reading memory circuits 94 and 95 when motion vectors MV4N, MV4P and MV5N, MV5P of frames C4 and C5 are detected, respectively.

When the motion vector of frame C1 is detected within a range of pixels in 8 columns and 8 rows, for example, with reference to reference frame A0, to detect the motion vector of frame C2 it is necessary to detect it within a range of pixels in 16 columns and 16 rows with reference to frame A0.

Similarly, to detect motion vectors of frames C4 and C5 with reference to frame A6, it is necessary to detect them within a range of pixels in 16 columns and 16 rows and pixels in 8 columns and 8 rows, respectively.

Thus, for processing at level 2 it is necessary to detect a moving vector within a maximum range of pixels in 16 columns and 16 rows.

On the other hand, to detect the motion vector of frame B3 with reference to frames A0 and A6, it is necessary to detect it within a range of pixels in 24 columns and 24 rows.

Consequently, when data are divided in groups of predetermined frames, and when the data in each group of frames is interframe coded and then transmitted, the motion vector detecting range of the motion vector detecting circuit 6, becomes very large and hence it is likely that the motion vector detecting circuit 6 will become complicated.

To avoid this, in this embodiment the motion vectors at level 2 are first detected, and then the motion vector detecting range of the frame data B3 is set with reference to the result of the detection. Thus, the overall structure of the motion vector detecting circuit 6 is simplified.

Figure 25:
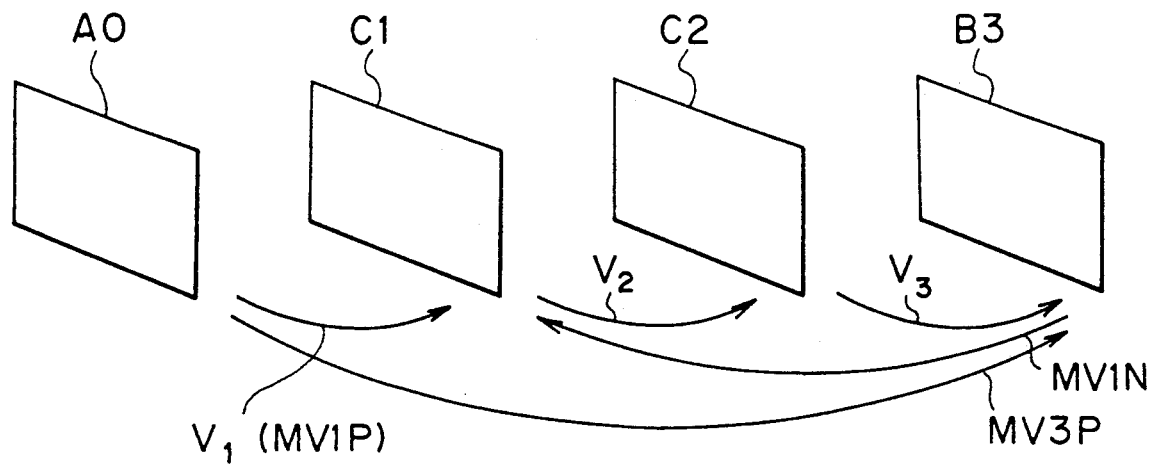
FIGS. 25 and 26 are diagrammatic views showing the principle of detection of a motion vector.
Figure 26:
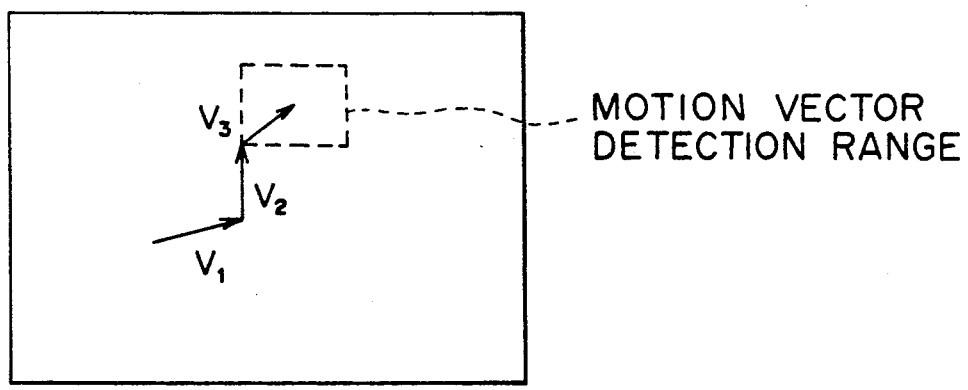

More specifically, as shown in FIGS. 25 and 26, with respect to each frame C1 and C2 from frame A0 to frame B3, motion vectors $V_1$, $V_2$, $V_3$ are sequentially detected, and the sum $V_1+V_2+V_3$ of the motion vectors $V_1$, $V_2$ and $V_3$ is detected.

Then, a motion vector detection range of frame B3 is set having a central position, shifted by the sum vector $V_1+V_2+V_3$, and a motion Vector MV3P is detected within the motion vector detection range.

In this manner, the motion vector MV3P can be detected within a small motion vector detection range.

In this embodiment, the forward prediction and backward prediction motion vectors are detected to detect the motion vectors at level 2, and motion vectors MV1P and MV1N of frame C1 are detected. Thus, the motion vector MV3P can be detected within a small motion vector detection range having a central position offset by the motion vectors MV1P and MV1N.

A selection circuit 96 provides frames C1, C2, C4 and C5 which are to be processed at level 2 to subtraction circuits $KN_0$-$KN_{255}$ and $KP_0$-$KP_{255}$.

On the other hand, in processing at level 1, the selection circuit 96 switches the contact to provide the data of frame B3, which is once stored in the interframe memory circuit 90, to the subtraction circuits $KN_0$-$KN_{255}$ and $KP_0$-$KP_{255}$ through a blocking circuit 97.

The blocking circuit 97 divides frame B3 into macro unit blocks and outputs them as in the case of blocking circuit 84, and thereby the blocking circuit 97 provides the data of frame B3 for every macro unit block to the subtraction circuits $KN_0$-$KN_{255}$ and $KP_0$-$KP_{255}$.

Thus, motion vectors are sequentially detected for frames C1, C2, C4 and C5, and then a motion vector is detected for frame B3.

The selection circuits 92 and 93 switch their contacts according to the motion vector detection sequence and sequentially output the data of frames B3 and A0, B3 and A0, A6 and B3, A6 and B3 to variable reading memory circuits 94 and 95 when the frames C1, C2, C4 and C5 are input to the motion vector detecting circuit 6. Then, frames A6 and A0 are output during the subsequent frame cycle.

The substraction circuits $KN_0$-$KN_{255}$ and $KP_0$-$KP_{255}$ include 256×2 subtraction circuits connected in parallel which sequentially input picture data of the luminance signal from each macro unit block.

The variable reading memory circuits 94 and 95 output frames which are input through the selection circuits 92 and 93, in a parallel manner to the subtraction circuits $KN_0$-$KN_{255}$ and $KP_0$-$KP_{255}$ according to control data $D_M$ output from a vector generating circuit 98.

When processing at level 2, the first picture data of the first macro unit block is input to the subtraction circuits $KN_0$-$KN_{255}$ and $KP_0$-$KP_{255}$, the variable reading memory circuits 94 and 95 output picture data to the subtraction circuits $KN_0$-$KN_{255}$ and $KP_0$-$KP_{255}$, the picture data being within a range of pixels in 16 columns and 16 rows about the first picture data (that is, picture data within the motion vector detecting range).

Similarly, when the second picture data of the first macro unit block is input to the subtraction circuits $KN_0$–$KN_{255}$ and $KP_0$–$KP_{255}$, variable reading memory circuits 94 and 95 output picture data, within a range of pixels in 16 columns and 16 rows about the second picture data selected from the data of the predictive frame, to the subtraction circuits $KN_0$–$KN_{255}$ and $KP_0$–$KP_{255}$.

In processing at level 2, the variable reading memory circuits 94 and 95 sequentially output picture data within the motion vector detecting range determined with respect to picture data input to the subtraction circuits $KN_0$–$KN_{255}$ and $KP_0$–$KP_{255}$.

Thus, in level 2 processing, difference data, which is given in displacement of the prediction vector in the motion vector detecting range, can be obtained for each of the picture data in a frame of data to detect the motion vector through the subtraction circuits $KN_0$–$KN_{255}$ and $KP_0$–$KP_{255}$.

On the other hand, in processing at level 1, the variable reading memory circuits 94 and 95 output picture data to the subtraction circuits $KN_0$–$KN_{255}$ and $KP_0$–$KP_{255}$, the picture data being within a range of pixels in 16 columns and 16 rows about picture data and displaced a predetermined amount from the picture data which has been input to the subtraction circuits $KN_0$–$KN_{255}$ and $KP_0$–$KP_{255}$ based upon the results of the detection of frames C1 and C2, C4 and C5.

Thus, in processing at level 1, difference data, which are given in displacement of the predicted frame, can be obtained within the motion vector detecting range for each of the picture data of frame B3 through the subtraction circuits $KN_0$–$KN_{255}$ and $KP_0$–$KP_{255}$, the motion vector detecting range being shifted a predetermined amount.

Absolute value summing circuits 100 and 101 receive subtraction data from each of the subtraction circuits $KN_0$–$KN_{255}$ and $KP_0$–$KP_{255}$ and detect a sum of the absolute values of the subtraction data from each of the subtraction circuits $KN_0$–$KN_{255}$ and $KP_0$–$KP_{255}$, and then the absolute value summing circuits 100 and 101 output the sum of the absolute values for each macro unit block.

Thus, in level 2 processing, 256 (16×16) difference data are obtained for each macro unit block, the difference data being produced through absolute value summing circuits 100 and 101 when the predicted frames are subsequently displaced within the motion vector detecting range about the macro unit block shifted a predetermined amount.

On the other hand, in processing at level 1, 256 difference data are obtained for each macro unit block, the difference data being produced with reference to the macro unit block when the predicted frame is subsequently displaced within the motion vector detecting range shifted a predetermined amount.

Comparison circuits 102 and 103 receive 256 difference data output from the absolute value summing circuits 100 and 101 summing circuits 100 and 101 output difference data $D_{OON}$ and $D_{OOP}$ of the difference data to comparison circuits 105 and 106, the difference data $D_{OON}$ and $D_{OOP}$ being produced when picture data of the predicted frame is vertically and horizontally displaced by 0 pixel (that is, when the predicted frame is not moved).

Moreover, the comparison circuits 102 and 103 detect and output minimum values among the remaining difference data as error data ER($ER_N$ and $ER_P$) as well as detect position information of the minimum difference data.

Thus, the position information to displace the predicted frame so as to minimize the difference data can be detected through the comparison circuits 102 and 103, and thereby motion vectors can be sequentially detected about each macro unit block.

The error data ER ($ER_N$ and $ER_P$) can be judged so that the larger its value is, the greater the picture changes in each macro unit block.

Thus, it is possible to judge according to the error data ER whether or not the region moved.

The error data ER becomes larger in value at outlines and boundary portions.

Thus, the nature of the picture can be reflected by the error data ER which is employed in the requantizing process by switching the size of the quantization interval under the control of the data amount control circuit 20 by reference to the error data ER, and thereby video signals can be transmitted so that deterioration of picture quality is effectively avoided.

It is considered that the higher the spatial frequency is, the larger the error data ER becomes.

Accordingly, video signals can be highly efficiently transmitted while effectively avoiding deterioration of picture quality by weighting the result of transformation according to the error data ER in the multiplication circuit 14, the transformation result being output from the discrete cosine conversion circuit 12.

Thus, the nature of the picture can be reflected in the requantizing process by switching the size of the quantization interval by means of the requantizing circuit 18 on the basis of the error data ER and by controlling weighting processing of the multiplying circuit 14, and thereby video signals can be transmitted while effectively avoiding a deterioration of picture quality.

It is possible to detect positional information to move predicted frames so as to minimize difference data with reference to a minimum difference data, and hence motion vectors can be sequentially detected with respect to each macro unit block.

The comparison circuits 105 and 106 provide outcomes to the comparisons between the error data $ER_N$, $ER_P$ and difference data $D_{OON}$, $D_{OOP}$, respectively.

During these operations, the comparison circuits 105 and 106 convert the error data $ER_N$, $ER_P$ and the difference data $D_{OON}$, $D_{OOP}$ to an amount of error and differences per pixel as represented by the following equations $$x = \frac{D_{OON}(D_{OOP})}{256} \quad (1)$$

$$y = \frac{ER_N(ER_P)}{256} \quad (2)$$

and in a range where the amount of error and difference are small, a 0 vector is preferentially selected as the motion vector.

When in a range having a small amount of error and difference, difference data .EN and .EP (FIG. 1) are generated with reference to the motion vectors, detected in the comparison circuits 102 and 103, the amount of data of the difference data .EN and .EP does not become considerably small as compared to the case where difference data .EN and .EP are generated on the basis of a 0 vector, and the total amount of data increases because of the transmission of the motion vector as significant information.

Thus, in this embodiment, video signals are as a whole efficiently transmitted by preferentially selecting a 0 vector as a motion vector in the comparison circuits 105 and 106

Figure 9:
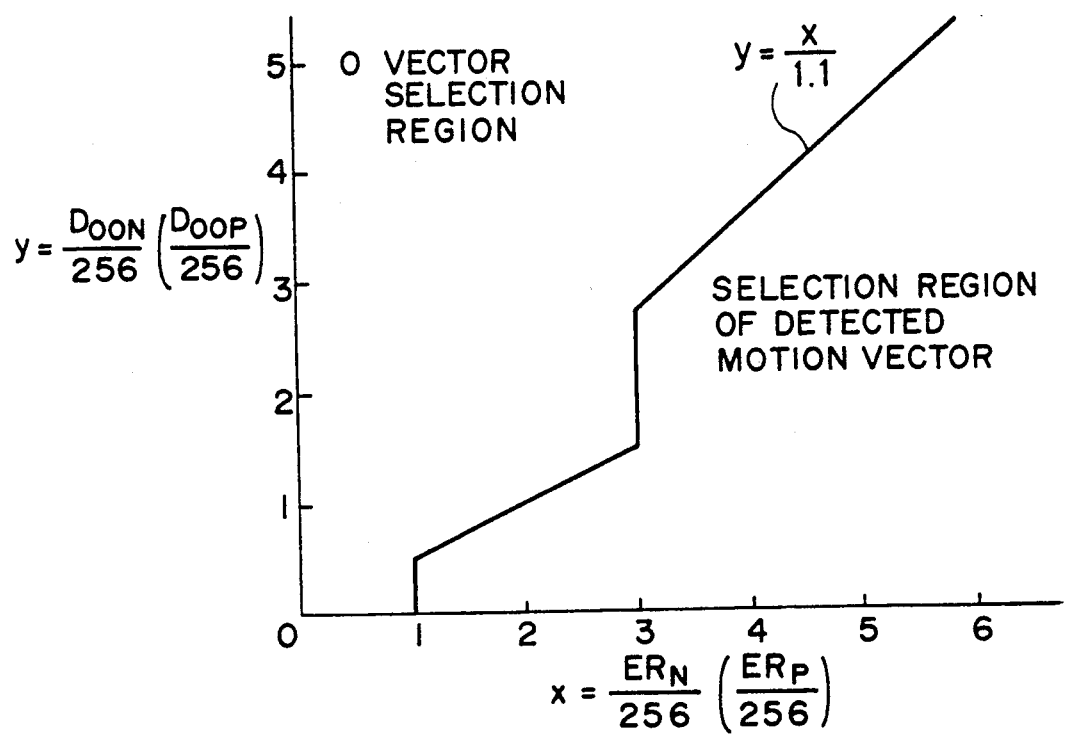
FIG. 9 is a characteristic graph showing priority detection of a motion vector.

The comparison circuits 105 and 106 switch the contacts of the selection circuits 107 and 108 by outputting switching signals to selectively output a 0 vector $MV_0$ or the detected motion vectors output from the comparison circuits 102 and 103 according to the criteria illustrated in FIG. 9, and thereby motion vectors MViN and MViP (FIGS. 7(Q) and 7(R)) can be obtained through the selection circuits 107 and 108.

Motion vector memory circuits 110–113 and 114–117 enter motion vectors MViN and MViP in response to interframe coding processing control data WC1, WC2, WC4, WC5 and thereby input motion vectors MV1N, MV2N, MV4N, MV5N and MV1P, MV2P, MV4P and MV5P for forward prediction or backward prediction with respect to frames C1, C2, C4, C5 which are processed at level 2.

On the other hand, adding circuits 120–122 and 123–125 receive motion vectors MV1N, MV2N, MV4N, MV5N and MV1P, MV2P, MV4P, MV5P, which have been stored in the motion vector memory circuits 110–113 and 114–117 and output the sum of the motion vectors MV1N, MV1P, MV2N, and MV2P and the sum of the motion vectors MV4N, MV4P, MV5N and MV5P to halving circuits 127 and 128, respectively.

In this embodiment, motion vectors at level 2 are first detected, and then with reference to the result of this detection motion vectors are detected within a maximum range in 16 columns and 16 rows by previously setting the motion vector detecting range for the data of frame B3. Thus, the overall structure of the motion vector detecting circuit 6 is simplified.

To do so, the adding circuits 120–125 and halving circuits 127 and 128 obtain ½ of the results of the summation of motion vectors MV1N–MV5P, and thereby predicted motion vectors MV3NY and MN3PY which are represented by the following equations are produced:

$$MV3NY = \frac{1}{2} \cdot \{(MV1N - MV1P) + (MV2N - MV2P)\} \quad (3)$$

$$MV3NP = \frac{1}{2} \cdot \{(-MV4N + MV4P) + (-MV5N + MV5P)\} \quad (4)$$

Then, the predicted motion vectors MV3NY and MV3PY are output to adding circuits 132 and 133 through selection circuits 130 and 131.

The selection circuits 130 and 131 switch their contacts in response to switching control data BON and thereby selectively output data $D_{ON}$ and $D_{OP}$ having a value of 0 for frames C1, C2, C4 and C5 to be processed in level 2 and predictive motion vectors MV3NY and MV3PY for frame B3 to be processes in level 1.

Adding circuits 132 and 133 add output data MV3NY, $D_{ON}$ and MV3PY, $D_{OP}$ from the selection circuits 130 and 131 to the control data $D_M$ output from the vector generating circuit 98.

Therefore, the motion vector is detected in the motion vector detecting region about each macro unit block with reference to the data of frames C1, C2, C4 C5, and the motion vector detecting region displaced by the predicted motion vector MV3NY and MV3PY with reference to data of frame B3.

Accordingly, motion vectors between frames A0 and B3, B3 and A6, which are a plurality of frames away from each other, can be positively detected within a small motion vector detection range, and motion vectors can be detected with the use of a simple apparatus.

The motion vector detection range of the forward prediction motion vector MV3P is set by averaging the sum of the forward prediction and backward prediction motion vectors of frames C1, C2, and the motion vector detection range of the backward prediction motion vector MV3N is set by averaging the sum of the forward prediction and backward prediction motion vectors of frames C4, C5. Thus, motion vectors can be positively detected.

With reference to FIG. 6 (2B), adding circuits 135 and 136 add predicted motion vectors MV3NY and MV3PY to motion vectors output from selection circuits 107 and 108 at level 1 processing, so that motion vectors MV3P and MV3N are obtained. Thus, motion vectors MV3N and MV3P between frames far away from each other are obtained with a simple apparatus as a whole.

A counter circuit 138 is composed of quinary counter circuit which sequentially counts frame pulse signals $S_{FP}$ after it is cleared by interframe coding processing control data WC5, and the counter circuit 138 outputs motion vector selection data MVSEL (FIG. 7 (S)) which sequentially circulates from value 0 to value 4.

Selection circuits 139 and 140 sequentially switch their contacts in response to the motion vector selection data MVSEL and thereby selectively output motion vectors MV3N and MV3P from the adding circuits 135 and 136, and motion vectors MV1N to MV5P stored in motion vector memory circuits 110 to 117. Thus, motion vectors MVN and MVP (FIGS. 7 (T) and (U)) can be sequentially obtained through the motion vector detecting circuit 6.

(2-4) Run-length-Huffman Encoding Circuit

Figure 27:
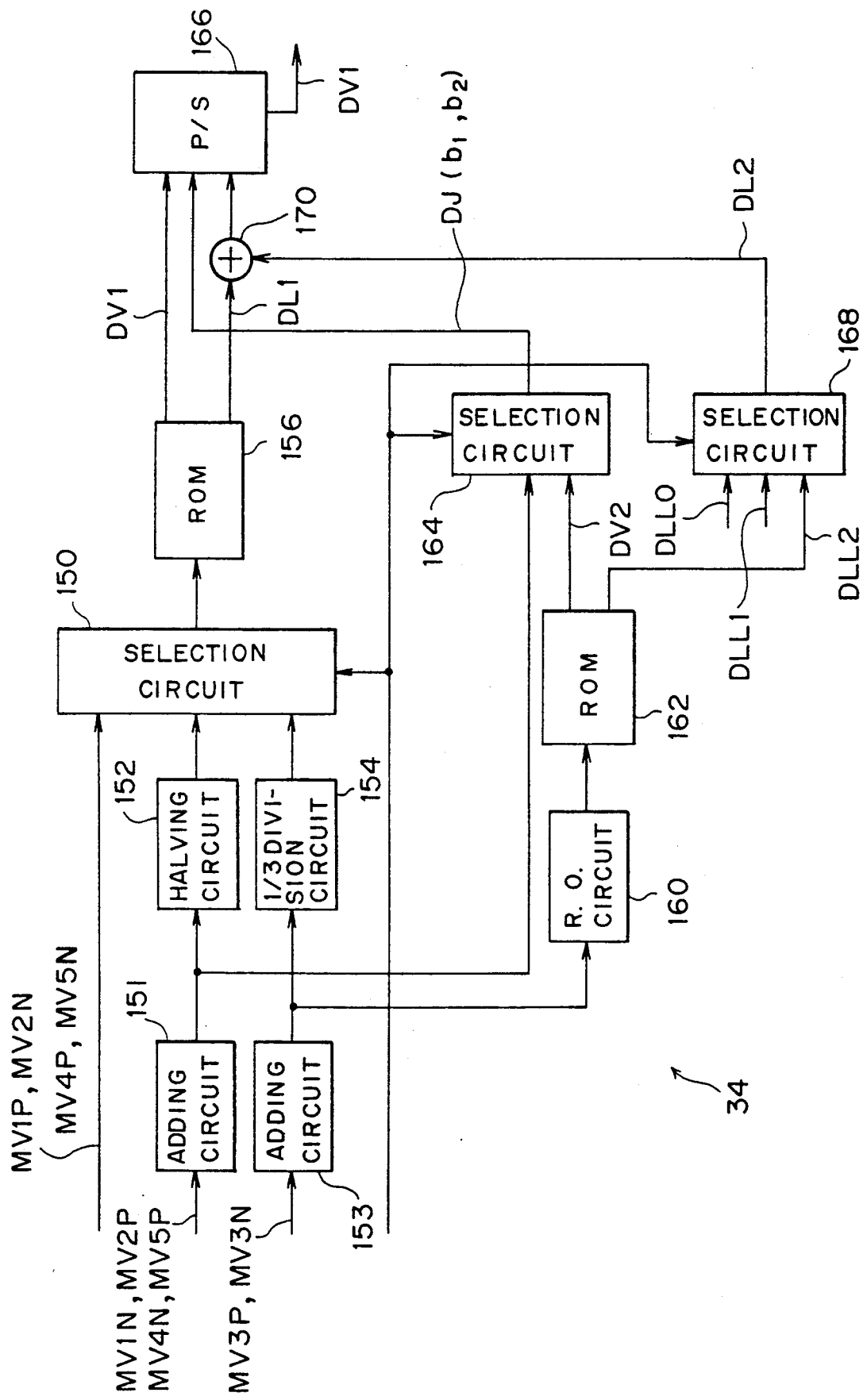
FIG. 27 is a block diagram of a run-length-Huffman encoding circuit.

As shown in FIG. 27, the run-length-Huffman encoding circuit 34 provides forward prediction motion vectors MV1P, MV4P, of frames C1, C4 and backward prediction motion vectors MV2N, MV5N of frames C2, C5 (that is, motion vectors which are detected by using the data of frames A0, B3, A6 as reference frames and hereinafter referred to as single vectors to a selection circuit 150.

An adding circuit 151 receives backward prediction motion vectors MV1N, MV4N of frames C1, C4 and forward prediction motion vectors MV2P, MV5P of frames C2, C5 (that is, motion vectors of frames which are two frames separated from frames A0, B3, A6 and hereinafter referred to as double vectors), and the adding circuit 151 adds a value of 1 to the motion vectors as the output thereof when the values of the latter are positive whereas it subtracts a value of −1 from the motion vectors as the output thereof when the values of the latter are negative.

A halving circuit 152 receives the output of the adding circuit 151, and outputs one half thereof (from which a remainder is removed) to the selection circuit 150.

That is, the adding circuit 151 and the halving circuit 152 convert the motion vectors MV1N, MV4N, MV2P and MV5P to one frame interval motion vectors as the output thereof.

On the other hand, an adding circuit 153 receives motion vectors MV3P and MV3N of frame B3 (that is, motion vectors of frames which are separated by three frames from frames A0, A6 and hereinafter referred to as triple vectors), and the adding circuit 153 adds a value of 2 to the motion vectors as its output when the values of the latter are positive whereas it subtracts a value of −2 from them as its output when the values are negative.

A ⅓ division circuit 154 receives the output from the adding circuit 153 and outputs the result of the ⅓ division, from which a remainder is removed, to the selection circuit 150.

That is, the adding circuit 153 and the ⅓ division circuit 154 convert motion vectors MV3P and MV3N to one frame interval motion vectors and outputs them.

In this manner, the motion vectors which are input to the selection circuit 150 are set at values which are equal to probabilities of their appearance, and thereby each motion vector is optimized with ease.

Figure 28:
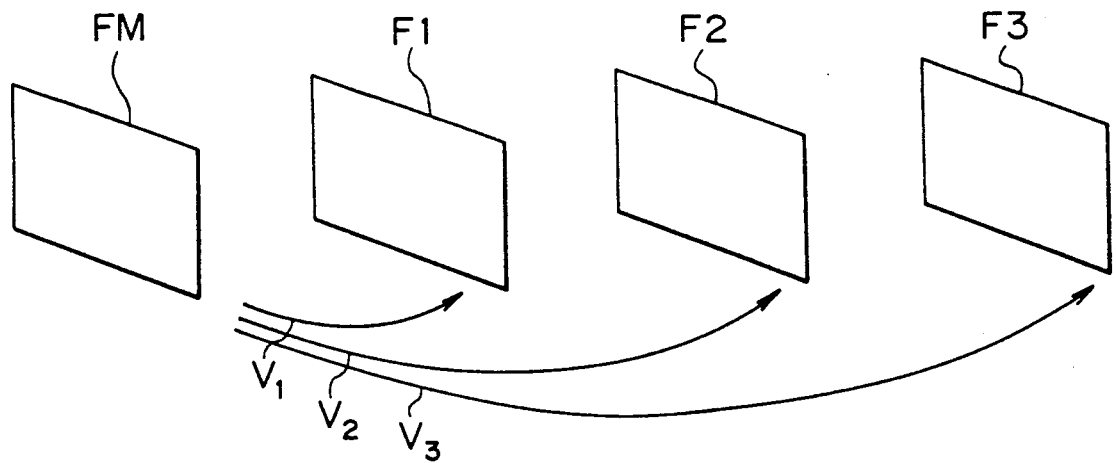
FIG. 28 and 29 are diagrammatic views showing an encoding process for motion vectors.
Figure 29:
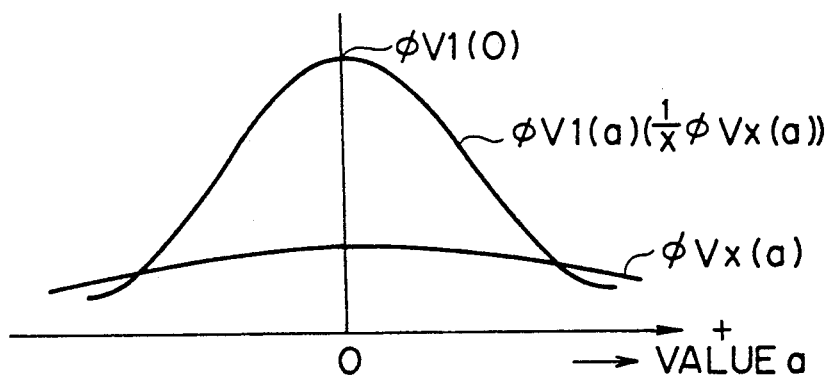
Figure 34:
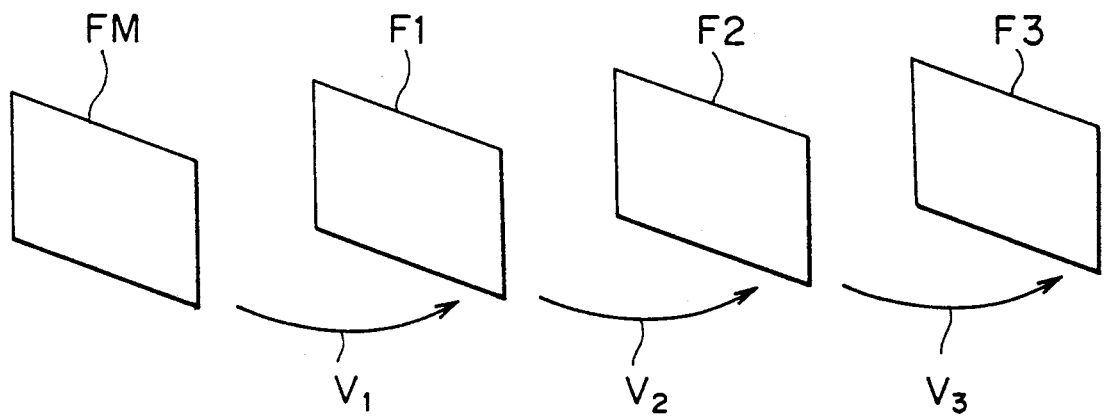
FIGS. 34 and 35 are diagrammatic views illustrating the problem.
Figure 35:
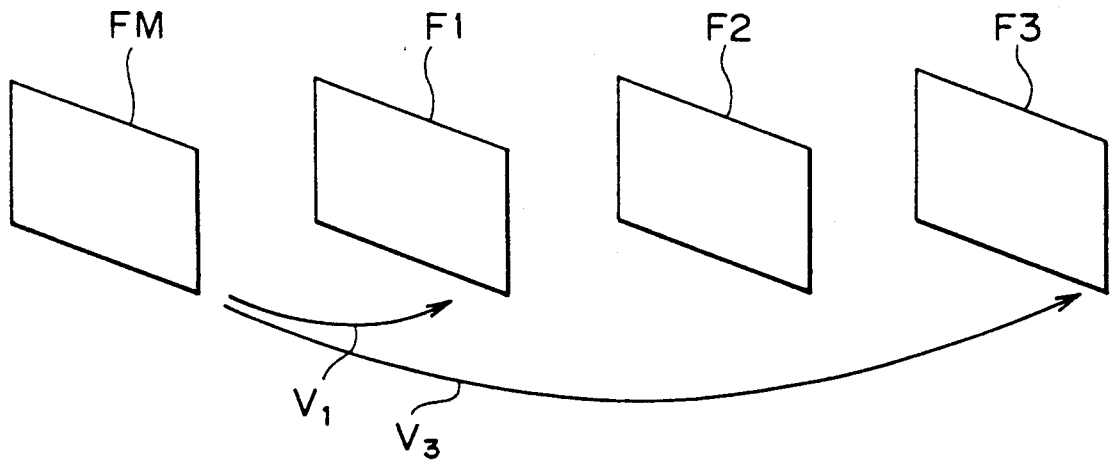

More specifically, as shown in FIG. 28, in sequentially continuous frames FM, F₁, F₂ and F₃, motion vectors V₁, V₂ and V₃ which refer to the frame FM bear the relationships expressed by the following equations when the frames FM, F₁, F₂ and F₃ are strongly correlated:

$$V_2 \approx 2V_1 \tag{5}$$

$$V_3 \approx 3V_1 \tag{6}$$

Accordingly, a motion vector $V_X$ of two frames which are x frames removed from each other is generally represented by the following equation:

$$V_X \approx X V_1 \tag{7}$$

This can be understood from the relationship obtained by expressing the probability $V_X(a)$ of the motion vector $V_X$ by multiplying an appearance probability $\phi V_1(a)$ of the motion vector $V_1$ by x along the horizontal axis when the appearance probability is statistically expressed while the motion vector is represented by a.

Thus, when the motion vector $V_X$ is divided by X with the remainder removed and is then expressed using the value a, it is understood that: the appearance probability $1/X\phi V_X(a)$ of the motion vector $V_X$ is equal to the appearance probability $\phi V_1(a)$ of the motion vector $V_X$ and the motion vector $V_1$ can be optimized by using the same table.

According to this principle, the run-length-Huffman encoding circuit 34 provides a selected output of the selection circuit 150 to a read only memory 156 and outputs a value DV1 stored in the read only memory 156 by using the selected output from circuit 150 as an address.

As illustrated in FIG. 30, the read only memory 156 is designed to output in response to input data variable length codes such that the length of the codes becomes sequentially longer as the input departs from value of 0, and thereby motion vectors which have been converted to one frame interval motion vectors are coded in the optimized manner.

That is, when the values of motion vectors are statistically detected, a motion vector having a value of 0 has the highest appearance probability and the appearance probability becomes smaller as the values of motion vectors become larger.

Thus, in this embodiment, motion vector coding has been carried out so that the motion vectors having a value of 0 have the shortest code table, and thereby the amount of data which is necessary to send motion vectors is, as a whole, reduced, so that motion video signals are efficiently transmitted.

Moreover, the read only memory 156 outputs code length data DL1 representing the code length of the output data DV1 together with the data DV1.

After a remainder output circuit 160 performs division of the output from the adding circuit 153 by a value 3, the remainder data is output to a read only memory circuit 162.

As shown in FIG. 31, the read only memory circuit 162 outputs a remainder DV2 having a value 0 with a code length 1 in response to an input data having a value 0 whereas the read only memory circuit 162 outputs a remainder DV2 having values 10 and 11 with a code length 2 for input data of values 1 and 2.

The input data to the read only memory circuit 162 are remainders from the conversion of triple vectors to one frame interval vectors, the triple vectors having undergone the adding or subtracting operation in the adding circuit 153. Thus, the value 0 has the largest appearance probability, and the appearance probability becomes smaller as the value grows.

Accordingly, in this embodiment, the amount of data necessary for sending motion vectors is reduced as a whole by outputting remainder data DV2 having the shortest code length, and thereby moving picture video signals are efficiently transmitted.

The read only memory circuit 162 outputs code length data DLL2, representing the code length of the remainder data DV2, synchronously with the remainder data DV2.

A selection circuit 164 switches its contacts synchronously with the selection circuit 150 to select and output the least significant bit of the output data from the adding circuit 151 and remainder data DV2.

However, the selection circuit 164 stops the selective outputting with respect to a single vector.

The selection circuit 164 outputs the least significant bit input in response to a double vector. Thus, the selection circuit 164 selectively outputs to a parallel-serial conversion circuit 166 a selected output having a value of 1 when the double vector has an even value whereas it outputs a selected output of a value 0 to the parallel-serial conversion circuit 166 when the double vector has an odd value or a value 0.

The selection circuit 164 outputs the remainder data DV2 in response to a triple vector.

A selection circuit 168 receives input data DLL0 having a value of 0, DLL1 having a value of 1 and code length data DLL2, and the selection circuit 168 outputs code length data DL2 representing a code length of the selected output data DJ output from the selection circuit 164.

An adding circuit 170 adds the code length data DL1 and DL2 and outputs the result to the parallel-serial conversion circuit 166.

As illustrated in FIG. 32, the parallel-serial conversion circuit 166 adds the output data DJ of the selection circuit 164 and the addition data of the adding circuit 170 to the output data DV1 of the read only memory 156 and then converts the resulting data to serial data.

Thus, in response to a single vector, the output data DV1, output from the read only memory 156, and the code length data DL1 of the output data DV1 are converted to serial data and then output through the parallel-serial conversion circuit 166.

In response to a double vector which has an even value, a remainder bit $b_1$ having a value 0 is added to the output data DV1, output from the read only memory 156; an addition data, having a value 1 added to resultant data is then converted to serial data.

When the double vector has an odd value or a value 0, the remainder bit $b_1$ of a value 1 is added to the output data DV1; an addition data, having a value 1 added to the code length data DL1, is further added; and the resultant data is then converted to serial data.

In response to a triple vector which has a value of 0 or a value $\pm(3n+1)$ ($n=0, 1, 2, ...$), a remainder bit $b_1$ of a value 0 is added to the output data DV1; an addition data, having a value 1 added to the code length data DL1, is further added; and the resultant data is then converted to serial data.

When the triple vector has a value $\pm(3n+2)$ ($n=0, 1, 2, ...$), the remainder bits $b_1$ and $b_2$ having values 1 and 0, respectively, are added to the output data DV1; an addition data, having a value 2 added to the code length data DL1, is further added; and the resultant data is then converted to serial data. When the triple vector has a value $\pm(3n+3)$ ($n=0, 1, 2, ...$), the remainder bits $b_1$ and $b_2$ having values 1 and 1, respectively, are added to the output data DV1; an addition data, having a value 2 added to the code length data DL1, is further added; and the resultant data is then converted to serial data.

Thus, on the side of the object to be transmitted it is possible to determine whether or not the data of the motion vector which has been variable length coded is a single, a double or a triple vector with reference to forward prediction reference index PID, backward prediction reference index NID and temporary index TR, and the motion vector can be decoded on the basis of such determination.

Thus, single, double and triple vectors can be variable length coded with a preference to a vector having the highest appearance probability by using the kind of table stored in the read only memory 156, and thereby motion vectors can be optimized with a simple apparatus.

The motion vectors can be transmitted by such coding whose accuracy as detected is maintained, and video signals can be efficiently sent with degradation in picture quality being effectively avoided.

(2-5) Adaptive Prediction Circuit

Figure 10:
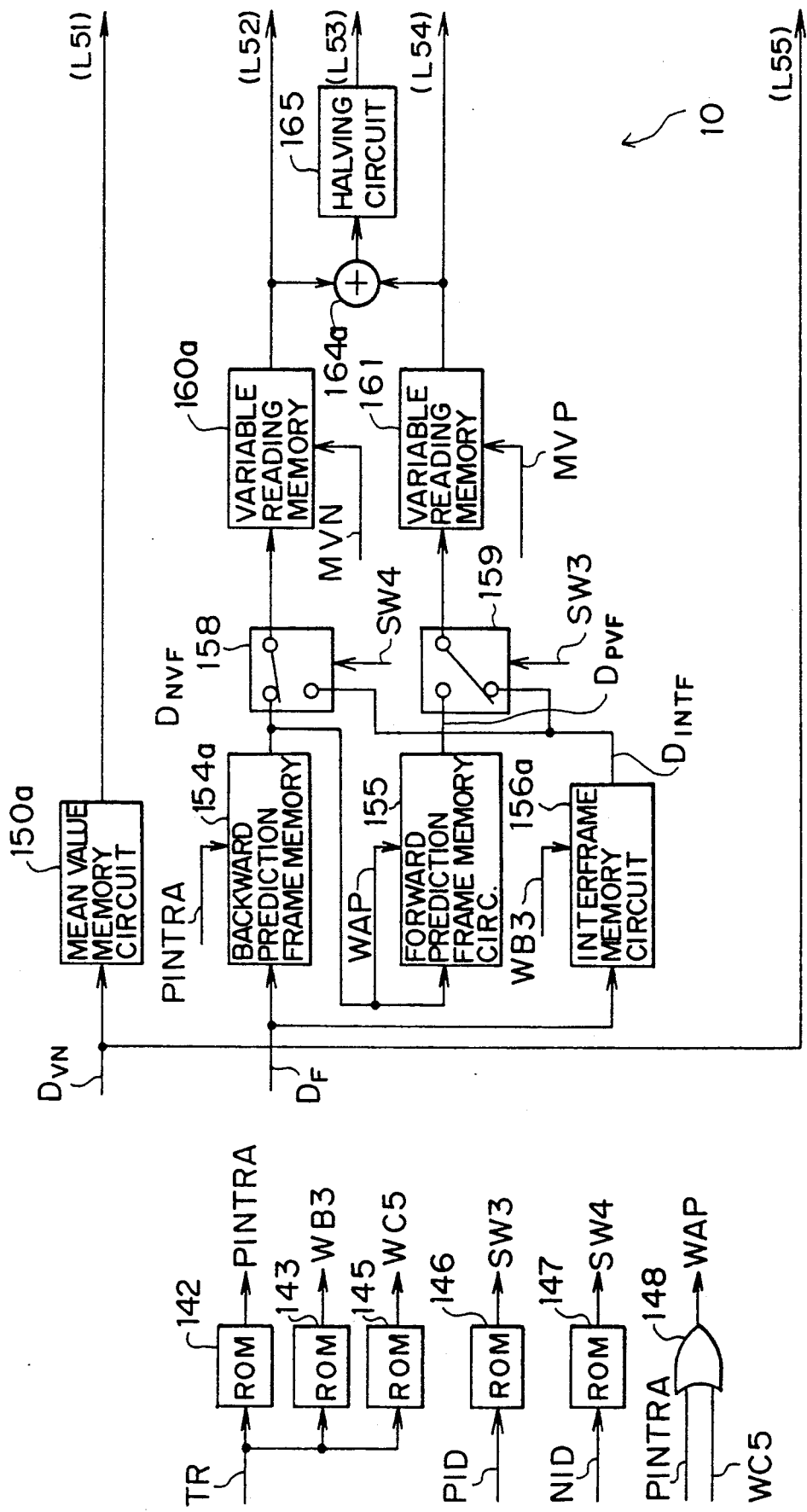
FIGS. 10A and 10B together constitute a block diagram of an adaptive prediction circuit.
Figure 10B:
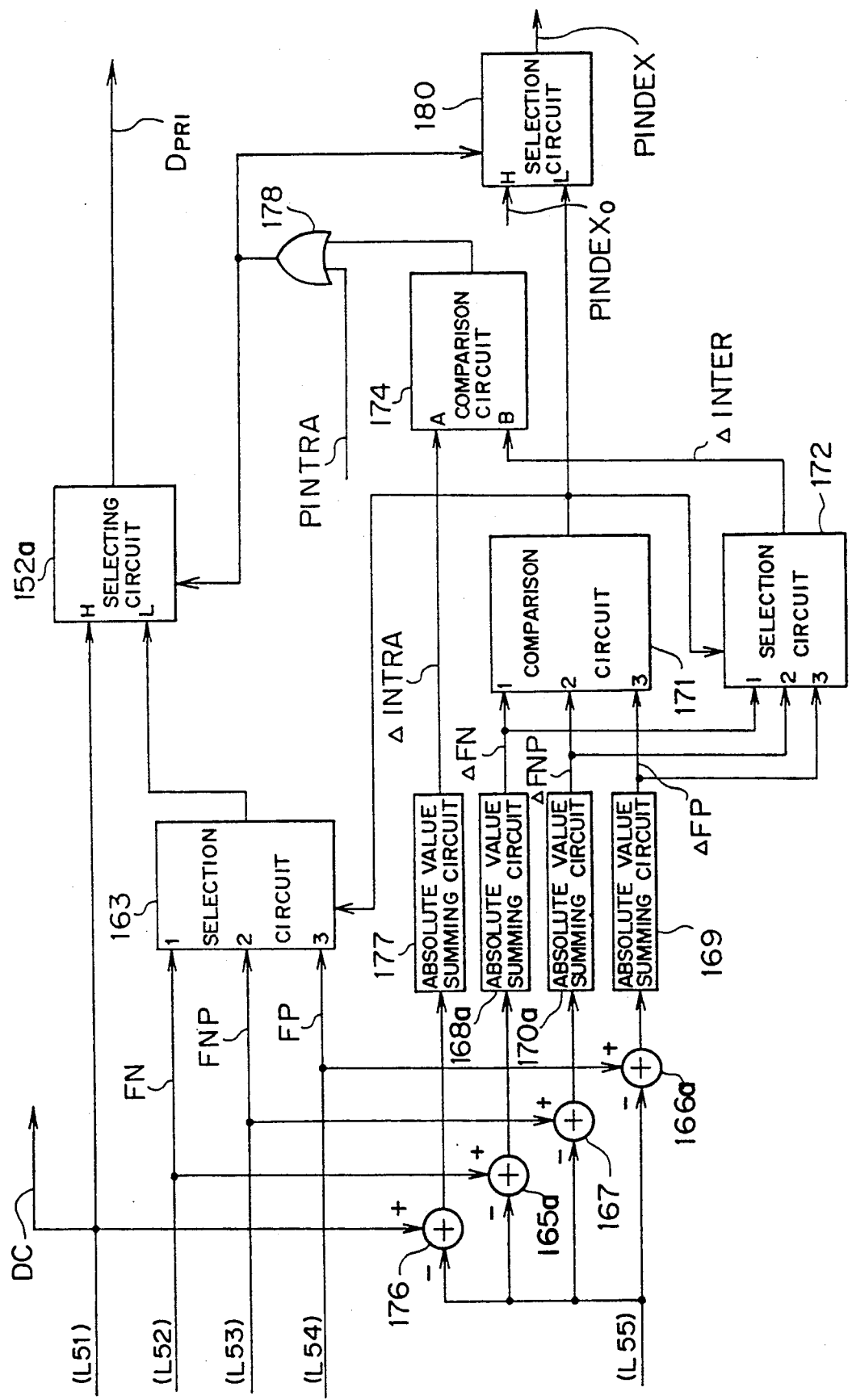

As illustrated in FIGS. 10A and 10B, an adaptive prediction circuit 10 selectively predicts data of frames B3, C1, C2, C4, and C5 with reference to the forward prediction reference index PID, backward prediction reference index NID and temporary index TR.

Figure 11:
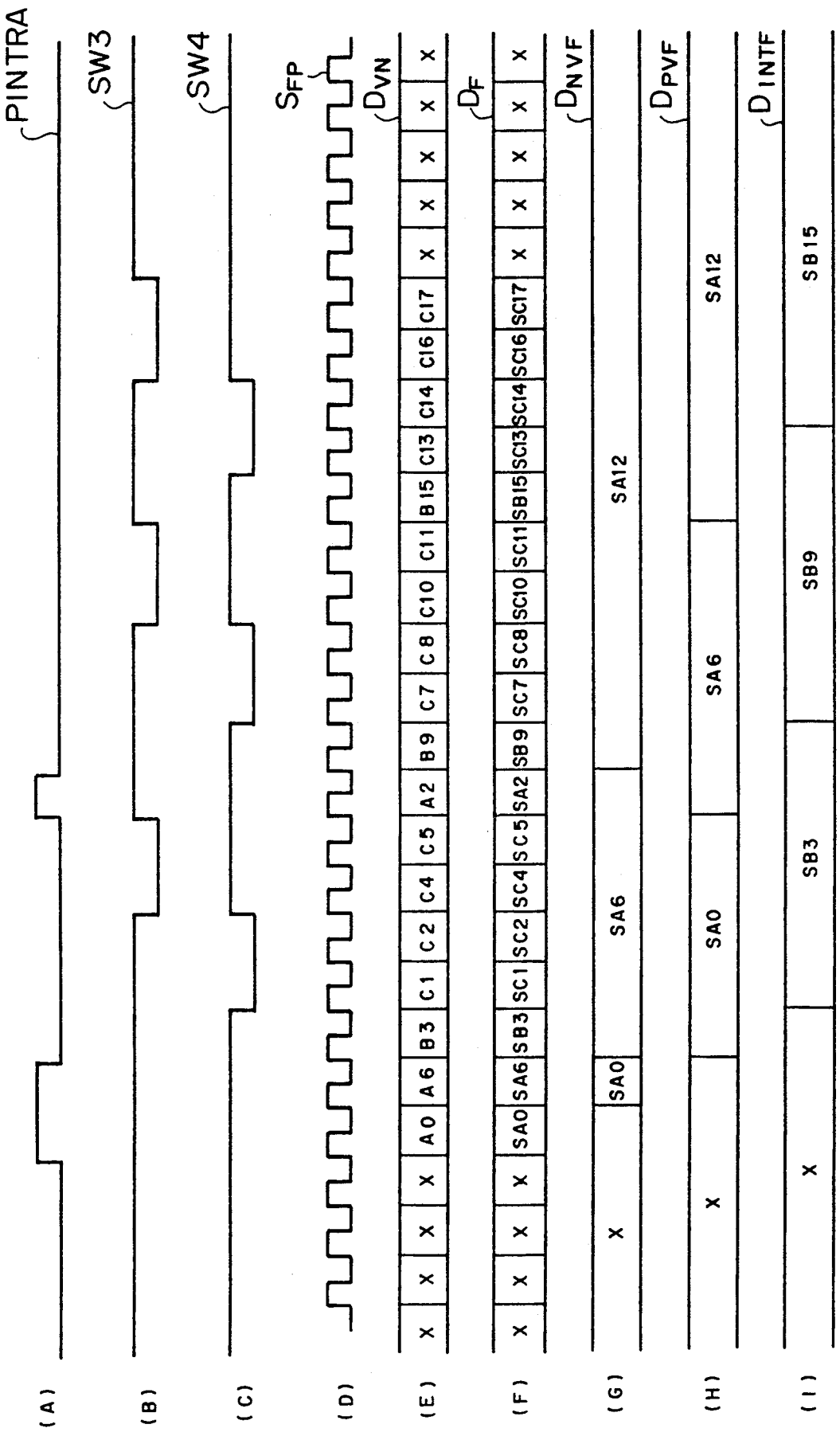
FIG. 11 is a timing diagram showing the operation of the adaptive prediction circuit of FIGS. 10A and 10B.

More specifically, in the adaptive prediction circuit 10 read only memory circuits 142, 143 and 145 receive the temporary index TR as shown in FIG. 10A to generate intraframe coding processing control data PINTRA (FIG. 11(A)), interframe coding processing control data WB3 and WC5, respectively.

Read only memory circuits 146 and 147 receive the forward prediction reference index PID and the backward prediction reference index NID to generate switching control data SW3 and SW4, respectively, (FIG. 11(B) and (C)) whose logic levels fall when the values of the forward prediction reference index PID and the backward prediction reference index NID are 0.

An OR circuit 148 receives intraframe coding processing control data PINTRA and interframe coding processing control data WC5 to produce frame memory control data WAP.

The adaptive prediction circuit 10 is designed to operate on the basis of control data generated in the read only memory circuits 142 to 147 and the OR circuit 148.

A mean value memory circuit 150a receives picture data $D_{FN}$ (FIG. 11(E)), which is output from the motion vector detecting circuit 6 synchronously with the frame pulse signal $S_{FP}$ (FIG. 11(D)), to obtain mean values of picture data of luminance signals and chrominance signals for each macro unit block, and then the mean values are output to the transmission data composition circuit 32 (FIG. 3) as direct current data DC.

In addition, the mean value memory circuit 150a outputs direct current data DC of frame data A0, A6, ... as predicted data $D_{PRI}$ to the subtracting circuit 8 (FIG. 3) through a selecting circuit 152a when frames A0, A6, ... are input to be intraframe processed.

Thus, difference data $D_Z$ representing the differences between frames A0, A6, ... and the mean values thereof are thus obtained through the subtracting circuit 8, and after subsequently being data compressed through the discrete cosine transformation circuit 12, the multiplication circuit 14, the requantizing circuit 18 and the run-length Huffman encoding circuit 30, the difference data $D_Z$ is output to the transmission data composition circuit 32.

On the other hand, a backward prediction frame memory circuit 154a, forward prediction frame memory circuit 155 and interframe memory circuit 156a receive picture data $D_F$ (FIG. 11(F)), reconstructed in the adding circuit 28, and store the data of predicted frames which serve as references for backward and forward prediction.

That is, the backward prediction frame memory circuit 154a enters picture data D; when intraframe coding processing control data PINTRA rises.

Thus, through the backward prediction frame memory circuit 154a, there can be provided picture data $D_{NVF}$ (FIG. 11(G)) in which after frame SA0 which is reconstructed for one frame cycle is output, frame SA6 similarly reconstructed continues for a subsequent 6 frame cycles, and then frame SA12 reconstructed lasts for subsequent 12 frame cycles.

On the other hand, the forward prediction frame memory circuit 155 enters a frame of data which is output from the backward prediction frame memory circuit 154a when the frame memory control data WAP rises.

Thus, through the forward prediction frame memory circuit 155, there can be provided picture data $D_{PVF}$ (FIG. 11(H)) in which the reconstructed frame SA0 lasts for the first 5 frame cycles among 6 frame cycles, during which reconstructed frame SA6 is output from the backward prediction frame memory circuit 154. The reconstructed frame SA6 continues for a subsequent 6 frame cycles, and then the reconstructed frame SA12 lasts for a further 12 frame cycles.

The interframe memory circuit 156a enters picture data $D_F$ into it when interframe coding control data WB3 rises.

In this manner, picture data $D_{INTF}$ (FIG. 11(I)) is obtained through the interframe memory circuit 156a, the picture data $D_{INTF}$ including reconstructed fourth frames SB3, SB9 and SB15 each lasting for 6 frame cycles.

Selection circuits 158 and 159 receive picture data $D_{NVF}$, $D_{INTF}$ and $D_{PVF}$, $D_{INTF}$ and switch their contacts according to switching control data SW4 and SW3, so that frames SA0, SA6, SB3, ... which are referred to for forward and backward prediction are sequentially output to following variable reading memory circuits 160 and 161.

That is, the selection circuits 158 and 159 output reconstructed frames SA6 and SA0 to the variable reading memory circuits 160a and 161 when the fourth frame B3 of the group of frames is input to the adaptive prediction circuit 10.

Then, the selection circuits 158 and 159 output reconstructed frames SB3 and SA0 to the variable reading memory circuits 160a and 161 when the second and the third frames C1 and C2 of the group of frames are input to the adaptive prediction circuit 10 whereas the selection circuits 158 and 159 output reconstructed frames SA0 and SB3 when the fourth and the fifth frames C4 and C5 are input.

Variable reading memory circuits 160a and 161 shift the data of the input frames by the amount of the motion vectors MVN and MVP detected in the motion vector detecting circuit 6 and then output them to a selection circuit 163.

Thus, the data in a backward predicted result frame FN and the data in a forward predicted frame FP (FIG. 1) can be obtained through the variable reading memory circuits 160a and 161 by displacing the reconstructed frames by the distance of the respective motion vector MVN and MVP and by outputting them.

On the other hand, an adding circuit 164a adds frames output from the variable reading memory circuits 160a and 161 and then outputs the added frames to the selection circuit 163 through a halving circuit 165.

Thus, an interpolative predicted result frame FNP (FIG. 1) which linearly interpolates the data of the backward predicted result frame FN and the forward result frame data FP can be obtained through the halving circuit 165.

Subtracting circuits 165a, 166a and 167 subtract frames output from the variable reading memory 160a, the variable reading memory 161 and the halving circuit 165 from the picture data $D_{VN}$, respectively.

Thus, the backward prediction difference data $\Delta FN$, the forward prediction difference data $\Delta FP$ and the interpolative prediction difference data $\Delta FNP$ (FIG. 1) can be obtained for each macro unit block through subtracting circuits 165a, 166a and 167, respectively.

Absolute value adding circuits 168a, 169 and 170a change difference data output from the subtracting circuit 165a, 166a and 167, to absolute values, which are accumulated for each macro unit block and then output.

The amount of data contained in the forward prediction difference data $\Delta FN$, the forward prediction difference data $\Delta FP$ and the interpolative prediction difference data $\Delta FNP$ (FIG. 1) can be detected through absolute value adding circuits 168a, 169 and 170a, respectively.

A comparison circuit 171 receives the sum of absolute values of each of the difference data $\Delta FN$, $\Delta FP$ and $\Delta FNP$ to detect a minimum value thereof.

In addition, the comparison circuit 171 outputs a control signal to the selection circuit 163, and thereby backward predicted result frame data FN, forward predicted result frame data FP or interpolative predicted result frame data FNP of which the difference data $\Delta FN$, $\Delta FP$ or $\Delta FNP$ has a minimum amount of data is selected and output to the selecting circuit 152a.

Thus, in intraframe coding, mean values of frames A0 and A6 are output as predicted data $D_{PRI}$ to the subtracting circuit 8 through the selecting circuit 152 whereas during interframe coding, frames FN, FP or FNP, for which the difference data $\Delta FN$, $\Delta FP$ or $\Delta FNP$ includes a minimum amount of data, is selected for each macro unit block as predicted data $D_{PRI}$ and is output to the subtracting circuit 8.

Thus, the difference data $D_Z$ between the selectively predicted, backward predicted result frame data FN, forward predicted result frame data FP, interpolative predicted result frame data FP, interpolative predicted result frame data FNP and frame data B3, C1, C2, ... to be encoded can be obtained. From the subtracting circuit 8 the difference data $D_Z$ is sequentially data compressed through discrete cosine transformation circuit 12, multiplication circuit 14, requantizing circuit 18 and run-length Huffman encoding circuit 30 and is then output to the transmission data composition circuit 32.

A selection circuit 172 is controlled by a comparison circuit 171 to switch its contact, and thereby difference data $\Delta INTER$ which has the smallest amount of data is selected from the difference data $\Delta FN$, $\Delta FP$ and $\Delta FNP$ and output to a comparison circuit 174.

A subtracting circuit 176 receives picture data $D_{VN}$ and direct current data DC and outputs the difference between them to an absolute value adding circuit 177.

Similarly to the absolute value adding circuits 168a to 170a, the absolute value adding circuit 177 accumulates absolute values of input data for each macro unit block and then outputs the accumulated sum $\Delta INTRA$ to the comparison circuit 174.

The comparison circuit 174 outputs a switching signal for each macro unit block on the basis of the result of comparison between the accumulated sum $\Delta INTRA$ and the difference data $\Delta INTER$.

An OR circuit 178 receives the switching signal, output from the comparison circuit 174, and the intraframe coding processing control data PINTRA to control switching of the contacts of the selecting circuit 152.

If the frames B3, C1, C2, C4 and C5 which are assigned to be interframe coded include a macro unit block which may be sent as a smaller amount of data as a whole by intraframe coding, the comparison circuit 174 outputs a switching signal to the selecting circuit 152 through the OR circuit 178 according to the result of the comparison between the accumulated sum $\Delta INTRA$ and the difference data $\Delta INTER$ so that intraframe coding is selected for that macro unit block.

That is, the accumulated sum $\Delta INTRA$ is accumulated for each macro unit block after the difference in data between the picture data $D_{VN}$ and the direct current data DC is changed to an absolute value and hence the accumulated sum $\Delta INTRA$ represents an amount of data when frames B3, C1, C2, C4 and C5 assigned to be interframe coded are instead intraframe coded.

Thus, it is possible to determine by obtaining the result of comparison between the accumulated sum $\Delta INTRA$ and the difference data $\Delta INTER$ whether or not intraframe coding of each macro unit block provides a smaller amount of data to be transmitted. Even the frames B3, C1, C2, C4 and C5 which are assigned to be interframe coded may be sent as a smaller amount of data on the basis of the result of comparison as a whole by intraframe coding macro unit blocks thereof.

As indicated in FIG. 12, the selecting circuit 152 selects and outputs direct current data DC when there is a macro unit block in one of frames B3, C1, C2, C4 and C5 assigned to be interframe coded which may be sent as a smaller amount of data as a whole by intraframe coding. Thus, transmission frame picture data of the macro unit block which has been intraframe coded is transmitted to a destination.

In this operation, the comparison circuit 174 preferentially selects intraframe coding within a range where the amount of data of each of the accumulated sum $\Delta$INTRA and the difference data $\Delta$INTER is small, and thereby error transmission can be effectively avoided and a high quality video signal can be transmitted.

The transmission of video signals interframe coded presents the problem that error transmission cannot be avoided when a transmission error is generated in the frame of data referred to for interframe coding.

Accordingly, even frames B3, C1, C2, C4 and C5 which are assigned to be interframe coded are preferentially intraframe coded for transmission not only when a small amount of data as a whole is transmitted by intraframe coding as described but also when a small amount of data is provided both through intraframe coding and interframe coding. Accordingly, an increase of the amount of data and error transmission can be effectively avoided and a high quality video signal can be transmitted.

A selection circuit 180 receives and selectively outputs the output data (which is an identification signal having one of the values 1, 2 and 3 representing backward prediction, forward prediction or interpolative prediction, respectively) of the comparison circuit 171 and identification index $PINDEX_0$ (which in this case is an identification signal having a value of 0) indicating a macro unit block which has been intraframe coded according to the output signal of the OR circuit 178, and thereby the identification signal PINDEX representing the selectively predicted prediction result can be obtained through the selection circuit 180.

(2-6) Transmission Data Composition Circuit

Synchronously with the frame pulse signal $S_{FP}$, the transmission data composition circuit 32 (FIG. 3B) outputs output data from the run-length Huffman encoding circuits 30 and 34, the prediction index PINDEX, the forward prediction reference index PID, the backward prediction reference index NID, temporary index TR, frame group index GOF, control information from weighting control circuit 16 and data amount control circuit 20 to the reordering circuit 33 in a predetermined format so that the transmission frame DATA is constructed.

That is, as shown in FIGS. 13(A)-13(C) and FIGS. 14(A) and 14(B), the transmission data composition circuit 32 adds a macro unit header HM to picture data which is output in a unit including a macro unit block from the run-length Huffman encoding circuit 30 (FIG. 13(C))

With respect to intraframe coded data, a predictive index PI (which is produced with reference to the identification data PINDEX) representing intraframe coding, backward prediction processing, forward prediction processing or interpolative prediction processing is added to the macro unit header HM following a header TYPE for identifying each macro unit block (FIG. 14(A)).

In addition, according to the control information of the data amount control circuit 20, data QUANT which represents the quantization interval of each macro unit block is added and then motion vector data MVD-P and MVD-N which represent the forward prediction motion vector respectively, are added.

With respect to luminance signals $Y_1$, $Y_2$, $Y_3$, $Y_4$ and chrominance signals $C_R$, $C_B$ assigned to a macro unit block, additional data CBP representing whether those signals have or lack data to be transmitted, is added.

On the other hand, in the macro unit blocks of data to be interframe coded (FIG. 14(B)), the header TYPE for identifying each macro unit block is followed by the luminance signal detected in the adaptive prediction circuit 10, DC level data DCM-Y, DCM-U and DCM-V (DC) of the chrominance signal, and then data QUANT representing the size of the quantization interval is added.

Thus, each macro unit block can be decoded on the basis of the macro unit header HM by adding a macro unit header HM for each macro unit block.

Figure 15:
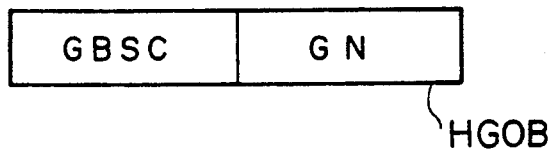

On the other hand, a group of block units (FIG. 13(B)) is constructed by placing macro unit blocks in 3 columns and 11 rows, and as illustrated in FIG. 15, a group-of-block-unit header HGOB is added at the head of each group of block units.

The group-of-block-unit header HGOB includes an identification header GBSC representing the start of each group of block units, followed by an identification header GN for identifying the group of block units.

Then, a frame of transmission data is constructed by assembling groups of block units in 5 columns and 2 rows (FIG. 13(A)), and a picture header PH is added at the head of each transmission frame.

Figure 16:
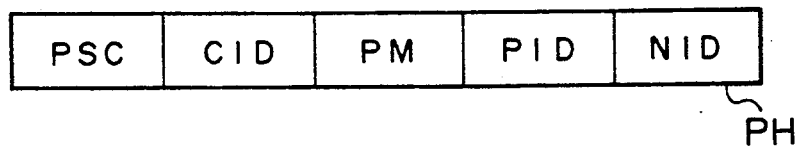

As shown in FIG. 16, in the picture header PH a start index PSC representing the head of each frame group is added with reference to a frame group index GOF output from the motion vector detecting circuit 6, and subsequently a current index CID representing the sequence of frames in each group of frames is added with reference to the temporary index TR.

Moreover, a mode index PM for identifyinq intraframe coding, interframe coding at level 1 or interframe coding at level 2 is added, and then the forward prediction reference index PID and backward prediction reference index NID are added.

Thus, for each transmission frame a mode index PM, identifying intraframe coding interframe coding at level 1 or interframe coding at level 2, is added as well as the forward prediction reference index PID representing frame data for forward prediction and, for backward prediction, the backward prediction reference index NID. Thus, the transmission frames are easily decoded with reference to forward prediction reference index PID, backward prediction reference index NID and mode index PM.

In this manner, the receiving unit not only decodes the transmission frame data with ease but also easily decodes it even when it is transmitted in a format differing from that of the present embodiment so that the length of a group of frames differs, and in which frames are differently processed at levels 1 and 2, etc. Thus, the operability of the moving picture transmission system is as a whole enhanced, and high quality video signals can be transmitted with ease.

(2-7) Structure of the Receiving Unit

Figure 17:
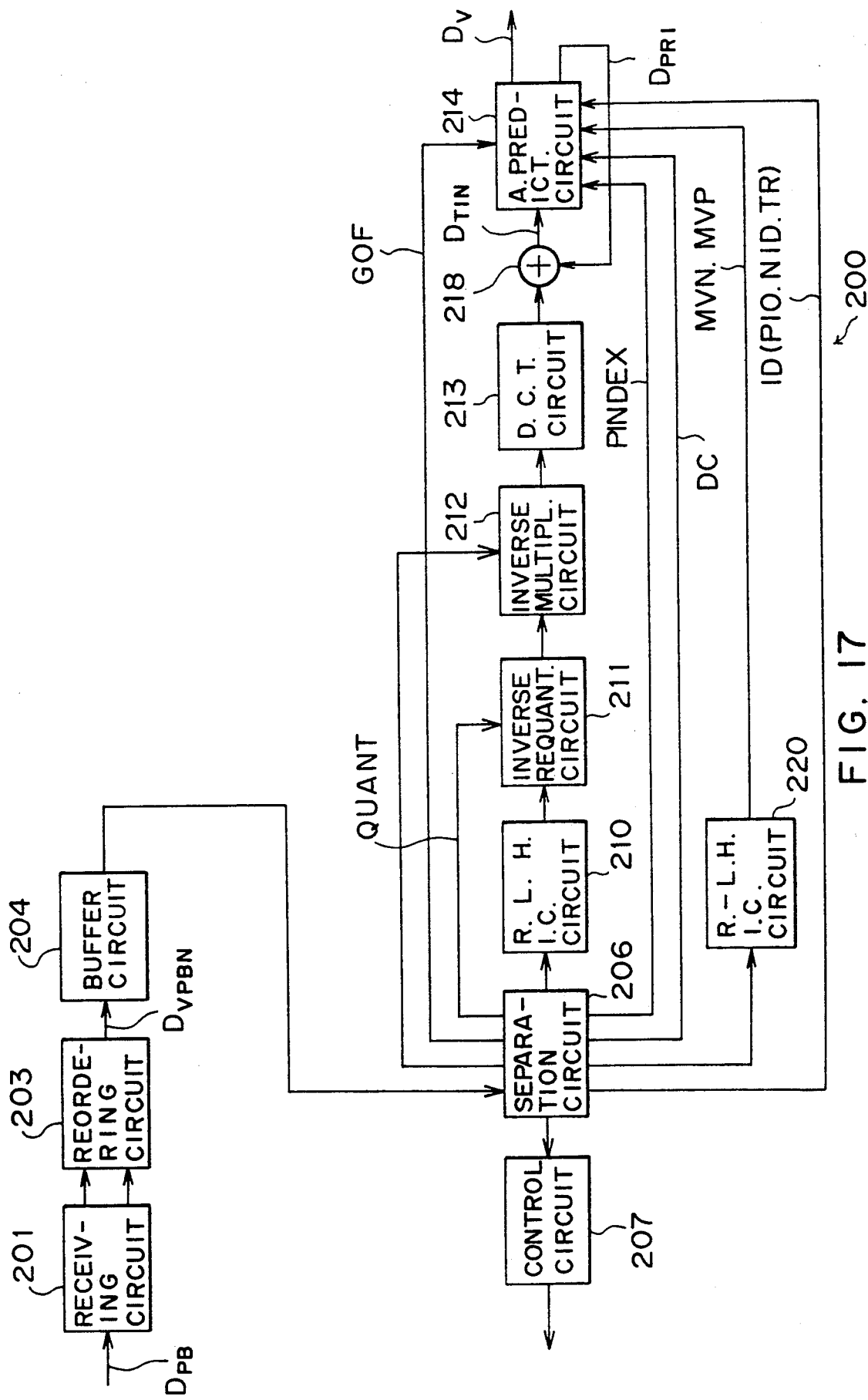
FIG. 17 is a block diagram of a receiving unit.

In FIG. 17, 200 generally designates a receiving unit in which reconstructed data $D_{PB}$ which are obtained by reproducing a compact disc are received by a receiving circuit 201.

The receiving circuit 201 detects the head of each group of frames with reference to the start index PSC and then outputs the result of the detection together with picture data $D_{VPB}$.

With reference also to FIGS. 18(A)–18(F), a reordering circuit 203 is provided by this operation with picture data $D_{VPB}$ (FIG. 181A)) having a continuous succession of frames PA0, PB3, PC1, PC2 ... sequentially intraframe coded or interframe coded.

The reordering circuit 203 outputs transmission frames PB3, PC1, PC2 ... which have been interframe coded with a delay of 7 frame cycles. Thus, the reordering circuit 203 reorders frames PA0, PB3, PC1, PC2 ... in the sequence of intraframe coding and interframe coding performed in the transmitting unit 1 (that is, the same sequence as a sequence of decoding) and outputs them (FIG. 18(B)).

A buffer circuit 204 stores the picture data $D_{VPBN}$ output from the reordering circuit 203 and then outputs it to a subsequent separation circuit 206 at a predetermined transmission rate.

The separation circuit 206 reconstructs the frame group index GOF, the forward prediction reference index PID, the backward prediction reference index NID, the temporary index TR, the prediction index PINDEX, the data DC (DCM-Y, DCM-U, DCM-V), QUANT, the motion vector data MVD-P and MVD-N with reference to the picture header PI, the group-of-block-unit header HGOB and the macro unit header HM, and then the separation circuit 206 outputs them to predetermined circuits.

The separation circuit 206 outputs the picture header PI, group-of-block-unit header HGOB and macro unit header HM to a control circuit 207 at this time, so that the control circuit 207 can control the drive of a compact disc reproducing system 20 to obtain reconstructed data having continuous frames of data for each group of frames.

That is, in a normal reproduction mode, data which are sequentially recorded on the compact disc are, as described in connection with FIGS. 18(A)–18(F), are reproduced to obtain the picture data $D_{VPBN}$ (FIG. 19(B)).

In a reverse reproduction mode, an optical pickup is moved in a direction opposite to that of the normal reproduction mode while the compact disc is rotated in the same direction as in normal reproduction. Thus, picture data $D_{VPBN}$, which arranges groups of frames in reverse order to that obtained in normal reproduction, is obtained (FIG. 19(A)).

In normal reproduction, the first group of frames (PA0–PC5) is input to the receiving unit 200 and then the second group of frames (PA6–PC11) and the third group of frames (PA12–PC17) are continuously input whereas in reverse reproduction, the third group of frames (PA12–PC17) is input and is followed by the second group of frames (PA6–PC11) and then the first group of frames (PA0–PC5).

Since the reordering circuit 203 delays interframe coded data by 7 frame cycles and frame PA6 is delayed by 6 frame cycles from frame PA12, frames PB15–PC17 are rearranged to follow frames PA12 and PA6, and frames PB9–PC11 are rearranged to follow frames PA0 and PA6 (FIG. 19(B)).

Also in the reverse reproduction mode as in the normal reproduction mode, frames are arranged through the reordering circuit 203 so that continuous intraframe coded data are continuously followed by frames processed at levels 1 and 2, and then by further intraframe coded data.

Thus, in this embodiment, the frame group index GOF, the forward prediction reference index PID, the backward prediction reference index NID, the temporary index TR, etc., are added to each of the frames and transmitted, and hence transmission data can be easily decoded as well in the reverse reproduction mode as in the normal reproduction mode by subsequently decoding them in a run-length Huffman inverse coding circuit 210, inverse requantization circuit 211, inverse multiplying circuit 212, discrete cosine inverse transformation circuit 213 and prediction circuit 214 with reference to these indexes.

The separation circuit 206 removes the picture header PI, group-of-block-unit header HGOB and macro unit header HM from the picture data $D_{VPBN}$ and then outputs them to the run-length Huffman inverse coding circuit 210.

The run-length Huffman inverse coding circuit 210 performs a process which is the inverse of that performed by the run-length Huffman coding circuit 30 (FIG. 3), so that the data input to the run-length Huffman coding circuit 30 are reproduced in the receiving unit 200.

The inverse requantization circuit 211 receives output data from the run-length Huffman inverse coding circuit 210 and data QUANT, representing the size of the quantization interval and added to each of the macro unit headers HM, and performs an inverse requantizing process as in the inverse requantizing circuit 22 (FIG. 3), to thereby reproduce the data input to the requantizing circuit 18 of the transmitting unit 1 in the receiving unit 200, such that the inverse requantizing process is the inverse of that performed by the requantizing circuit 18.

On the other hand, the inverse multiplying circuit 212 receives output data from the inverse requantization circuit 211 and performs an inverse multiplication operation which is the inverse of the operation of the multiplying circuit 14 (FIG. 3) with reference to data added to the each macro unit header HM to thereby reconstruct data input to the multiplying circuit 14 of the transmitting unit 1 in the receiving unit 200.

The discrete cosine inverse transformation circuit 213 performs an inverse transformation of the data output by the inverse multiplying circuit 212, such inverse transformation being the inverse of the transformation carried out by the discrete cosine transformation circuit 12 (FIG. 3). Thus, input data of the discrete cosine transformation circuit 12 is reconstructed.

An adding circuit 218 adds predicted data $D_{PRI}$, output from the adaptive prediction circuit 214, to output data from the discrete cosine inverse transformation circuit 213 and outputs it as $D_{TIN}$ to the adaptive prediction circuit 214.

A run-length Huffman inverse coding circuit 220 decodes the forward prediction motion vector MVP and the backward prediction motion vector MVN which have been variable length coded in the run-length Huffman coding circuit 34 of the transmitting unit 1 and outputs them to the adaptive prediction circuit 214.

The adaptive prediction circuit 214 reconstructs predicted data $D_{PRI}$, in the form output from the adaptive prediction circuit 10 of the transmitting unit 1, with reference to the output data $D_{TIN}$ of the adding circuit 218 and motion vectors MVP and MVN, etc. to the adaptive prediction circuit 214.

In this manner, an original frame of data can be reconstructed after transmission, and hence video data $D_V$ can be constructed, through the adaptive prediction circuit 214.

That is, the adaptive prediction circuit 214 outputs a direct current level data DC to the adding circuit 218 as the prediction data $D_{PRI}$ with respect to frames A0 and A6 which have been intraframe coded.

Thus, the intraframe coded data A0 and A6 are reconstructed through the adding circuit 218.

Similarly to the adaptive prediction circuit 10 of the transmitting unit, the adaptive prediction circuit 214 includes a forward prediction frame memory circuit, backward prediction frame memory circuit and an interframe memory circuit and stores frames A0 and A6 reconstructed in the forward prediction frame memory circuit and the backward prediction frame memory circuit (FIGS. 18(C) and (D)) to generate predicted data of frame B3.

Thus, the data of frame B3 which has been interframe coded at level 1 can be reconstructed through the adding circuit 218.

Moreover, the adaptive prediction circuit 214 stores the data of frame B3 reconstructed in the interframe memory circuit (FIG. 18(E)) to produce predicted data $D_{PRI}$ for frames C1, C2, C4 and C5, and thereby the data of frames C1, C2, C4 and C5 which has been interframe coded at level 2 can be reconstructed through the adding circuit 218.

In addition, the adaptive prediction circuit 214 rearranges and outputs the reconstructed frames A0, A6, B3, ... in the original order (FIG. 18(F)).

The receiving unit 200 includes an interpolating circuit (not shown) which reconstructs the original input video signal $VD_{IN}$ by an interpolative operation with reference to the reconstructed frames.

Thus, video signals which are highly efficiently coded and recorded on a compact disc are reconstructed.

(2-8) Adaptive Prediction Circuit

Figure 20:
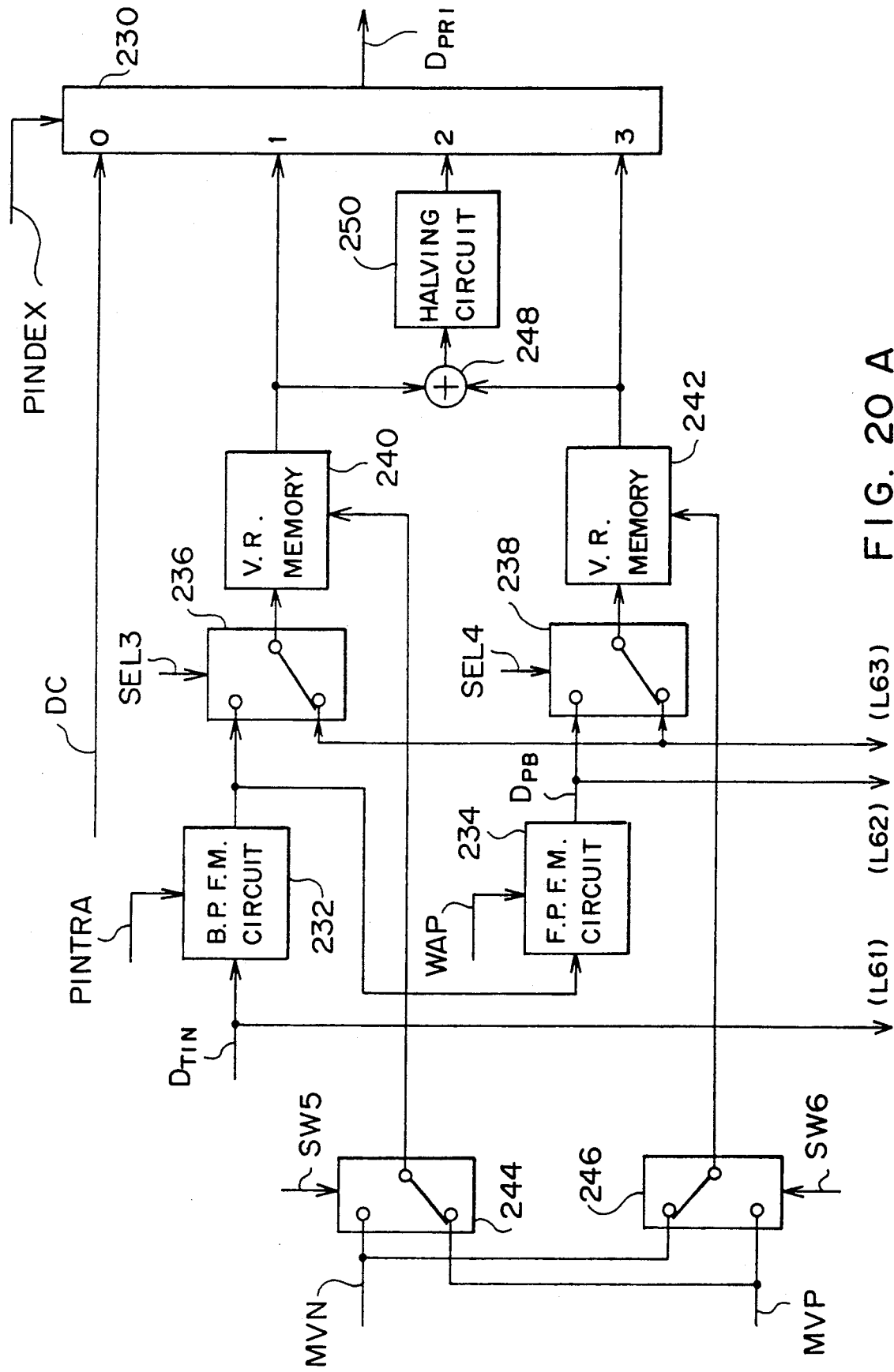
FIGS. 20A and 20B together constitute a block diagram showing an adaptive prediction circuit of the receiving unit of FIG. 17.
Figure 20:
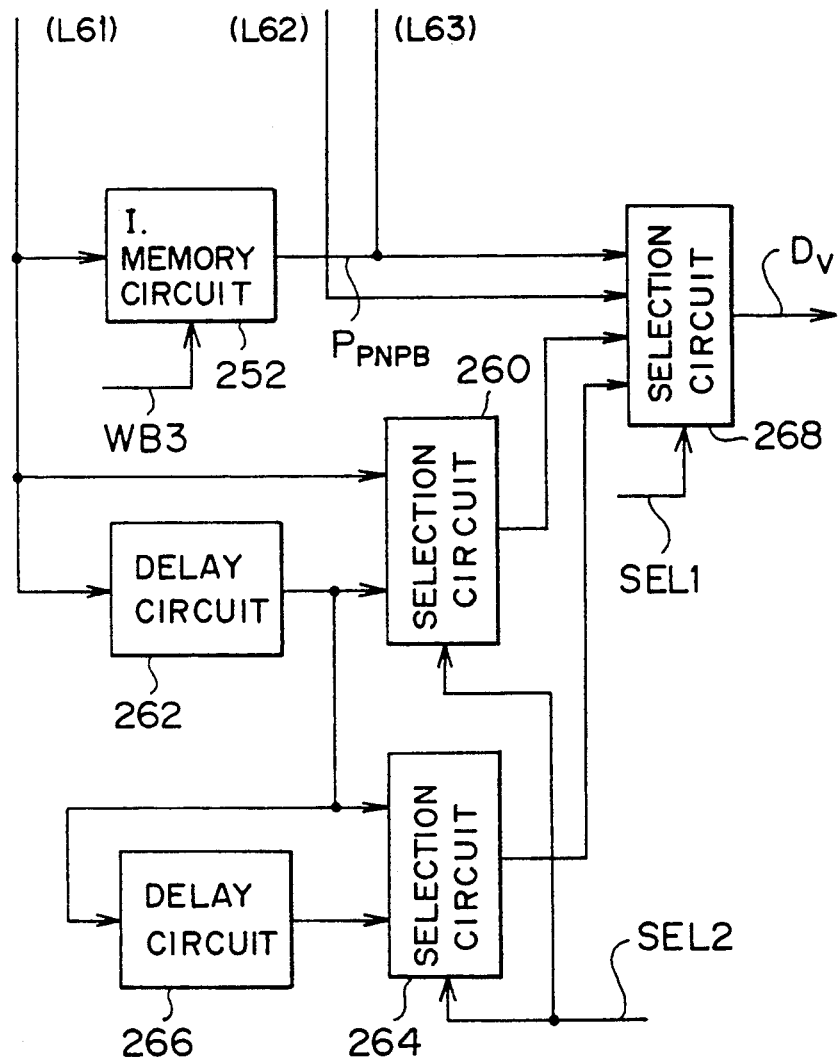

With reference to FIG. 20, the adaptive prediction circuit 214 constructs predicted data $D_{PRI}$ with reference to the forward prediction reference index PID, the backward prediction reference index NID, the temporary index TR and the direct current level data DC which have been separated in the separation circuit 206.

More specifically, the adaptive prediction circuit 214 provides the direct current level data DC to a selection circuit 230 which switches its contact with reference to the decoded identification data PINDEX (identification data of a macro unit block which has undergone backward prediction processing, forward prediction processing, interpolative prediction processing or intraframe coding processing). The adaptive prediction circuit 214 outputs the direct current level data DC to the adding circuit 218 when an intraframe coded macro unit block is input to the adding circuit 218.

That is, after separation in the separation circuit 206 the direct current level data DC is subsequently output as the predicted data $D_{PRI}$ in units of a macro unit block for each of the intraframe coded frames PA0, PA6, ...

In addition, with respect to a macro unit block which has been preferentially intraframe coded in spite of the assignment thereof for interframe coding, the direct current level data DC is output to the adding circuit 218.

Thus, with respect to intraframe coded frames PA0, PA6, ... and macro unit blocks for which intraframe coding has been preferentially selected although interframe coding was assigned, the original data can be reconstructed by adding data output by the discrete cosine inverse transformation circuit 213 and the predicted data $D_{PRI}$ through adding circuit 218.

The adaptive prediction circuit 214 provides the output data $D_{TIN}$ thus reconstructed in the adding circuit 218 to a backward prediction frame memory circuit 232 and a forward prediction frame memory circuit 234 and reconstructs predicted data $D_{PRI}$ for subsequent frames.

The backward prediction frame memory circuit 232 and the forward prediction frame memory circuit 234 are switched to a writing mod with reference to the intraframe coding processing control data PINTRA and the frame memory control data WAP, respectively, and thereby the leading frame A0 in the group of reconstructed frames is stored in the forward prediction frame memory circuit 234 and the data of frame A6 of the subsequent group of frames is stored in the backward prediction frame memory circuit 232 (FIGS. 18 (C) and (D)).

The selection circuits 236 and 238 switch their contacts in response to switching signals SEL3 and SEL4 produced with reference to intraframe coding processing control data PINTRA, respectively, and thereby output frames stored in the backward prediction frame memory circuit 232 and forward prediction frame memory circuit 234, as backward prediction and forward prediction frames to subsequent variable reading memory circuits 240 and 242, respectively.

The variable reading memory circuits 240 and 242 receive motion vectors MVN and MVP for each macro unit block through selection circuits 244 and 246 and shift backward prediction frames and forward prediction frames by the amount of the motion vectors MVN and MVP, respectively.

Thus, the data resulting from backward prediction and forward prediction can be obtained for frames B3 and B9 interframe coded at level 1 through the variable reading memory circuits 240 and 242, respectively, and the frames so obtained are output to the selection circuit 230.

An adding circuit 248 adds frames output from the variable reading memory circuits 240 and 242 and outputs the added data to the selection circuit 230 through a halving circuit 250.

Thus, in the selection circuit 230 the direct current level DC with respect to intraframe coded macro unit blocks of frames B3 and B9 is input to the first input terminal 0 while frames resulting from backward prediction, interpolative prediction and forward prediction are input to the second input terminal 1, the third input terminal 2, and the fourth input terminal 3, respectively.

Thus, with respect to frames B3 and B9, assigned to level 1 processing, predicted data $D_{PRI}$ can be reconstructed by selectively outputting the data input to the first to the fourth input terminals 0-3 of the selection circuit 230 on the basis of the identification data PINDEX.

Accordingly, frames PB3, PB9, which are sent after PA0 and PA6, are decoded by adding the predicted data $D_{PRI}$ output to the adding circuit 218, to the output data from the discrete cosine inverse transformation circuit 213, so that the original data can be reconstructed.

An interframe memory 252 receives the output data $D_{TIN}$ from the adding circuit 218 on the basis of the interframe coding processing control data WB3, and of the frames thus reconstructed, frames B3 and B9 processed at level 1 are thereby stored.

Thus, similarly to recording, frame B3, which is a predicted frame for frames C1, C2, C4 and C5, can be obtained through the interframe memory 252 while the frames C1, C2, C4 and C5 are processed last at level 2 (FIG. 18(E)).

Thus, frames B3 and A0 are output to the variable reading memory circuits 240 and 242 through the selection circuits 236 and 238, and thereby data produced by backward prediction, forward prediction and interpolative prediction can be obtained through the variable reading memories 240, 242 and the halving circuit 250, respectively.

Accordingly, predicted data $D_{PRI}$ for frames C1 and C2 can be reconstructed through the selection circuit 230, and thereby the data of frames C1 and C2 can be reconstructed in the adding circuit 218.

On the other hand, frames A6 and B3 are output to the variable reading memory circuits 240 and 242 through the selection circuits 236 and 238 during a period of two frame cycles following the frames C1 and C2, and frames produced by backward prediction, forward prediction and interpolative prediction can be obtained through the variable reading memory circuits 240, 242 and halving circuit 250.

Consequently, predicted data $D_{PRI}$ for frames C4 and C5 can be reconstructed through the selection circuit 230, and thereby frames C4 and C5 can be reconstructed in the adding circuit 218.

Thus, subsequently reconstructed frames are output as added data $D_{TIN}$ from the adding circuit 218.

A selection circuit 260 has a first input coupled to receive the added data $D_{TIN}$. A delay circuit 262 has an input coupled to receive the added data $D_{TIN}$ and an output coupled with a second input of the selection circuit 260. The output of the delay circuit 262 is also directly input to a selection circuit 264 and is coupled through a delay circuit 266 to a further input of the selection circuit 264.

Moreover, the selection circuits 260 and 264 switch their contacts according to a switching signal SEL2 and output their selected outputs to a selection circuit 268.

The selection circuit 268 receives frames output from the forward prediction frame memory circuit 234 and the interframe memory 252, as well as the selected outputs of the selection circuits 260 and 264 and switches its contact according to a switching signal SEL1.

The switching signals SEL1 and SEL2 are generated according to the current index CID, added to each frame and transmitted, and thereby decoded frames are rearranged in the original order to reconstruct the video data $D_V$ (FIG. 18(F)).

Thus, frames of data are sequentially intraframe coded and interframe coded such that they are divided into predetermined groups of frames and then are transmitted, so that video signals can be efficiently transmitted with an effectively avoided degradation of picture quality.

In this embodiment, the motion vectors MVN and MVP are output through the selection circuits 244 and 246, so that, in the reverse reproduction mode, the motion vectors MVN and MVP are switched and output to the variable reading memory circuits 240 and 242.

In the reorder circuit 203, the interframe coded frames are delayed for 7 frames cycles, so that in reverse reproduction, frame PA6 is delayed 6 frame cycles relative to the frame PA12 and is followed by frames PB15-PC17, PA0, and PB9-PC11.

Thus, when frames PB15, PB9 and PB3 are input, which are produced by level 1 processing, to the adding circuit 208, frames A6 and A0 are stored in the backward prediction frame memory circuit 232 and frames A12, A6 and A0 are stored in the forward prediction frame memory circuit 234 (FIG. 19(C) and (D)).

That is, frames are stored in the backward prediction frame memory circuit 232 and the forward prediction frame memory circuit 234 in such a manner as to exchange positions of frames in the case of normal reproduction.

In reverse reproduction (contrary to the normal reproduction) frames produced by forward prediction and backward prediction can be output from the variable reading memory circuits 240 and 242 by switching and outputting the motion vectors MVN and MVP to the variable reading memory 240 and 242, respectively.

Thus, in response to the switching of the motion vectors MVN and MVP, the switching operation of the selection circuit 230 is exchanged in the forward prediction and the backward prediction operations, and thereby reverse reproduction can be carried out with a simple structure.

More specifically, since in transmitting the frames, data indicating the order of the predicted frames for forward prediction and backward prediction and the order in the group of frames are added and sent, in the reverse reproduction mode the transmission data can be easily decoded as well as in normal reproduction.

When frames C1, C2, C4 and C5 to be processed at level 2 are input, predicted frames are stored in the backward prediction frame memory circuit 232 and the forward prediction frame memory circuit 234 in an exchanged relationship with frames being stored in the interframe memory 252 (FIG. 19(E)). Also in this case, reverse reproduction can be carried out with a simple structure by exchanging the switching operations of the motion vectors MVN and MVP and the selection circuit 230 in the forward prediction and the backward prediction operations.

Thus, the original video signals can be reproduced in the normal reproduction and the reverse reproduction modes.

(3) Operation of the Embodiment

In the above apparatus, the input video signals $VD_{IN}$ are converted to digital signals at the picture data inputting unit 2, the amount of data thereof is reduced to ¼ of the original amount, and then the video signals are converted to video signals VD (FIG. 1(A)) having a continuous sequence of frames A0, C1, C2, B3, ...

After frames A0, C1, C2, B3, ... are divided into groups of frames consisting of units of 6 frames in the reordering circuit 4, the video signals VD are reordered for coding, A0, A6, B3, C1, C2, C4, C5, .. (that is, frames A0, A6 to be intraframe coded, frame B3 to be interframe coded at level 1 and frames C1, C2, C4 C5 to be interframe coded at level 2).

Moreover, the frame group index GOF, the forward prediction reference index PID, the backward prediction reference index NID and the temporary index TR representing the order in the group of frames, are generated in the reordering circuit 4 and are output synchronously with the frames A0, A6, B3, C1, C2, C4, ...

After reordering in the sequence A0, A6, B3, C1, C2, C4, C5, C7 .. for encoding the frames are output with the predetermined identification data GOF, PID, NID and TR added to them. Thus, the subsequent intraframe coding and interframe coding can be simplified.

The reordered picture data $D_{VN}$ are output to the adaptive prediction circuit 10 at a predetermined time after they are divided into macro unit blocks in the blocking circuit 84 of the motion vector detecting circuit 6.

Among the reordered picture data $D_{VN}$, leading frames A0, A6 and A12 to be intraframe coded are directly output to the subtracting circuit 8.

With reference to FIG. 6(1A), the data of frames A0, A6 and B3 are respectively stored in the forward prediction frame memory circuit 89, the backward prediction frame memory circuit 88 and the interframe memory circuit 90 to serve as references for detecting motion vectors for backward prediction and forward prediction.

That is, frames A0 and A3 which are stored in the forward prediction frame memory circuit 89 and the interframe memory circuit 90 are output to the variable reading memory circuits 94 and 95 (FIG. 6(1B)), and with respect to frames C1 and C2 picture data within a predetermined motion vector detecting range are output to subtraction circuits $KN_0$ to $KN_{255}$ and $KP_0$ to $KP_{255}$ in a parallel manner at the time that frames C1 and C2 are input to the subtraction circuits $KN_0$ to $KN_{255}$ and $KP_0$ to $KP_{255}$.

The absolute values of the results of the subtractions carried out by the subtraction circuits $KN_0$ to $KN_{255}$ and $KP_0$ to $KP_{255}$ are accumulated for each macro unit block in the absolute value summing circuits 100 and 101, and thereby difference data are obtained when predicted frames are sequentially shifted within the motion vector detecting range about each of the macro unit blocks of frames C1 and C2.

Similarly, frames B3 and A6 which are stored in the interframe memory circuit 90 and the backward prediction frame memory circuit 88 are output to the variable reading memory circuits 94 and 95, and with respect to frames C4 and C5, picture data within a predetermined motion vector detecting range are output to subtraction circuits $KN_0$ to $KN_{255}$ and $KP_0$ to $KP_{255}$ in a parallel manner when frames C4 and C5 are input to the subtraction circuits $KN_0$ to $KN_{255}$ and $KP_0$ to $KP_{255}$.

Thus, difference data can be obtained through the absolute value summing circuits 100 and 101 when predicted frames are sequentially shifted within a motion vector detecting range about each of the macro unit blocks of frames C4 and C5.

The minimum values of the difference data of frames C1, C2, C4 and C5 are detected in the comparison circuits 102 and 103, and thereby respective motion vectors for forward prediction and backward prediction are detected.

The result of a preference comparison between difference data obtained where it is assumed that a predicted frame has not moved, and the minimum difference data obtained through the comparison circuits 102 and 103, is obtained in the comparison circuits 105 and 106, and thereby 0 vector data $MV_0$ and detected motion vectors output from the comparison circuits 102 and 103 are selectively output according to the preference illustrated in FIG. 9. Thus, motion vectors are selected so that video signals considered as a whole can be sent efficiently.

With reference to FIGS. 6(2A) and 6(2B), the motion vectors for frames C1, C2, C4 and C5 are output through the selection circuits 139 and 140 and ar also provided to the adding circuits 120 to 125 and the halving circuits 127 and 128. Thus, the operations represented by equations (3) and (4) are carried out, so that predicted motion vectors MV3PY and MV3NY for frame B3 are detected.

Thus, with respect to frame B3, its motion vectors are detected within the motion vector detecting range on the basis of the predicted motion vectors MV3PY and MV3NY.

That is, for frame B3, the data of frames A0 and A6, stored in the forward prediction frame memory circuit 89 and the backward prediction frame memory circuit 88, are output to the variable reading memories 94 and 95, and the picture data, which have been shifted to within the motion vector detecting range by the predicted motion vectors MV3PY and MV3NY relatively to the picture data of frame B3, are output from the variable reading memories 94 and 95 to the subtraction circuits $KN_0$–$KN_{255}$ and $KP_0$–$KP_{255}$ in a parallel manner.

By means of this operation, difference data can be obtained on the basis of the predicted motion vectors MV3PY and MV3NY through the absolute value summing circuits 100 and 101, and the motion vectors of frame B3 are detected by adding the predicted motion vectors MV3PY and MV3NY to the selected outputs of the selection circuits 107 and 108 in the adding circuits 135 and 136 (refer to FIG. 6(2B).

With reference again to FIGS. 10A and 10B, the picture data $D_{VN}$ is output to the adaptive prediction circuit 10, in which mean values of the picture data in the luminance signal and the chrominance signal are obtained for each macro unit block through the mean value memory circuit 150 and the mean value data are output as direct current data DC to the transmission data composition circuit 32 and selecting circuit 152 (refer also to FIG. 3B).

In addition, the picture data $D_{VN}$ output to the adaptive prediction circuit 10 is selectively predicted with reference to frames A0, A6 and B3 (frames reconstructed in the 10 adding circuit 28) stored in the forward prediction frame memory circuit 155, the backward prediction frame memory circuit 154 and the interframe memory circuit 156.

That is, to selectively predict frame B3, the data of frames A0 and A6 stored in the forward prediction frame memory circuit 155 and the backward prediction frame memory circuit 154 are output through the selection circuits 158, 159 to the variable reading memories 160 and 161, where the frames are shifted by the amount of the motion vectors to construct frames FN and FP through backward prediction and forward prediction, respectively.

At the same time, a frame of data FNP is produced by interpolative prediction and is provided as the output from the halving circuit 165 which halves the sum of the frames FN and FP. Frame B3 is supplied as an input to each of subtracting circuits 165a, 166a and 167 wherein it is subtracted from frames FN, FP and FNP, respectively.

The results of the subtractions are converted to absolute values in the absolute value summing circuits 168, 169 and 170 and are then accumulated for each macro unit block, so that the backward prediction difference data ΔFN, the forward prediction difference data ΔFP and the interpolative prediction difference data ΔFNP (FIG. 1) are obtained through the absolute value summing circuits 168, 169 and 170, respectively.

The minimum value of the difference data ΔFN, ΔFP and ΔFNP is detected in the comparison circuit 171.

A preferential comparison as shown in FIG. 12 is carried out between the minimum value and the difference data relative to the direct current data DC in the comparison circuit 174, so that the result of the prediction selection of backward prediction, forward prediction, interpolative prediction or intraframe coding is detected for each macro unit block through the comparison circuit 174.

On the other hand, in selective prediction of frames C1 and C2, the data of frames A0 and B3 stored in the forward prediction frame memory circuit 155 and the interframe memory circuit 156 are output to the variable reading memories 160 and 161 where frames FN and FP are produced by backward prediction and forward prediction, respectively.

Thus, with respect to frames C1 and C2 difference data ΔFN representing backward prediction, ΔFP representing forward prediction and ΔFNP representing interpolative prediction are obtained in the subtracting circuits 165a to 167 as in the case of frame B3, so that the result of the prediction selection of backward prediction, forward prediction, interpolative prediction or intraframe coding is output by the comparison circuit 174 for each macro unit block.

On the other hand, in selective prediction of frames C4 and C5, the data of frames B3 and A0 which are stored in the interframe memory circuit 156 and the backward prediction frame memory 154 are output to the variable reading memories 160 and 161, where they are shifted by the amount of the motion vectors to produce the predicted frames.

Then, the results of the prediction selection of frames C4 and C5 are detected for each macro unit block through the comparison circuit 174 in a manner similar to frames B3, C1 and C2.

Frames FN, FP and FNP, which are the results of backward prediction, forward prediction and interpolative prediction, respectively, and the direct current level data DC are selectively output according to the results of the prediction selection through the selecting circuit 152, so that the predicted data $D_{PRI}$ are output to the subtracting circuit 8.

With reference also to FIGS. 3A and 3B the results of the prediction selection are output as the prediction index PINDEX from the selection circuit 180 to the transmission data composition circuit 32.

The predicted data $D_{PRI}$ is subtracted from the picture data $D_{VN}$ in the subtracting circuit 8 to thereby produce difference data $D_Z$.

The difference data $D_Z$ is converted for each macro unit block according to the DCT technique in the discrete cosine transformation circuit 12.

The output data of the discrete cosine transformation circuit 12 are weighted according to the error data ER output from the motion vector detecting circuit 6, in the multiplication circuit 14 and are then requantized using a quantization interval selected according to the error data ER, the amount of the output data of the discrete cosine transformation circuit 12 and the amount of the data input to the buffer circuit 21 in the requantizing circuit 18.

Thus, the requantization of the data according to the quantization interval selected according to the error data ER, the amount of the output data of the discrete cosine transformation circuit 12 and the amount of the data input to the buffer circuit 21 as well as the weighting processing thereof enables high quality video signals to be transmitted and each frame of data to be sent with a predetermined amount of data.

The requantized picture data are variable length coded in the run-length Huffman coding circuit 30, and then in the transmission data composition circuit 32 the variable length coded data of the motion vectors MVN and MVP, prediction index PINDEX, forward prediction reference index PID, backward prediction reference index NID, temporary index TR, etc., are added to the picture data, which are then converted to transmission data DATA according to the predetermined format illustrated in FIGS. 13(A)–13(C), 14(A), 14(B), 15 and 16, and are recorded on a compact disc.

Moreover, the requantized picture data is reconverted to the form of the data input to the discrete cosine transformation circuit 12 through the inverse requantizing circuit 22, the inverse multiplication circuit 24 and the inverse discrete cosine transformation circuit 26 is then added to the predicted data $D_{PRI}$ output from the adaptive prediction circuit 10, in the adding circuit 28 to produce the frames $D_F$ which reconstructs the data input to the subtracting circuit 8.

The data $D_F$ is stored in the forward prediction frame memory circuit 155, the backward prediction frame memory circuit 154 and the interframe memory circuit 156 of the adaptive prediction circuit 10 and is used as the forward prediction data and the backward prediction data.

In this manner, data $D_{PRI}$ predicting frames to be input subsequently to the subtracting circuit 8 is generated, and transmission data DATA in the form of sequential frames are obtained. Frames A0, B3 and A6 of the reordered picture data DVN are stored in the forward prediction frame memory circuit 89, interframe memory circuit 90 and the backward prediction frame memory circuit 88, respectively, and thereby motion vectors MV3P, MV3N, BV1P, MV1N, MV2P, MV2N ... for frames B3, C1 and C2 are detected through the selection circuits 139 and 140.

The picture data $D_{VN}$ is output to the adaptive prediction circuit 10, in which means values of the picture data of the luminance signal and the chrominance signal are obtained for each macro unit block through the mean value memory circuit 150 and are output as direct current data DC to the transmission data composition circuit 32.

In addition, the picture data $D_{VN}$ input to the adaptive prediction circuit 10 is selectively predicted with reference to frames A0, A6 and B3 (reconstructed by the adding circuit 28), and thereby difference data ΔFN, ΔFP and ΔFNP representing backward prediction, forward prediction and interpolative prediction (FIG. 1) can be obtained, respectively.

Of the difference data ΔFN, ΔFP and ΔFNP, the difference data having the smallest amount of data is selected, and thereby the result of the prediction selection is detected for each macro unit block.

Frames FN, FP and FNP, which are the results of backward prediction, forward prediction and interpolative prediction, respectively, are selectively output according to the results of the prediction selection, so that the predicted data $D_{PRI}$ are output to the subtracting circuit 8.

The results of the prediction selection are output as the identification data PINDEX to the transmission data composition circuit 32.

The predicted data $D_{PRI}$ is subtracted from the picture data $D_{VN}$ in the subtracting circuit 8 to thereby produce difference data $D_Z$.

The difference data $D_Z$ is converted for each macro unit block according to the DCT technique in the discrete cosine transformation circuit 12.

The output data of the discrete cosine conversion circuit 12 are weighted according to the error data ER output from the motion vector detecting circuit 6, in the multiplication circuit 14 and are then requantized with a quantization interval selected according to the error data ER, the amount of data output by the discrete cosine transformation circuit 12 and the amount of the data input to the buffer circuit 21 in the requantizing circuit 18.

Thus, the requantization of the data according to the error data ER, the amount of data output by the discrete cosine transformation circuit 12 and the amount of data input to the buffer circuit 21 as well a the weighting processing thereof enables high quality video signals to be transmitted and each frame to be sent with a predetermined amount of data.

The requantized data are variable length encoded in the run-length Huffman encoding circuit 30 and then in the transmission data composition circuit 32, are variable length encoded according to a predetermined format, and are thereafter recorded on a compact disc in a predetermined format.

On the other hand, motion vectors detected in the motion vector detecting circuit 6 are output to the run-length-Huffman encoding circuit 34, where motion vectors are converted to one frame interval vectors and are processed by adaptive encoding. Then they are recorded on a compact disc together with remainder data, and data representing kind of the motion vectors recorded, (that is, the kind of vectors can be detected by the forward prediction reference index PID, the backward prediction reference index NID and the temporary index TR). Moreover, the requantized picture data is inversely converted to data in the form input to the discrete cosine transformation circuit 12 by means of the inverse requantizing circuit 22, the inverse multiplication circuit 24 and the inverse discrete cosine transformation circuit 26 and is then added to the predicted data $D_{PRI}$ output from the adaptive prediction circuit 10 by means of the adding circuit 28 to produce data $D_F$ which reconstructs the data in the form input to the subtracting circuit 8.

The data $D_F$ is stored in the adaptive prediction circuit 10 and is used for forward prediction and backward prediction.

Then, data $D_{PRI}$ which predicts frames to be input subsequently to the subtracting circuit 8 is generated, and transmission data DATA in the form of sequential frames are obtained.

With reference again to FIG. 17 in the receiving circuit 200, reproduced data $D_{PB}$ which is obtained by playing back the compact disc is input to the receiving circuit 201, where the head of each group of frames is detected. Then, the reproduced data $D_{PB}$ is output together with the results of the detection to the reordering circuit 203 where it is reordered to produce picture data $D_{VPBN}$ having data sequentially arranged as intraframe coded and interframe coded frames, PA0, PA6, PB3, PC1, PC2 ...

The reordered frames are output through the buffer circuit 204 to the separation circuit 206, where the frame group index GOF, the forward prediction reference index PID, the backward prediction reference index NID, etc. which have been added to the transmitted data are reconstructed.

The frames of data output from the separation circuit 206 are reconverted by means of the run-length Huffman inverse coding circuit 210, the inverse requantization circuit 211, the inverse multiplication circuit 212 and the discrete cosine inverse transformation circuit 213, to reconstruct data in the form input to the discrete cosine transformation circuit 12.

The output data from the discrete cosine inverse transformation circuit 213 is added to the predicted data $D_{PRI}$ from the adaptive prediction circuit 214 by means of the adding circuit 218, and the resultant output data $D_{TIN}$ is output to the adaptive prediction circuit 214.

With reference also to FIGS. 20A and 20B, in the adaptive prediction circuit 214, for intraframe coded transmission data the transmitted direct current level data DC is output as the predicted data $D_{PRI}$ through the selection circuit 230, and the output data $D_{TIN}$ representing sequentially reconstructed frames A0, A6 and A12 are thereby obtained by means of the adding circuit 218.

The frames A0 and A6 in the output data $D_{TIN}$ provided by the adding circuit 218 are stored in the backward prediction frame memory circuit 232 and forward prediction frame memory circuit 234 for decoding the subsequent frames B3, C1, C2, C4 ... .

More specifically, the data of frames A0 and A6 which are stored in the backward prediction frame memory circuit 232 and forward prediction frame memory circuit 234 are output through the selection circuits 236 and 238 to the variable reading memories 240 and 242.

In memories 240 and 242, the data of frames A0 and A6 are displaced by the amount of the motion vectors MVN and MVP for each macro unit block and then output, so that the data of frame B3 is produced by backward prediction and forward prediction.

The data output from the variable reading memories 240 and 242 are input to the adding circuit 248 and the halving circuit 250 to thereby construct frames of data by interpolative prediction.

The data produced by backward prediction, forward prediction and interpolative prediction are output together with the direct current data DC to the selection circuit 230, from which they are selectively output according to the identification data PINDEX, so that predicted data $D_{PRI}$ is constructed for the predetermined frame B3.

Then, the predicted data $D_{PRI}$ is output to the adding circuit 218 to thereby decode the data of frame B3.

The decoded data of frame B3 is stored in the interframe memory circuit 252 and is used together with the data of frames A6 and A0 stored in the backward prediction frame memory circuit 232 and the forward prediction frame memory circuit 234 for decoding the data of frames C1, C2, C4, ...

That is, the data of frames A6 and B3 stored in the forward prediction frame memory circuit 234 and the interframe memory 252 ar output to the variable reading memories 240 and 242 through the selection circuits 236 and 238, for producing data for frames C1 and C2 by backward prediction, forward prediction and interpolative prediction.

On the other hand, the data of frames B3 and A0 stored in the interframe memory circuit 252 and the backward prediction frame memory circuit 232 are output to the variable reading memories 240 and 242, for producing data for frames C4 and C5 by backward prediction, forward prediction and interpolative prediction.

Thus, predicted data $D_{PORI}$ for frames C1, C2, C4 ... are obtained through the selection circuit 230 and output to the adding circuit 218 to decode the frame data C1, C2, C4 ... .

The decoded data of frames A0, A6, B3, C1, C2, C4 ... are output after they are rearranged in their original order by means of the delay circuits 262 and 266 and the selection circuits 260, 264 and 268, and thereby video signals which have been highly efficiently coded and transmitted can be reconstructed.

On the other hand, in the reverse reproduction mode, the forward prediction and the backward prediction motion vectors are switched and then input to the variable reading memories 240 and 242, and at the same time, the contact switching operation of the selection circuit 230 is exchanged in forward prediction and backward prediction, so that as in the normal reproduction mode, predicted data $D_{PRI}$ is obtained to reconstruct the original frames of data.

The frames A0 and A6 in the output data $D_{TIN}$ from the adding circuit 218 are used in the adaptive prediction circuit 214 for decoding the subsequent frames B3, C1, C2, C4 ... The decoded frames A0, A6, B3, C1, C2, C4 ... are arranged in their original order in the adaptive prediction circuit 214 and are then output. Thus, moving picture video signals which have highly efficiently coded and transmitted can be reproduced.

(4) Effects of the Embodiment

According to the operation of the apparatus described above, data in frames are divided into groups of frames each including 6 frame units, the leading frame of each group of frames is intraframe coded, the frames of data of the subsequent group which have been intraframe coded are used as predicted frames, and the fourth frame of the group is interframe coded and sent. Thus, video signals can be efficiently encoded by a simple apparatus such that deterioration of picture quality is effectively avoided and hence the video signals can be efficiently transmitted with high quality.

The fourth frame of the group and the intraframe coded frames of each group and the subsequent group are used as predicted frames, and the remaining frames are thereby interframe coded and sent. Thus, degradation of picture quality can be effectively avoided and the remaining frames can be more efficiently encoded.

Data representing each of the predicted frames are added to the frames to be interframe coded and then transmitted, and thereby the transmitted data can be decoded with a simple apparatus.

In the apparatus described above, double vectors MV1N, MV2P, MV4N, MV5P and triple vectors MV3N, MV3P are converted to one frame interval vectors and are processed by variable length coding according preference to vectors having a high probability of appearance. Thus, coding is performed with a common table and hence motion vectors can be optimized with the use of a simple apparatus.

(5) Other Embodiments (5-1) In the embodiment above, it is illustrated that: data arranged in frames are divided into frame groups including 6 frame units; the leading frame thereof is intraframe coded; and the fourth frame is interframe coded at level 1 while the second, the third, the fifth and the sixth frames are interframe coded at level 2. The present invention is not limited to such processing. Intraframe coding and interframe coding at levels 1 and 2 are variously combined as needed.

As shown in FIG. 21, for example, data arranged in frames are divided into frame groups including 6 frame units, leading frames A0 and A6 are intraframe coded, the third and the fifth frames B2 and B4 may be interframe coded at level 1, and the second, the fourth and the sixth frames C1, C3 and C5 may be interframe coded at level 2.

Figure 22:
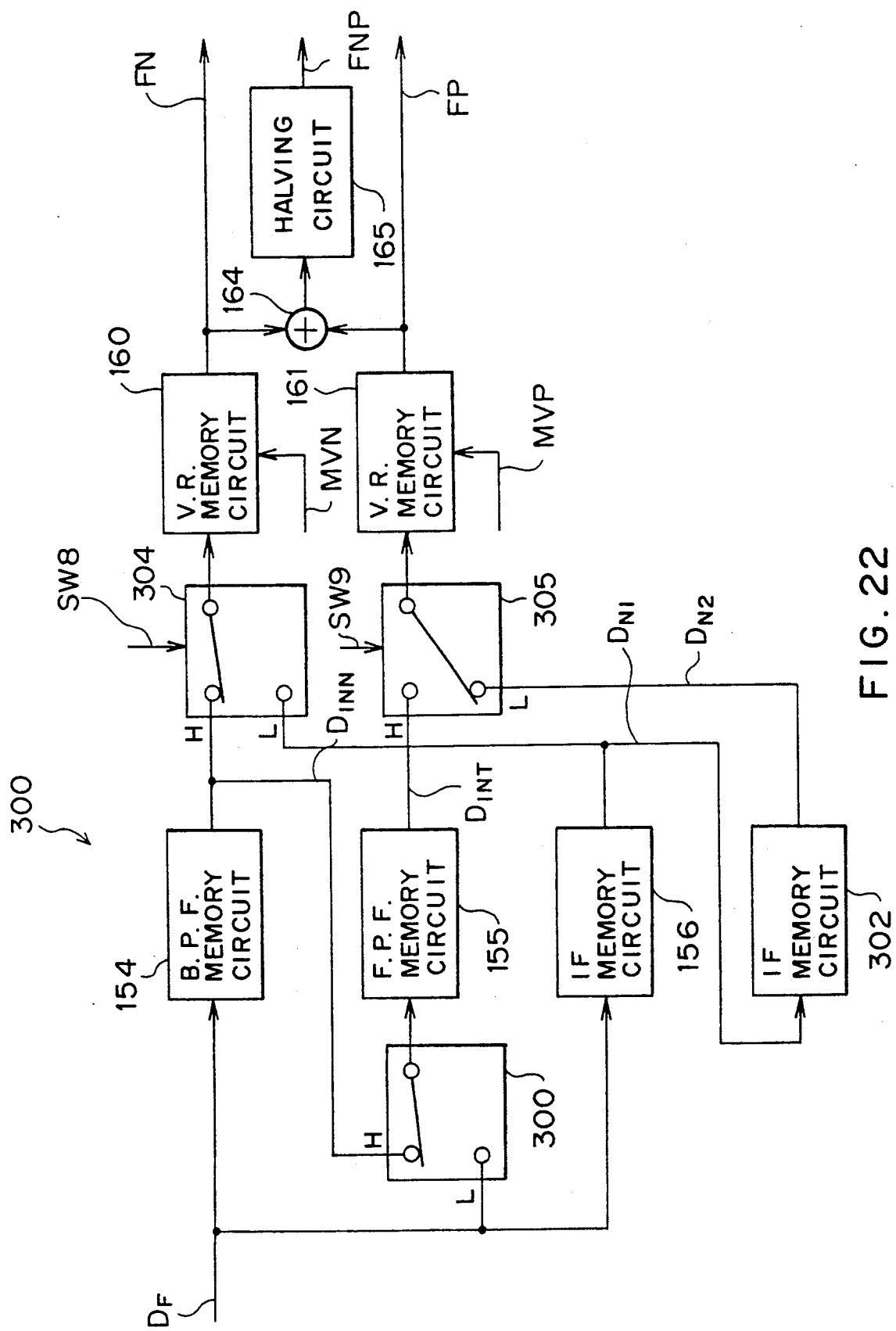
FIG. 22 is a block diagram illustrating an adaptive prediction circuit of the second embodiment.

In this case, frames A0 and B2, A0 and A6, B2 and B4, A0 and A6, and B4 and A6 may be used as predicted frames for frames C1, B2, C3, B4 and C5, respectively and may be predicted by the adaptive prediction circuit as illustrated in FIG. 22.

More specifically, as shown in FIGS. 23(A)–23(I), picture data $D_V$(FIG. 23(A)) is produced by reordering the data of frames A0, C1, B2, C3, ... in the processing order of A0, A6, B2, C1, B4, C3, C5, ..., and simultaneously a forward prediction reference index PID (FIG. 23(B)) and a backward prediction reference index NID (FIG. 23(C)) are produced.

Where the values of 0, 2 and 4 of the forward prediction reference index PID and the backward prediction reference index NID indicate that frames A0 and A6 are to be intraframe coded, frames B2 and B4 are predicted frames, respectively.

With reference to FIG. 22 picture data $D_F$ reconstructed on the basis of the picture data $D_V$ is provided to the backward prediction frame memory 154 and the interframe memory circuit 156, and the output data of the interframe memory circuit 156 is provided to an interframe memory circuit 302.

The contacts of a selection circuit 300 are presently coupled with the backward prediction frame memory 154.

The backward prediction frame memory 154 and the forward prediction frame memory 155 are switched to writing mode when frames A0 and A6 to be intraframe coded are input, and then the interframe memory circuits 156 and 302 are switched to writing mode when the third and the fifth frames o data B2 and B4 are input. In this manner, frames A0, A6, B2 and B4 can be stored in each of the frame memory circuits 154 to 156 and 302 (FIGS. 23(D), (E), (F) and (G)).

The contacts of selection circuits 304 and 305 are sequentially switched in response to switching signals SW8 and SW9 (FIGS. 23(H) and (I)) and their selected outputs are supplied to variable reading memory circuits 160 and 161. By this operation, predicted data FN, FNP and FP can be constructed sequentially for frames to be interframe coded; B2, C1, B4, C3, ... .

Also when the sequence of processing the frames of data is switched in such a manner, the frames can be easily decoded in a receiving unit by adding the forward prediction reference index PID and the backward prediction reference index NID which represent predicted frames for the data of each frame.

Moreover, when data in frames are processed in the sequence shown in FIG. 1, the frames may be sequentially processed with reference to the forward prediction reference index PID and the backward prediction reference index NID, whereby selective prediction processing can be performed by using the adaptive prediction circuit as illustrated in FIG. 22.

The motion vector detection circuit and the adaptive prediction circuit of the receiving unit may be built similarly as in FIG. 22, and the operation thereof may be switched with reference to the forward prediction reference index PID and the backward prediction reference index NID. In this fashion, the present invention can be applied where frames are transmitted in the processing sequence as shown in FIG. 1, and hence the range of applications of the transmitting unit and the receiving unit can be enlarged.

Figure 24:
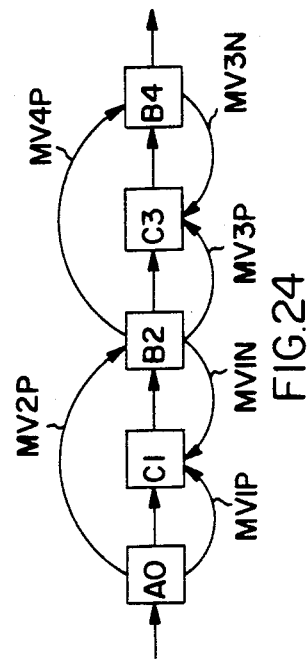
FIG. 24 is a diagrammatic view showing the operation of modified form of the adaptive prediction circuit of FIG. 22.

Furthermore, the data D, may be directly input to the forward prediction frame memory circuit 155 by switching the contacts of the selection circuit 300, the operation of which may be switched on the basis of the forward prediction reference index PID and the backward prediction reference index NID. In this case, the selection circuit 300 may be adjusted for operation where the frames of data are processed in the sequence as shown in FIG. 24.

That is, the first frame A0 is intraframe coded and then transmitted, and the third frame B2 is transmitted by using the data of frame A0 as the predicted frame.

Then, the fifth frame B4 and the seventh frame B6 are sent using the data of frames B2 and B4, which precede them by two frames, respectively, as predicted frames, and the interposed frames C1, C3, ..., are sent by using the data of frames A0 and B2, B2 and B4, ..., as predicted frames.

Thus, the data of predetermined predicted frames are entered in the forward prediction frame memory circuit 154, the backward prediction frame memory circuit 154, and the interframe memory circuits 156 and 302 with reference to the forward prediction reference index PID and the backward prediction reference index NID, with the contacts of the selection circuit 300 being switched over, and thereby video signals of the transmission format can be adaptively predicted.

(5-2) In the embodiment described above, video signals are first compressed to ¼ of the original amount of data, and then intraframe coding and interframe coding are performed. However, the amount of data compression is not limited to this but may be set to various values as needed; in the alternative, the intraframe coding processing and the interframe coding processing may be directly carried out with data compression being omitted.

(5-3) Furthermore, in the embodiment described above, the video signals are recorded on a compact disc. The present invention is not limited to this application but may be widely applied for recording video signals on various recording media such as magnetic tape and for transmitting video signals through a predetermined transmission channel.

(5-4) In the embodiment described above, succeeding frames are divided in groups of 6 frame, and motion vectors are detected for frames which are 2 or 3 frames apart and transmitted. The present invention is not limited to this feature but may be widely applied to a case where motion vectors between frames which are a plurality of frames away from each other are transmitted.

According to the present invention, digital video signals are divided into groups of predetermined frame units; digital video signals of each group of frames are intraframe coded and are interframe coded and transmitted with reference to the previous and following intraframe coded digital video signals. Thus, the present invention provides a video signal transmission system which enables video signals to be efficiently encoded and transmitted with deterioration of picture quality being effectively avoided. It is thereby possible to highly efficiently transmit high quality video signals.

According to the present invention there is provided a video signal transmission system in which: digital video signals to be coded by interframe processing are divided into a group which is first intraframe coded and transmitted with reference to previous and following digital video signals which are interframe coded and another group which is processed with reference to the digital video signals which were first interframe coded, and transmitted, whereby video signals are more efficiently coded and sent with degradation of picture quality being avoided using a simple apparatus.

According to the present invention, there is provided a video signal transmission system in which identification data for digital video signals, which are referred to for interframe coding, are added to the digital video signals, which are coded by interframe processing, and the digital video signals along with the identification data are then transmitted, whereby the transmitted digital video signals are decoded with the use of a simple apparatus.

According to the present invention, motion vectors between frames which are a plurality of frames away from each other are converted to single frame interval vectors, optimized and then sent. Thus, motion vectors can be optimized and transmitted with the use of a simple apparatus.

While preferred embodiments of the invention have been disclosed, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. An apparatus for transmitting a digital video signal, comprising:
   means for dividing the digital video signal into successive frame groups each having a plurality of frames, first means for processing said plurality of frames of each of said successive frame groups so that at least one of said plurality of frames is to be generated as an intra-frame signal, and
   second means for processing a remaining of said plurality of frames based on said intra-frame signals of one of said each frame group and one successive frame group so that at least one of said remaining of said plurality of frames is to be generated as a first inter-frame signal.

2. The apparatus according to claim 1, in which said apparatus further comprises,
   third means for processing further remaining of said plurality of frames except for said intra-frame and first inter-frame based on said intra-frame of said one of said each frame group and said first inter-frame, or said intra-frame of said one successive frame group and said first inter-frame so that said further remaining of said plurality of frames are to be generated as second inter-frames signal.

3. The apparatus according to claim 2, in which said apparatus further comprises,
   means for adding an identification data to each of said first and second inter-frame signal so that a reference frame in a process of generating said first and second interframe signals can be identified.

4. An apparatus for transmitting a digital video signal provided as a plurality of successive frames separated by predetermined frame intervals, comprising:

means for producing a multi-frame interval motion vector from a first, predetermined reference frame of said plurality of successive frames to a second frame of said plurality of successive frames separated from said first, predetermined reference frame by a plurality of frame intervals;

means for interframe coding said second frame with the use of the motion vector;

means for converting said multi-frame interval motion vector to a one frame interval motion vector; and means for transmitting said one frame interval motion vector.

5. The apparatus according to claim 4, wherein said means for producing a multi-frame interval motion vector is operative to produce a plurality of multi-frame interval motion vectors, and wherein said means for converting said multi-frame interval motion vector to a one frame interval motion vector is operative to convert a plurality of multi-frame interval motion vectors to one frame interval motion vectors, said apparatus further comprising means for run-length encoding said one frame interval motion vectors for transmission.

* * * * *